US007612651B2

(12) United States Patent
Ishibashi et al.

(10) Patent No.: US 7,612,651 B2
(45) Date of Patent: Nov. 3, 2009

(54) COMMUNICATION SYSTEM, COMMUNICATION METHOD AND PROGRAM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 11/451,439

(22) Filed: Jun. 13, 2006

(65) Prior Publication Data

US 2007/0002815 A1 Jan. 4, 2007

(30) Foreign Application Priority Data

Jun. 14, 2005 (JP) ............................ 2005-173580

(51) Int. Cl.
*G06F 7/04* (2006.01)
*G06K 19/00* (2006.01)
*G06K 9/00* (2006.01)
*H04L 9/14* (2006.01)
*H04L 9/32* (2006.01)

(52) U.S. Cl. ...................... 340/5.81; 340/5.82; 340/5.2; 340/5.52; 340/531; 340/573.1; 382/115

(58) Field of Classification Search ............. 340/573.1, 340/572.1, 531, 5.82–5.83, 5.52–5.53; 382/124–127, 382/115–118
See application file for complete search history.

(56) References Cited

U.S. PATENT DOCUMENTS 5,023,597 A 6/1991 Salisbury
5,164,707 A 11/1992 Rasmussen et al.
5,739,746 A 4/1998 Shaffer et al.
5,914,701 A 6/1999 Gersheneld et al.
6,058,477 A 5/2000 Kusakabe et al.
6,195,008 B1 * 2/2001 Bader ...................... 340/573.1
6,223,018 B1 4/2001 Fukumoto et al.
6,611,195 B1 8/2003 Manneschi et al.
6,897,788 B2 * 5/2005 Khair et al. ............ 340/870.16
7,184,581 B2 * 2/2007 Johansen et al. ............ 382/124
7,260,436 B2 * 8/2007 Kilgore et al. ................ 607/60
2002/0065711 A1 5/2002 Fujisawa et al.
2002/0146032 A1 10/2002 Attimont et al.
2003/0137989 A1 7/2003 Nagai
2004/0056811 A1 3/2004 Pakray et al.
2006/0045118 A1 3/2006 Hyoung et al.
2006/0077616 A1 4/2006 Takiguchi (Continued)

FOREIGN PATENT DOCUMENTS

JP 7-20249 1/1995

(Continued)

*Primary Examiner*—Benjamin C Lee
*Assistant Examiner*—Michael Shannon
(74) *Attorney, Agent, or Firm*—Finnegan, Henderson, Farabow, Garrett & Dunner, L.L.P.

(57) ABSTRACT

A communication system for communicating with a communication terminal located on a communication medium. The system includes a plurality of communicators, disposed in contact with or in proximity to the communication medium, for communicating with the communication terminal via the communication medium, a detector for detecting reception levels of a signal transmitted from the communication terminal and received via the plurality of communicators, and an associator for associating the communication terminal with one of the plurality of communicators by comparing reception levels of the signal transmitted and received by each of the communicators.

4 Claims, 38 Drawing Sheets

U.S. PATENT DOCUMENTS

| | | | |
|---|---|---|---|
| 2007/0021077 | A1 | 1/2007 | Amtmann et al. |
| 2007/0222599 | A1 | 9/2007 | Coveley et al. |

FOREIGN PATENT DOCUMENTS

| | | |
|---|---|---|
| JP | 10-229357 | 8/1998 |
| JP | 10-232283 | 9/1998 |
| JP | 11-509380 | 8/1999 |
| JP | 2001-134890 | 5/2001 |
| JP | 2001-144662 | 5/2001 |
| JP | 2002-009710 | 1/2002 |
| JP | 2003-063392 | 3/2003 |
| JP | 2003-163644 | 6/2003 |
| JP | 2003-317042 | 11/2003 |
| JP | 2004-214737 | 7/2004 |
| JP | 2004-282733 | 10/2004 |

* cited by examiner

FIG. 3

250

| FREQUENCY f [Hz] | RECEPTION LOAD Rr [Ω] | CAPACITANCE [F] | EXECUTION VOLTAGE [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

COMMUNICATION SYSTEM, COMMUNICATION METHOD AND PROGRAM

CROSS-REFERENCE TO RELATED APPLICATION

This application claims priority to Japanese Patent Application No. 2005-173580, filed June 14, 2005.

BACKGROUND OF THE INVENTION

1. Field of the Invention

The present invention relates to a communication system, a communication method and a program, and more particularly to a communication system and a communication method suitable for use in communicating with communication terminals in which a communication technique using a human body as a communication medium is applied.

2. Description of Related Art

In a communication system formed with a transmitter, a communication medium and a receiver, communication has heretofore been established by a physical communication signal transmission path for transmitting communication signals and a physical reference point provided separately from the communication signal transmission path so that a reference point for determining the difference in level between communication signals is shared by the transmitter and the receiver (refer to, for example, Japanese Patent Application Publication Number H10-229357 and Japanese Translation of PCT Patent Application Number H11-509380).

For example, in each of the patent applications, a description is given as to communication techniques using a human body as a communication medium. In either of the methods, not only is a first communication path provided as a human body, but also the direct capacitive coupling between electrodes on the ground or in space is provided as a second communication path so that the entire communication path made of the first communication path and the second communication path forms a closed circuit;

In the communication system, two communication paths, i.e., a communication signal transmission path and a reference point path (a first communication path and a second communication path), need to be provided as a closed circuit between the transmitter and the receiver. However, since both communication paths are mutually different paths, these two communication paths must be stably compatible, so that there is a risk of restricting use environments for communications.

For example, the strength of capacitive coupling between the transmitter and the receiver on the reference point path depends on the distance between the devices, and the stability of the communication path varies with the distance. Namely, in this case, there is a risk that the stability of communication depends on the distance between the transmitter and the receiver. In addition, there is a risk that the stability of communication varies according to the presence or absence of a shield or the like between the transmitter and the receiver.

Accordingly, in the communication methods of forming two communication paths, i.e., the communication signal transmission path and the reference point path, as a closed circuit, since use environments greatly influence the stability of communication, stable communication is difficult to perform.

SUMMARY OF THE INVENTION

As mentioned above, various improvements toward practical use of the communication technique which uses a human body as a communication medium are under progress, and investigations of use methods have been conducted on applications of the communication technique to various fields.

The present invention has been made in view of the above-mentioned situation, and to provide a communication system using a human body as a communication medium, which is applicable to a communication terminal, and a method for specifying an association between the communication terminal and a person wearing the same.

A communication system according to an embodiment of the present invention is comprised of a plurality of communication means, disposed in contact with or in proximity to a communication medium, for communicating with a communication terminal via the communication medium disposed in contact or proximity thereto; detection means for detecting a reception level of a signal transmitted from the communication terminal and received via the plurality of communication means; and association means for comparing respective reception levels of the signal transmitted from the same communication terminal and received via different communication means, and, based on a result of this comparison, associating the communication terminal that transmitted the signal with one of the plurality of the communication means.

A communication system according to another embodiment of the invention further includes identification means for identifying a communication medium to make contact with or approach the communication means, and wherein the association means is able to specify a communication medium that wears the communication terminal on the basis of a result of identification by the identification means.

The above-mentioned association means is able to associate the communication terminal that transmitted the signal with the communication means that received the signal as such one that the reception level thereof should be maximum.

A communication method according to another embodiment of the present invention comprises including: a detection step for detecting reception levels of a signal from a communication terminal which were received via a plurality of communication means; and an association step for comparing respective reception levels of a signal which was transmitted from the same communication terminal and were received via different communication means, and associating the communication terminal that transmitted the signal with one of the plurality of the communication means, on the basis of a result of this comparison.

A program to be executed by a computer according to still another embodiment of the present invention comprises including: a detection step for detecting reception levels of a signal transmitted from a communication terminal and received via a plurality of communication means; and an association step for comparing respective reception levels of the signal which was transmitted from a same communication terminal and received via different communication means, and associating the communication terminal that transmitted the signal with one of the plurality of the communication means, on the basis of a result of this comparison.

According to the invention described above, reception levels of the signal transmitted from a communication terminal and received via a plurality of communication means are detected, and respective reception levels of the signal transmitted from the same communication terminal and received via different communication means are compared. Then, on the basis of the result of this comparison, the communication terminal that transmitted the signal is associated with one of the plurality of the communication means.

According to the present invention, it becomes possible clearly to designate a correspondence between: a communication terminal which applies the communication technology in which a human body is utilized as a communication medium; and a person who wears the communication terminal.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 3 is a table showing an example of the calculation result of effective values of the voltage produced across a reception load resistor in the model shown in FIG. 2;

DETAILED DESCRIPTION OF EMBODIMENTS

In the following description of the embodiments of the present invention, the correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

Further, the description is not intended to cover all the inventions described in the specification. In other words, it is not intended to deny the presence of the invention described in this specification but not claimed in this application, i.e., to deny the presence of the invention which may be divisionally submitted in the future and the invention emerging through corrections and additionally submitted in the future.

Figure 34:
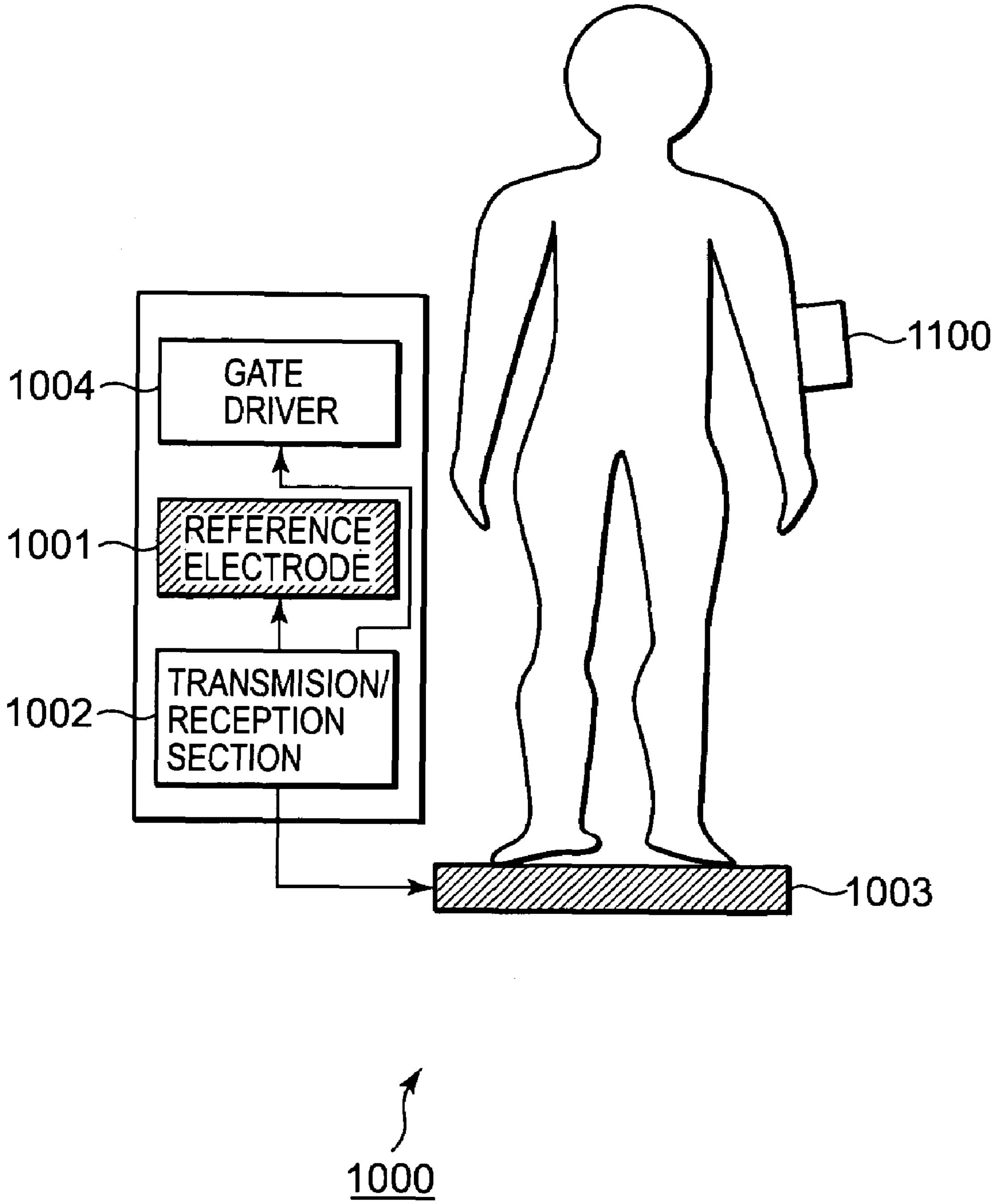
FIG. 34 is a side view showing a construction example of a ticket gate system according to an embodiment of the present invention.

A communication system as claimed in claim 1 (for example, a ticket gate system 1000 as shown in FIG. 34), which is disposed in a position to make contact with or in proximity of a communication medium (for example, a person passing through the ticket gate 1000), includes: a plurality of communication means (for example, signal electrodes 1003A to 1003E shown in FIG. 35) which are capable of communicating with a communication terminal via a communication medium in contact therewith or in proximity thereto; detection means (for example, a device ID detection section 1033 in FIG. 37) for detecting reception levels of a signal transmitted from a communication terminal and received via the plurality of the communication means; and association means (for example, a decision section 1036 shown in FIG. 37) for comparing respective reception levels of the signal which was transmitted from the same communication terminal and were received via different communication means, and associating the communication terminal that transmitted the signal with one of the plurality of the communication means.

A communication system according to claim 2 of the invention further includes identification means (for example, a person detection section 1034 shown in FIG. 37) for identifying a communication medium making contact with or approaching the communication means, and wherein the association means specifies a communication medium wearing (mounting) the communication terminal on the basis of a result of identification by the identification means.

A communication method according to claim 4 of the invention includes a detection step (for example, a step S143 shown in FIG. 42) for detecting reception levels of a signal transmitted from a communication terminal and received via a plurality of communication means, and an association step (for example, steps S147 and S148 shown in FIG. 42) for comparing respective reception levels of the signal transmitted from the same communication terminal and received via different communication means, and designating the communication terminal having transmitted the signal with one of the plurality of the communication means, on the basis of a result of this comparison.

By way of example, since correspondence between the constituent steps of the program claimed in appended claims of the present invention and exemplary examples of the embodiment described in the specification of the invention is the same as those described above in the information processing method, its detailed description will be omitted.

A preferred embodiment of the present invention will be described more specifically in the following with reference to the accompanying drawings.

Figure 1:
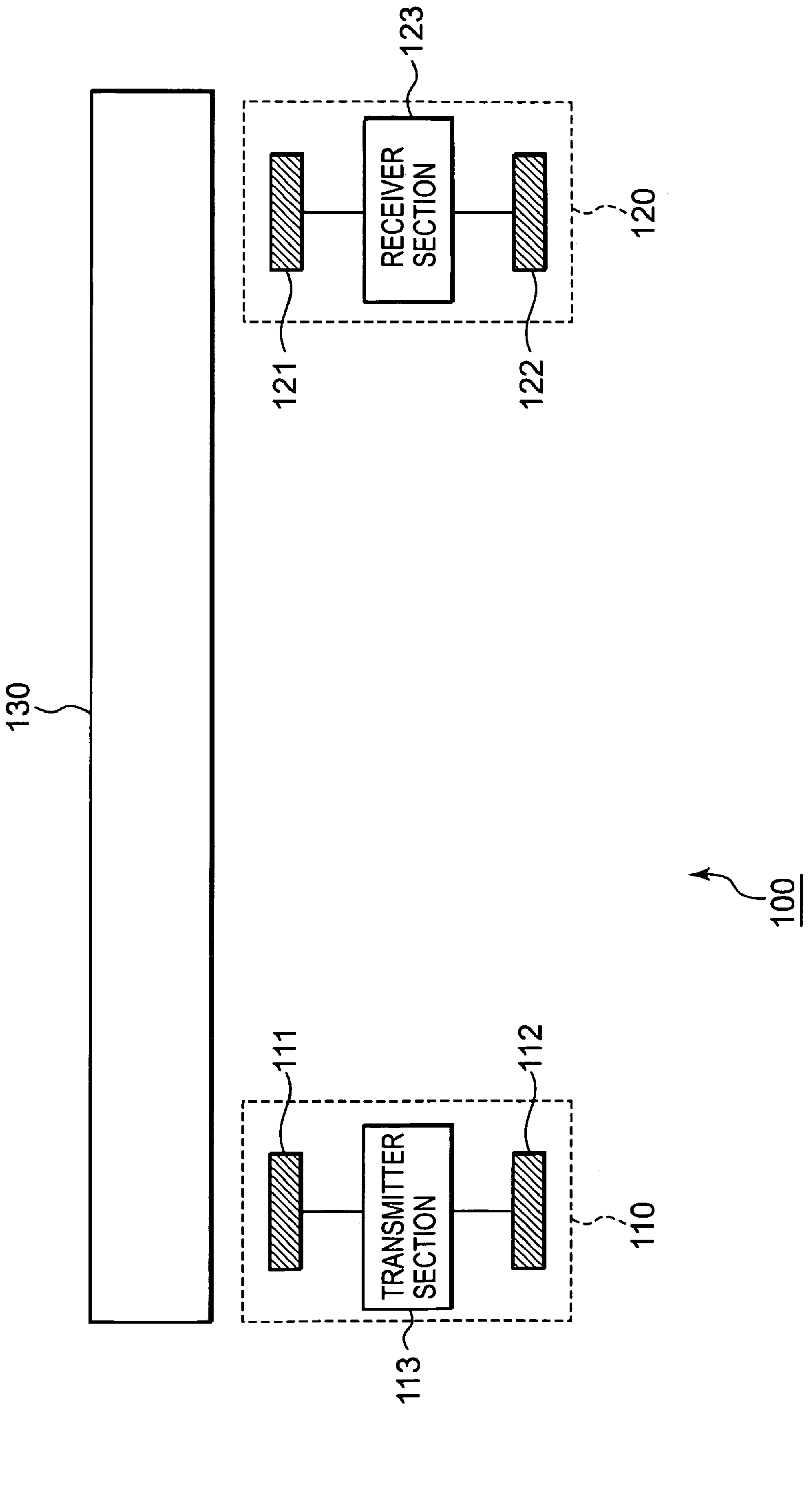
FIG. 1 is a block diagram showing a construction example of one embodiment of a communication system which underlies the present invention.

FIG. 1 is a schematic diagram showing an example of arrangements of a communication system which underlies the present invention.

Referring to FIG. 1, a communication system 100 is a system which includes a transmitter 110, a receiver 120, and a communication medium 130, and causes the transmitter 110 and the receiver 120 to transmit and receive signals therebetween via the communication medium 130. Namely, in the communication system 100, a signal transmitted from the transmitter 110 is transmitted via the communication medium 130 and is received by the receiver 120.

The transmitter 110 has a transmission signal electrode 111, a transmission reference electrode 112, and a transmitter section 113. The transmission signal electrode 111 is an electrode for transmitting a signal to be transmitted via the communication medium 130, and is provided to have a stronger capacitive coupling to the communication medium 130 than to the transmission reference electrode 112 which is an electrode for obtaining a reference point for making a decision as to the difference in level between signals. The transmitter section 113 is provided between the transmission signal electrode 111 and the transmission reference electrode 112, and applies an electrical signal (potential difference) to be transmitted to the receiver 120, between the transmission signal electrode 111 and the transmission reference electrode 112.

The receiver 120 has a reception signal electrode 121, a reception reference electrode 122, and a receiver section 123. The reception signal electrode 121 is an electrode for receiving a signal transmitted via the communication medium 130, and is provided to have a stronger capacitive coupling to the communication medium 130 than to the reception reference electrode 122 which is an electrode for obtaining a reference point for making a decision as to the difference in level between signals. The receiver section 123 is provided between the reception signal electrode 121 and the reception reference electrode 122, and converts an electrical signal (potential difference) produced between the reception signal electrode 121 and the reception reference electrode 122 into a desired electrical signal to restore the electrical signal generated by the transmitter section 113 of the transmitter 110.

The communication medium 130 is made of a substance having a physical characteristic capable of transmitting electrical signals, for example, an electrically conductive material or a dielectric material. The communication medium 130 is made of, for example, an electrically conductive material (such as copper, iron or aluminum). Otherwise, the communication medium 130 is made of pure water, rubber, glass or an electrolytic solution such as a saline solution, or a dielectric material such as a human body which is a complex of these materials. The communication medium 130 may have any shape, for example, a linear shape, a planar shape, a spherical shape, a prismatic shape, a cylindrical shape or another arbitrary shape.

First of all, the relationship between each of the electrodes and spaces neighboring the communication medium or the devices in the communication system 100 will be described below. In the following description, for convenience of explanation, it is assumed that the communication medium 130 is a perfect conductor. In addition, it is assumed that spaces exist between the transmission signal electrode 111 and the communication medium 130 and between the reception signal electrode 121 and the communication medium 130, respectively, so that there is no electrical coupling between the transmission signal electrode 111 and the communication medium 130 nor between the reception signal electrode 121 and the communication medium 130. Namely, a capacitance is formed between the communication medium 130 and each of the transmission signal electrode 111 and the reception signal electrode 121.

The transmission reference electrode 112 is provided to face a space neighboring the transmitter 110, while the reception reference electrode 122 is provided to face a space neighboring the receiver 120. In general, if a conductor exists in a space, a capacitance is formed in a space neighboring the surface of the conductor. For example, if the shape of the conductor is a sphere of radius r [m], a capacitance C is found from the following formula (1):

[Formula 1]

$$C=4\times\pi\times\epsilon r \quad (1)$$

In formula (1), π denotes the circular constant of the conductor and ε denotes the dielectric constant of the space surrounding the conductor. The dielectric constant ε is found from the following formula (2):

[Formula 2]

$$\epsilon=\epsilon_r\times\epsilon_0 \quad (2)$$

In formula (2), ε0 denotes a vacuum dielectric constant which is $8.854\times10^{-12}$ [F/m], and εr denotes a specific dielectric constant which represents the ratio of the dielectric constant ε to the vacuum dielectric constant ε0.

As shown by the above-mentioned formula (1), the larger the radius r, the larger the capacitance C. In addition, the magnitude of the capacitance C of a conductor having a complex shape other than a sphere may not be easily expressed in a simple form such as the above-mentioned formula (1), but it is apparent that the magnitude of the capacitance C varies according to the magnitude of the surface area of the conductor.

As mentioned above, the transmission reference electrode 112 forms the capacitance with respect to the space neighboring the transmitter 110, while the reception reference electrode 122 forms the capacitance with respect to the space neighboring the receiver 120. Namely, as viewed from an imaginary infinity point outside each of the transmitter 110 and the receiver 120, the potential at the corresponding one of the transmission reference electrode 112 and the reception reference electrode 122 is fixed and does not easily vary.

The principle of communication in the communication system 100 will be described below. In the following description, for convenience of explanation, the term "capacitor" will be expressed simply as "capacitance" according to context, but these terms have the same meaning.

In the following description, it is assumed that the transmitter 110 and the receiver 120 shown in FIG. 1 are arranged to maintain a sufficient distance therebetween so that their mutual influence can be neglected. In the transmitter 110, it is assumed that the transmission signal electrode 111 is capacitively coupled to only the communication medium 130 and the transmission reference electrode 112 is spaced a sufficient distance apart from the transmission signal electrode 111 so that their mutual influence can be neglected (the electrodes 112 and 111 are not capacitively coupled). Similarly, in the receiver 120, it is assumed that the reception signal electrode 121 is capacitively coupled to only the communication medium 130 and the reception reference electrode 122 is spaced a sufficient distance apart from the reception signal electrode 121 so that their mutual influence can be neglected (the electrodes 122 and 121 are not capacitively coupled). Furthermore, since the transmission signal electrode 111, the reception signal electrode 121 and the communication medium 130 are actually arranged in a space, each of them has a capacitance relative to the space, but the capacitance is assumed to be herein negligible for convenience of explanation.

Figure 2:
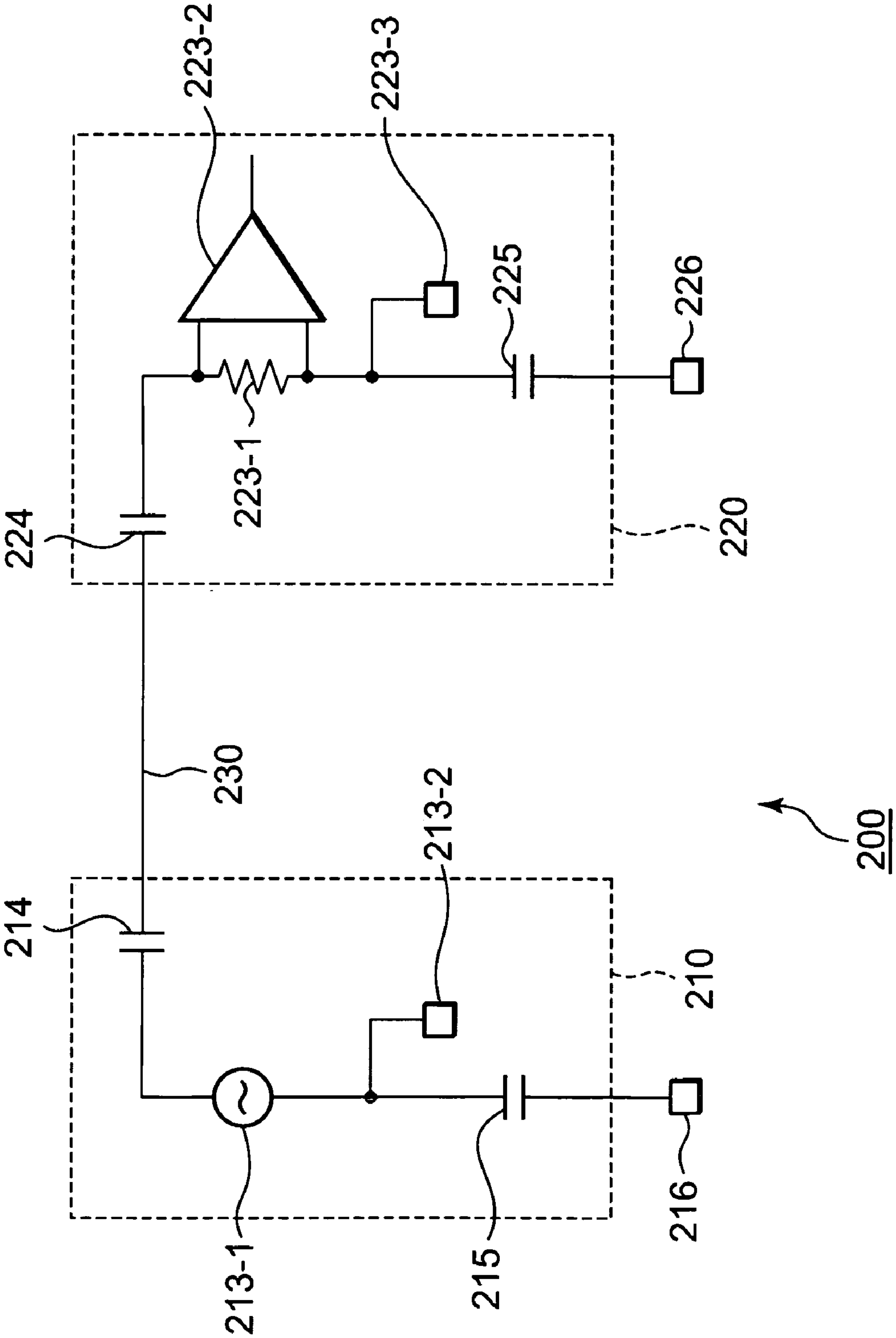
FIG. 2 is a diagram showing an example of an equivalent circuit of the communication system shown in FIG. 1.

FIG. 2 is a diagram showing an equivalent circuit of the communication system 100 shown in FIG. 1. A communication system 200 is the equivalent circuit of the communication system 100 and is substantially equivalent to the communication system 100.

Namely, the communication system 200 has a transmitter 210, a receiver 220, and a connection line 230, and the transmitter 210 corresponds to the transmitter 110 of the communication system 100 shown in FIG. 1, the receiver 220 corresponds to the receiver 120 of the communication system 100 shown in FIG. 1, and the connection line 230 corresponds to the communication medium 130 of the communication system 100 shown in FIG. 1.

In the transmitter 210 shown in FIG. 2, a signal source 213-1 and a ground point 213-2 correspond to the transmitter section 113 shown in FIG. 1. The signal source 213-1 generates a sine wave of particular frequency ω×t [rad] as a transmit signal. If t [s] denotes time and ω [rad/s] denotes angular frequency, formula (3) can be expressed as follows:

[Formula 3]

$$\omega=2\times\pi\times f \quad (3)$$

In formula (3), π denotes a circular constant and f [Hz] denotes the frequency of the signal generated by the signal source 213-1. The ground point 213-2 is a point connected to the ground of the circuit inside the transmitter 210. Namely, one of the terminals of the signal source 213-1 is connected to a predetermined reference potential of the circuit inside the transmitter 210.

Cte 214 is a capacitor, and denotes the capacitance between the transmission signal electrode 111 and the communication medium 130 shown in FIG. 1. Namely, Cte 214 is provided between the terminal of the signal source 213-1 opposite to the ground point 213-2 and the connection line 230. Ctg 215 is a capacitor, and denotes the capacitance of the transmission signal electrode 112 shown in FIG. 1 with respect to the space. Namely, Ctg 215 is provided between the terminal of the signal source 213-1 on the side of the ground point 213-2 and a ground point 216 indicative of the infinity point (imaginary point) based on the transmitter 110 in the space.

In the receiver 220 shown in FIG. 2, Rr 223-1, a detector 223-2, and a ground point 223-3 correspond to the receiver section 123 shown in FIG. 1. Rr 223-1 is a load resistor (receive load) for extracting a received signal, and the detector 223-2 made of an amplifier detects and amplifies the potential difference between the opposite terminals of this Rr 223-1. The ground point 223-3 is a point connected to the ground of the circuit inside the receiver 220. Namely, one of the terminals of Rr 223-1 (one of the input terminals of the detector 223-2) is set to a predetermined reference potential of the circuit inside the receiver 220.

The detector 223-2 may also be adapted to be further provided with other functions, for example, the function of demodulating a detected modulated signal or decoding encoded information contained in the detected signal.

Cre 224 is a capacitor, and denotes the capacitance between the reception signal electrode 121 and the communication medium 130 shown in FIG. 1. Namely, Cre 224 is provided between the terminal of Rr 223-1 opposite to the ground point 223-3 and the connection line 230. Crg 225 is a capacitor, and denotes the capacitance of the reception reference electrode 122 shown in FIG. 1 with respect to the space. Namely, Crg 225 is provided between the terminal of Rr 223-1 on the side of the ground point 223-3 and a ground point 226 indicative of the infinity point (imaginary point) based on the receiver 120 in the space.

The connection line 230 denotes the communication medium 130 which is a perfect conductor. In the receiver 220 shown in FIG. 2, Ctg 215 and Crg 225 are shown to be electrically connected to each other via the ground point 216 and the ground point 226 on the equivalent circuit, but in practice, Ctg 215 and Crg 225 need not be electrically connected to each other and each of Ctg 215 and Crg 225 may form a capacitance with respect to the space neighboring the corresponding one of the transmitter 210 and the receiver 220. Namely, the ground point 216 and the ground point 226 need not be electrically connected and may also be independent of each other.

Incidentally, if a conductor exists in a space, a capacitance proportional to the surface area of the conductor is necessarily formed. Namely, for example, the transmitter 210 and the receiver 220 may be spaced as far apart as desired from each other. For example, if the communication medium 130 shown in FIG. 1 is a perfect conductor, the conductivity of the connection line 230 can be regarded as infinite, so that the length of the connection line 230 does not influence communication. In addition, if the communication medium 130 is a conductor of sufficient conductivity, the distance between the transmitter 210 and the receiver 220 does not influence the stability of communication in practical terms.

In the communication system 200, a circuit is formed by the signal source 213-1, Rr 223-1, Cte 214, Ctg 215, Cre 224 and Crg 225. The combined capacitance Cx of the four series-connected capacitors (Cte 214, Ctg 215, Cre 224 and Crg 225) can be expressed by the following formula (4):

[Formula 4]

$$C_x = \frac{1}{\frac{1}{Cte} + \frac{1}{Ctg} + \frac{1}{Cre} + \frac{1}{Crg}} [F] \quad (4)$$

The sine wave vf(t) generated by the signal source 213-1 can be expressed by the following formula (5):

[Formula 5]

$$V_t(t) = V_m \times \sin(\omega t + \theta) [V] \quad (5)$$

In formula (5), Vm [V] denotes the maximum amplitude voltage of the signal source voltage and θ [rad] denotes the initial phase angle of the same. Namely, the effective value Vtrms [V] of the voltage generated by the signal source 213-1 can be found from the following formula (6):

[Formula 6]

$$V_{trms} = \frac{V_m}{\sqrt{2}} [V] \quad (6)$$

The complex impedance Z of the entire circuit can be found from the following formula (7):

[Formula 7]

$$Z = \sqrt{Rr^2 + \frac{1}{(\omega C_x)^2}} = \sqrt{Rr^2 + \frac{1}{(2\pi f C_x)^2}} [\Omega] \quad (7)$$

Namely, the effective value Vrrms of the voltage provided across both ends of Rr 223-1 can be found from the following formula (8):

[Formula 8]

$$V_{rrms} = \frac{Rr}{Z} \times V_{trms} = \frac{Rr}{\sqrt{Rr^2 + \frac{1}{(2\pi f C_x)^2}}} \times V_{trms} [V] \quad (8)$$

Accordingly, as shown in formula (8), the larger the resistance value of Rr 223-1, the larger the capacitance Cx, and the higher the frequency f [Hz] of the signal source 213-1, the smaller the term of 1/((2×π×f×Cx)2), so that a larger signal can be generated across Rr 223-1.

When it is assumed, for example, that: the effective value Vtrms of the voltage generated by the signal source 213-1 of the transmitter 210 is fixed to 2 [V]; the frequency f of the signal generated by the signal source 213-1 is set to 1 [MHz], 10 [MHz] or 100 [MHz]; the resistance value of Rr 223-1 is set to 10K [Ω], 100K [Ω] or 1M [Ω]; and the capacitance Cx of the entire circuit is set to 0.1 [pF], 1 [pF] or 10 [pF], the calculated result of the effective value Vrrms of the voltage generated across Rr 223-1 is as listed in Table 250 shown in FIG. 3.

As shown in Table 250, the calculated result of the effective value Vrrms takes on a larger value when the frequency f is 10 [MHz] than when the frequency f is 1 [MHz], when the resistance value of the receive load Rr 223-1 is 1M [Ω] than when the resistance value is 10K [Ω], or when the capacitance Cx is 10 [pF] than when the capacitance Cx is 0.1 [pF], as long as the other conditions are the same. Namely, as the value of the frequency f, the resistance value of Rr 223-1 or the capacitance Cx is made larger, a larger effective value Vrrms can be obtained.

It can also be seen from Table 250 that an electrical signal is generated across Rr 223-1 even in the case of a capacitance of a picofarad or less. Namely, even if the signal level of a signal to be transmitted is small, it is possible to effect communication as by amplifying a signal detected by the detector 223-2 of the receiver 220.

Figure 4:
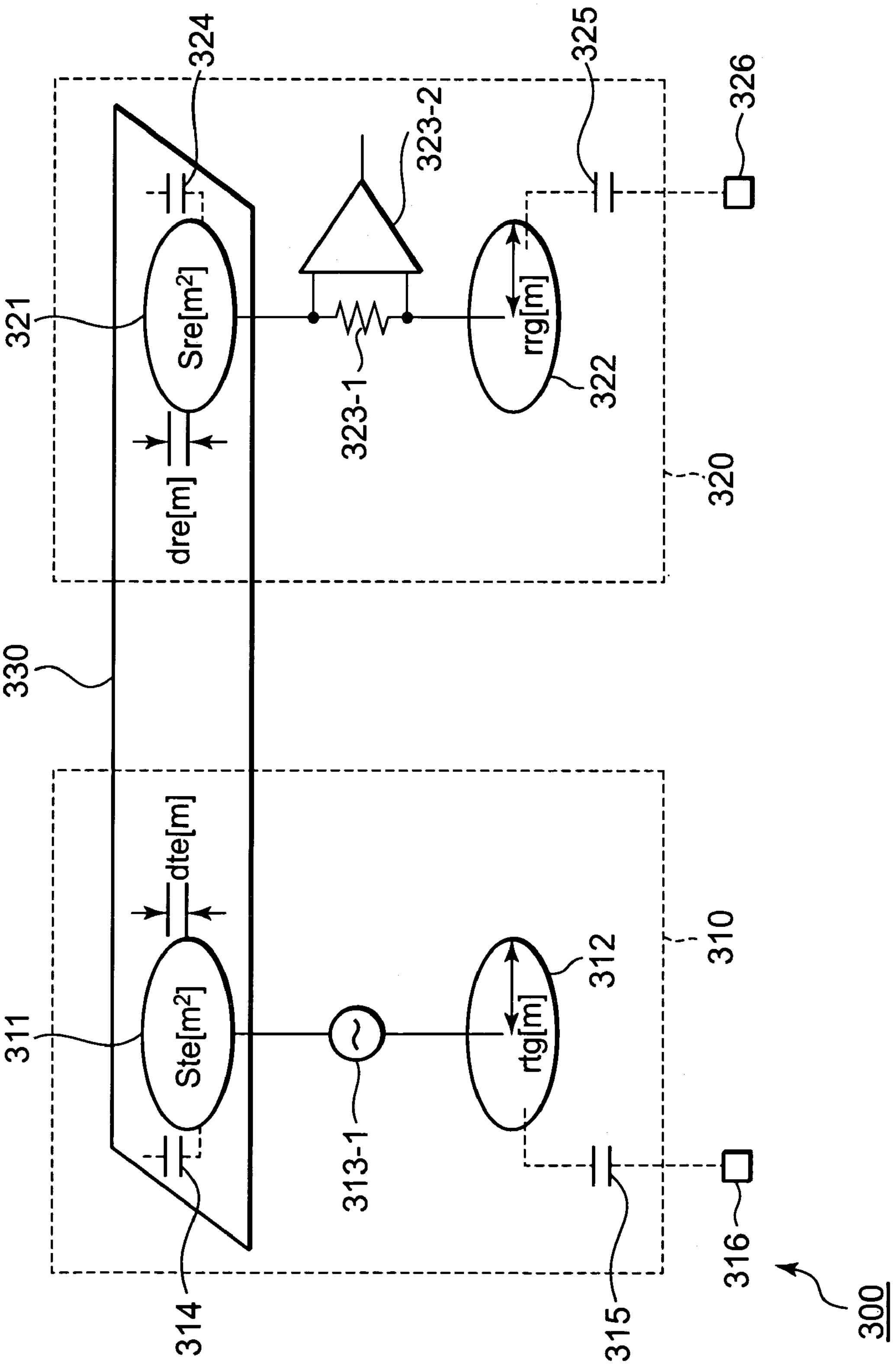
FIG. 4 is a diagram showing an example of a model of a physical construction of the communication system shown in FIG. 1.

A calculation example of each parameter of the communication system 200 which has been mentioned above as an equivalent circuit will be specifically described below with reference to FIG. 4. FIG. 4 is a diagram aiding in explaining calculation examples inclusive of the influence of the physical construction of the communication system 100.

A communication system 300 shown in FIG. 4 is a system corresponding to the communication system 100 shown in FIG. 1, and information about the physical construction of the communication system 100 is added to the communication system 200 shown in FIG. 2. Namely, the communication system 300 has a transmitter 310, a receiver 320, and a communication medium 330. As compared with the communication system 100 shown in FIG. 1, the transmitter 310 corresponds to the transmitter 110, the receiver 320 corresponds to the receiver 120, and the communication medium 330 corresponds to the communication medium 130.

The transmitter 310 has a transmission signal electrode 311 corresponding to the transmission signal electrode 111, a transmission reference electrode 312 corresponding to the transmission reference electrode 112, and a signal source 313-1 corresponding to the transmitter section 113. Namely, the transmission signal electrode 311 is connected to one of both terminals of the signal source 313-1, and the transmission reference electrode 312 is connected to the other. The transmission signal electrode 311 is provided in close proximity to the communication medium 330. The transmission reference electrode 312 is provided to be spaced from the communication medium 330 to such an extent that the transmission reference electrode 312 is not influenced by the communication medium 330, and is constructed to have a capacitance with respect to a space outside the transmitter 310. Although the signal source 213-1 and the ground point 213-2 have been described as corresponding to the transmitter section 113 with reference to FIG. 2, such ground point is omitted in FIG. 4 for convenience of explanation.

Similarly to the transmitter 310, the receiver 320 has a reception signal electrode 321 corresponding to the reception signal electrode 121, a reception reference electrode 322 corresponding to the reception reference electrode 122, and Rr 323-1 and a detector 323-2 corresponding to the receiver section 123. Namely, the reception signal electrode 321 is connected to one of both terminals of Rr 323-1, and the reception reference electrode 322 is connected to the other. The reception signal electrode 321 is provided in close proximity to the communication medium 330. The reception reference electrode 322 is provided to be spaced from the communication medium 330 to such an extent that the transmission reference electrode 312 is not influenced by the communication medium 330, and is constructed to have a capacitance with respect to a space outside the receiver 320. Although Rr 223-1, the detector 223-2 and the ground point 223-3 have been described as corresponding to the receiver section 123 with reference to FIG. 2, such ground point is omitted in FIG. 4 for convenience of explanation.

In addition, it is assumed that the communication medium 330 is a perfect conductor as in the cases shown in FIGS. 1 and 2. It is also assumed that the transmitter 310 and the receiver 320 are arranged to maintain a sufficient distance therebetween so that their mutual influence can be neglected. It is further assumed that the transmission signal electrode 311 is capacitively coupled to only the communication medium 330 and the transmission reference electrode 312 is spaced a sufficient distance apart from the transmission signal electrode 311 so that their mutual influence can be neglected. Similarly, it is assumed that the reception signal electrode 321 is capacitively coupled to only the communication medium 330 and the reception reference electrode 322 is spaced a sufficient distance apart from the reception signal electrode 321 so that their mutual influence can be neglected. Strictly, each of the transmission signal electrode 311, the reception signal electrode 321 and the communication medium 330 has a capacitance relative to the space, but the capacitance is assumed to be herein negligible for convenience of explanation.

As shown in FIG. 4, in the communication system 300, the transmitter 310 is arranged at one end of the communication medium 330, and the receiver 320 is arranged at the other end.

It is assumed that a space of distance dte [m] is formed between the transmission signal electrode 311 and the communication medium 330. If the transmission signal electrode 311 is assumed to be a conductive disk having a surface area Ste [m2] on one side, a capacitance Cte 314 formed between the transmission signal electrode 311 and the communication medium 330 can be found from the following formula (9):

[Formula 9]

$$Cte = \varepsilon \times \frac{Ste}{dte}\ [F] \tag{9}$$

Formula (9) is a generally known mathematical formula for the capacitance of a parallel plate. Formula (9) is a mathematical formula to be applied to the case where parallel plates have the same area, but since formula (9) does not provide a seriously impaired result even when applied to the case where parallel plates have different areas, formula (9) is used herein. In formula (9), $\epsilon$ denotes a dielectric constant, and if the communication system 300 is assumed to be placed in the air, the specific dielectric constant $\epsilon r$ can be regarded as approximately 1, so that the dielectric constant $\epsilon$ can be regarded as equivalent to the vacuum dielectric constant $\epsilon 0$. If it is assumed that the surface area Ste of the transmission signal electrode 311 is $2\times10^{-3}$ [m2] (approximately 5 [cm] in diameter) and the distance dte is $5\times10^{-3}$ [m] (5 [mm]), the capacitance Cte 314 can be found from the following formula (10):

[Formula 10]

$$Cte = (8.854\times10^{-12})\times\frac{2\times10^{-3}}{5\times10^{-3}} \approx 3.5\ [\text{pF}]. \tag{10}$$

Incidentally, in terms of physical phenomena, the above-mentioned formula (9) is strictly applicable to the case where the relationship of Ste>>dte is satisfied, but it is assumed herein that the capacitance Cte 314 can be approximated by formula (9).

A capacitance Cte 315 formed by the transmission reference electrode 312 and a space will be described below. In general, if a disk of radius r [m] is placed in a space, a capacitance C [F] which is formed between the disk and the space can be found from the following formula (11):

[Formula 11]

$$C = 8\times\epsilon\times r[F] \tag{11}$$

If the transmission reference electrode 312 is a conductive disk of radius rtg=$2.5\times10^{-2}$ [m] (radius of −2.5 [cm]), the capacitance Cte 315 formed by the transmission reference electrode 312 and the space can be found by using the above-mentioned formula (11), as shown in the following formula (12). It is assumed here that the communication system 300 is placed in the air, the dielectric constant of the space can be approximated by the vacuum dielectric constant $\epsilon 0$.

[Formula 12]

$$Ctg = 8\times8.854\times10^{-12}\times2.5\times10^{-2} \approx 1.8\ [\text{pF}] \tag{12}$$

If the reception signal electrode 321 is the same in size as the transmission signal electrode 311 and the space between the reception signal electrode 321 and the communication medium 330 is the same as the space between the transmission signal electrode 311 and the communication medium 330, a capacitance Cre 324 which is formed by the reception signal electrode 321 and the communication medium 330 is 3.5 [pF] as in the case of the transmission side. If the reception reference electrode 322 is the same in size as the transmission reference electrode 312, a capacitance Crg 325 which is formed by the reception reference electrode 322 and a space is 1.8 [pF] as in the case of the transmission side. Accordingly, the combined capacitance Cx of the four electrostatic capacities Cte 314, Ctg 315, Cre 324 and Crg 325 can be expressed by using the above-mentioned formula (4), as shown in the following formula (13):

[Formula 13]

$$C_x = \frac{1}{\frac{1}{Cte} + \frac{1}{Ctg} + \frac{1}{Cre} + \frac{1}{Crg}} = \frac{1}{\frac{1}{3.5\times10^{-12}} + \frac{1}{1.8\times10^{-12}} + \frac{1}{3.5\times10^{-12}} + \frac{1}{1.8\times10^{-12}}} \approx 0.6\ [\mathrm{pF}] \tag{13}$$

More strictly,

Cx=0.525 [pF]

is obtained.

If it is assumed that: the frequency f of the signal source 313-1 is 1 [MHz]; the effective value Vtrms of the voltage generated by the signal source 313-1 is 2 [V]; and the resistance value of Rr 323-1 is set to 100K [Ω], the voltage Vrrms generated across Rr 323-1 can be found from the following formula (14):

[Formula 14]

$$V_{rrms} = \frac{Rr}{\sqrt{Rr^2 + \frac{1}{(2\pi f C_x)^2}}} \times V_{trms} = \frac{1\times10^5}{\sqrt{(1\times10^5)^2 + \frac{1}{(2\times\pi\times(1\times10^6)\times(0.6\times10^{-12}))^2}}} \times 2 \approx 0.71\ [V] \tag{14}$$

As is apparent from the above-mentioned result, it is possible to transmit signals from a transmitter to a receiver as a basic principle by using electrostatic capacities formed by spaces.

The above-mentioned electrostatic capacities of the transmission reference electrode and the reception reference electrode with respect to the respective spaces can be formed only if a space exits at the location of each of the electrodes. Accordingly, only if the transmission signal electrode and the reception signal electrode are coupled via the communication medium, the transmitter and the receiver can achieve stability of communication irrespective of their mutual distance.

Figure 5:
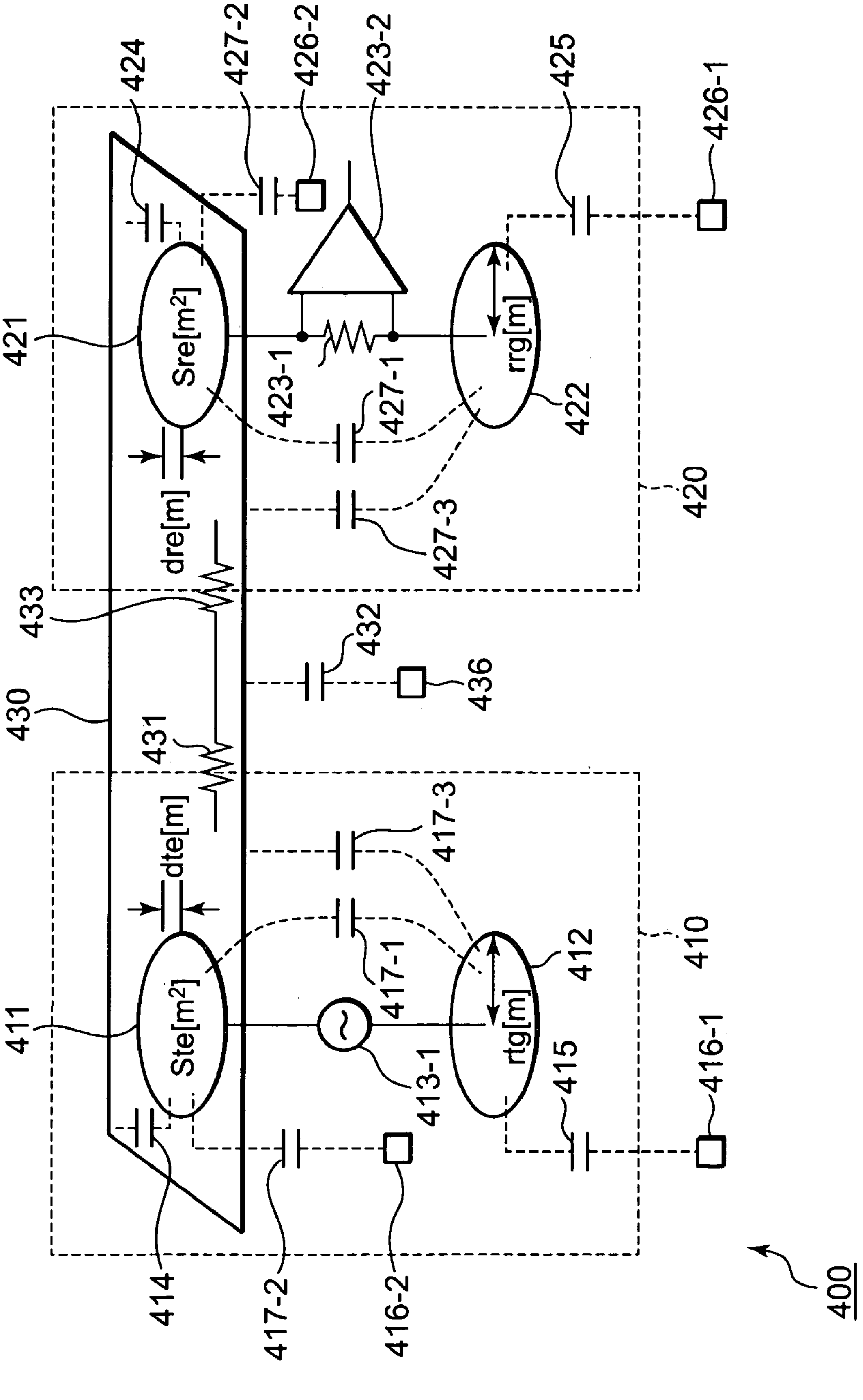
FIG. 5 is a diagram showing an example of a calculation model of each parameter generated in the model shown in FIG. 4.

The case where the present inventive communication system is actually physically constructed will be described below. FIG. 5 is a diagram showing an example of a calculation model for parameters generated in a case where any of the above-mentioned communication systems is actually physically constructed.

Namely, a communication system 400 has a transmitter 410, a receiver 420, and a communication medium 430, and is a system which corresponds to the above-mentioned communication system 100 (the communication system 200 or the communication system 300) and is basically the same in construction as any of the communication systems 100 to 300 except that parameters to be evaluated differ.

As compared with the communication system 300, the transmitter 410 corresponds to the transmitter 310, a transmission signal electrode 411 of the transmitter 410 corresponds to the transmission signal electrode 311, a transmission reference electrode 412 corresponds to the transmission reference electrode 312, and a signal source 413-1 corresponds to the signal source 313-1. The receiver 420 corresponding to the receiver 320, a reception signal electrode 421 of the receiver 420 corresponds to the reception signal electrode 321, a reception reference electrode 422 corresponds to the reception reference electrode 322, Rr423-1 corresponds to Rr323-1, and a detector 423-2 corresponds to the detector 323-2. In addition, the communication medium 430 corresponds to the communication medium 330.

Referring to the parameters, a capacitance Cte 414 between the transmission signal electrode 411 and the communication medium 430 corresponds to Cte 314 of the communication system 300, a capacitance Ctg 415 of the transmission reference electrode 412 with respect to a space corresponds to Ctg 315 of the communication system 300, and a ground point 416-1 indicative of an imaginary infinity point in a space outside the transmitter 410 corresponds to the ground point 316 of the communication system 300. The transmission signal electrode 411 is a disk-shaped electrode of area Ste [m2] and is provided at a location away from the communication medium 430 by a small distance dte [m]. The transmission reference electrode 412 is also a disk-shaped electrode and has a radius rtg [m].

In the receiver 420, a capacitance Cre 424 between the reception signal electrode 421 and the communication medium 430 corresponds to Cre 324 of the communication system 300, a capacitance Crg 425 of the reception reference electrode 422 with respect to a space corresponds to Crg 325 of the communication system 300, and a ground point 426-1 indicative of an imaginary infinity point in a space outside the receiver 420 corresponds to the ground point 326 of the communication system 300. The reception signal electrode 421 is a disk-shaped electrode of area Sre [m2] and is provided at a location away from the communication medium 430 by a small distance dre [m]. The reception reference electrode 422 is also a disk-shaped electrode and has a radius rrg [m].

The communication system 400 shown in FIG. 5 is a model in which the following new parameters are added to the above-mentioned parameters.

For example, regarding the transmitter 410, the following parameters are added as new parameters: a capacitance Ctb 417-1 formed between the transmission signal electrode 411 and the transmission reference electrode 412, a capacitance Cth 417-2 formed between the transmission signal electrode 411 and a space, and a capacitance Cti 417-3 formed between the transmission reference electrode 412 and the communication medium 430.

Regarding the receiver 420, the following parameters are added as new parameters: a capacitance Crb 427-1 formed between the reception signal electrode 421 and the reception reference electrode 422, a capacitance Crh 427-2 formed between the reception signal electrode reception signal electrode 421 and a space, and a capacitance Cri 427-3 formed between the reception reference electrode 422 and the communication medium 430.

Furthermore, regarding the communication medium 430, a capacitance Cm 432 formed between the communication medium 430 and a space is added as a new parameter. In addition, since the communication medium 430 actually has an electrical resistance based on its size, its material and the like, resistance values Rm 431 and Rm 433 are added as new parameters corresponding to the resistance component.

Although illustration is omitted in the communication system 400 shown in FIG. 5, if the communication medium 430 has not only conductivity but also dielectricity, a capacitance according to the dielectric constant is also formed. In addition, if the communication medium 430 does not have conductivity and a capacitance is formed by only dielectricity, the capacitance, which is determined by the dielectric constant, the distance, the size and the arrangement of the dielectric material of the communication medium 430, is formed between the transmission signal electrode 411 and the reception signal electrode 421.

In addition, in the communication system 400 shown in FIG. 5, it is assumed that the distance between the transmitter 410 and the receiver 420 is apart to such an extent that a factor such as their mutual capacitive coupling can be neglected (the influence of the capacitive coupling between the transmitter 410 and the receiver 420 can be neglected). If the distance is short, there may be a need for taking account of a capacitance between the electrodes in the transmitter 410 and a capacitance between the electrodes in the receiver 420 in accordance with the above-mentioned approach, depending on the positional relationship between the electrodes in the transmitter 410 and that between the electrodes in the receiver 420.

Figure 6:
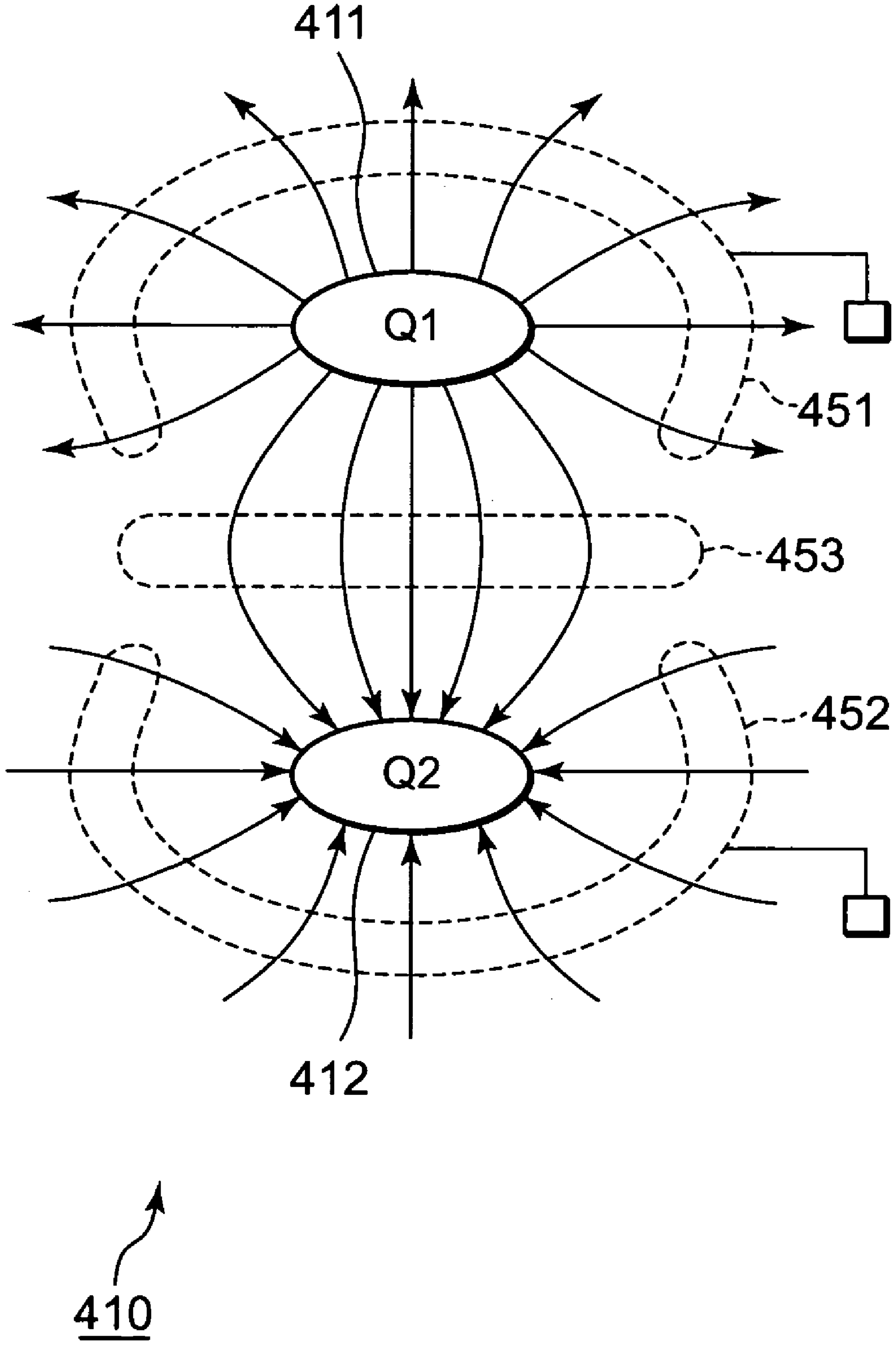
FIG. 6 is a schematic view showing an example of distribution of electric lines of force with respect to electrodes.

The operation of the communication system 400 shown in FIG. 5 will be described below by using electric lines of force. FIG. 6 is a schematic view in which the relationship between the electrodes in the transmitter 410 of the communication system 400 is represented by electric lines of force, and FIG. 7 is a schematic view in which the relationship between the electrodes in the transmitter 410 of the communication system 400 and the communication medium 430 is represented by electric lines of force.

FIG. 6 is a schematic view showing an example of distribution of electric lines of force in a case where the communication medium 430 does not exist. It is assumed that the transmission signal electrode 411 has positive charge (positively charged) and the transmission reference electrode 412 has negative charge (negatively charged). The arrows shown in FIG. 6 denote the electric lines of force, and the directions of the respective arrows are from positive charge to negative charge. The electric lines of force do not suddenly disappear halfway and have the nature of arriving at either an object having charge of a different sign or the imaginary infinity point.

In FIG. 6, from among the electric lines of force emitted from the transmission signal electrode 411, electric lines of force 451 denote electric lines of force arriving at the infinity point, while from among the electric lines of force turning toward the transmission reference electrode 412, electric lines of force 452 denote electric lines of force arriving from the imaginary infinity point. Electric lines of force 453 denote electric lines of force produced between the transmission signal electrode 411 and the transmission reference electrode 412. As shown in FIG. 6, electric lines of force move from the positively charged electrode 411 of the transmitter 410, while electric lines of force move toward the negatively charged transmission reference electrode 412 of the transmitter 410. The distribution of the electric lines of force is influenced by the size of each of the electrodes and the positional relationship therebetween.

Figure 7:
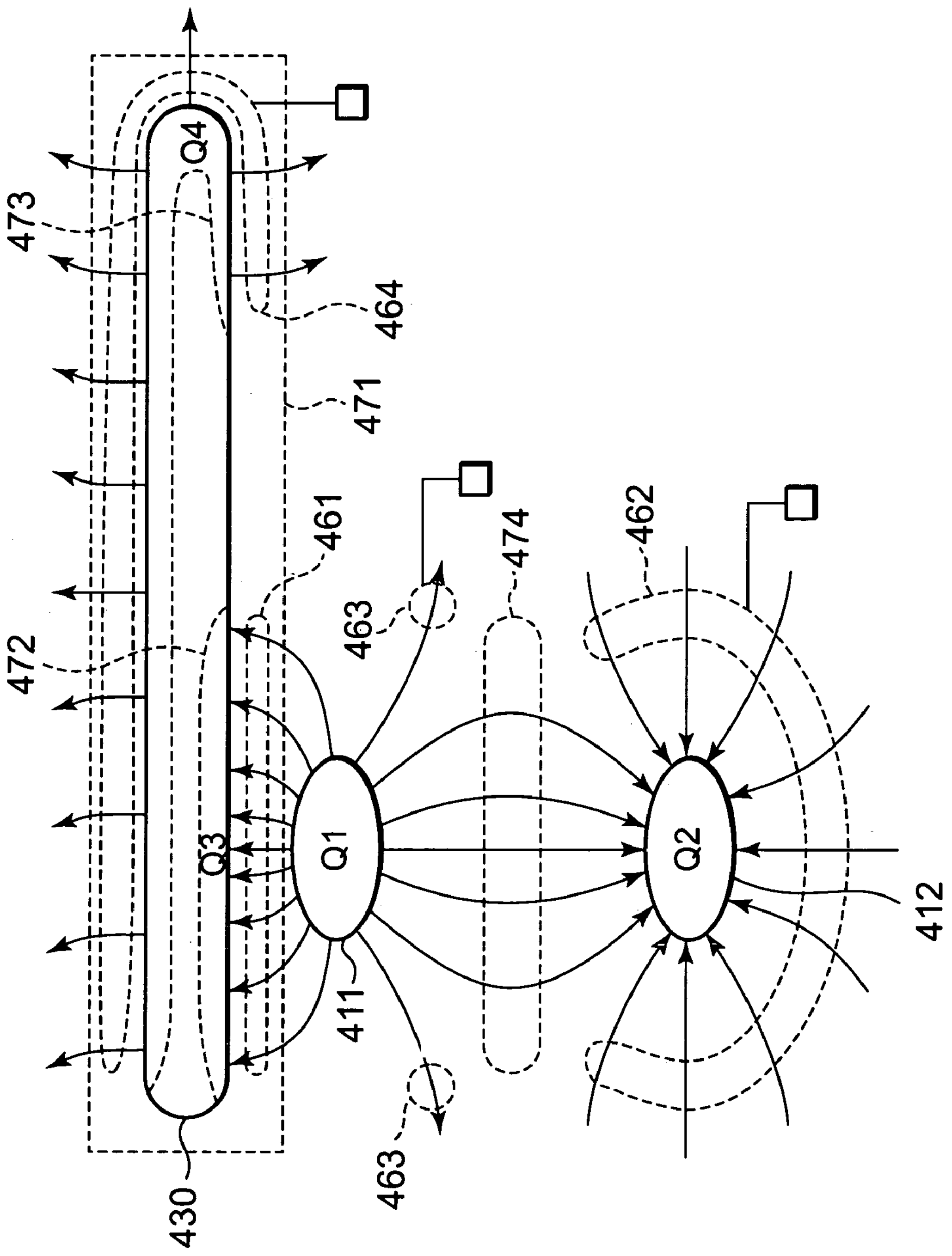
FIG. 7 is a schematic view showing another example of distribution of electric lines of force with respect to the electrodes.

FIG. 7 is a schematic view showing an example of electric lines of force in a case where the communication medium 430 is brought closer to the transmitter 410. As the communication medium 430 is brought closer to the transmission signal electrode 411, the coupling therebetween becomes stronger and most of the electric lines of force 451 arriving at the infinity point in FIG. 6 become electric lines of force 461 arriving at the communication medium 430, so that the number of electric lines of force 463 moving toward the infinity point (the electric lines of force 451 shown in FIG. 6) is decreased. Accordingly, the capacitance relative to the infinity point as viewed from the transmission signal electrode 411 (Cth 417-2 in FIG. 5) decreases, and the capacitance between the transmission signal electrode 411 and the communication medium 430 (Cth 417-2 in FIG. 5) increases. A capacitance (Cti 417-3 in FIG. 5) between the transmission reference electrode 412 and the communication medium 430 actually exists as well, but in FIG. 7, it is assumed that the capacitance is negligible.

According to Gauss's law, the number N of electric lines of force moving through an arbitrary closed surface S is equal to the charge enclosed in the closed surface S which is divided by the dielectric constant ε, and is not influenced by charge outside the closed surface S. When it is assumed that n-number of charges exist in the closed surface S, the following formula is obtained:

[Formula 15]

$$N = \frac{1}{\varepsilon} \times \sum_{i=1}^{n} q_i \text{ pieces} \tag{15}$$

In formula (15), i denotes an integer, and a variable qi denotes the amount of charge accumulated in each of the electrodes. Formula (15) represents that electric lines of force emerging from the closed surface S of the transmission signal electrode 411 are determined by only electric lines of force emanated from the charges existing in the closed surface S, and all electric lines of force entering from the outside of the transmission reference electrode 412 leave from other locations.

According to this law, in FIG. 7, if it is assumed that the communication medium 430 is not grounded, a generation source of charge does not exist in a closed surface 471 near the communication medium 430, charge Q3 is induced by electrostatic induction in an area 472 of the communication medium 430 near the electric lines of force 461. Since the communication medium 430 is not grounded and the total amount of charge of the communication medium 430 does not change, charge Q4 which is equivalent in amount to but different in sign from the charge Q3 is induced in an area 743 outside the area 472 in which the charge Q3 is induced, so that electric lines of force 464 produced by the charge Q4 move out of the closed surface 471. The larger the size of the communication medium 430 becomes, the more the charge Q4 diffuses and the lower the charge density becomes, so that the number of electric lines of force per section area decreases.

If the communication medium 430 is a perfect conductor, the communication medium 430 has the nature of becoming approximately equal in charge density irrespective of its sites, because the communication medium 430 has the characteristic that its potential becomes the same irrespective of the sites as the result of the nature of the perfect conductor. If the communication medium 430 is a conductor having a resistance component, the number of electric lines of force decreases according to the distance between the communication medium 430 and the transmission signal electrode 411 in accordance with the resistance component. If the communication medium 430 is a dielectric having no conductivity, electric lines of force are diffused and propagated by its polarization action. If n-number of conductors exist in a space, the charge Qi of each of the conductors can be found from the following formula:

[Formula 16]

$$Q_i = \sum_{j=1}^{n} C_{i,j} \times V_j) \tag{16}$$

In formula (16), i and j denote integers, and Cij denotes a capacitance coefficient formed by the conductor i and the conductor j and may be considered to have the same nature as capacitance. The capacitance coefficient is determined by only the shapes of the respective conductors and the positional relationship therebetween. The capacitance coefficient Cii becomes a capacitance that the conductor i itself forms with respect to a space. In addition, Cij=Cii. Formula (16) represents that a system formed by a plurality of conductors operates on the basis of the superposition theorem and that the charge of each of the conductors is determined by the sum of the products of the capacitance between the conductors and the potentials of the respective conductors.

It is assumed here that the mutually associated parameters shown in FIG. 7 and formula (16) are determined as follows. For example, Q1 denotes charge induced in the transmission signal electrode 411, Q2 denotes charge induced in the transmission reference electrode 412, Q3 denotes charge in the communication medium 430 by the transmission signal electrode 411, and Q4 denotes charge equivalent in amount to and different in sign to the charge Q3 in the communication medium 430.

V1 denotes the potential of the transmission signal electrode 411 with respect to the infinity point, V2 denotes the potential of the transmission reference electrode 412 with respect to the infinity point, V3 denotes the potential of the communication medium 430 with respect to the infinity point, C12 denotes the capacitance coefficient between the transmission signal electrode 411 and the transmission reference electrode 412, C13 denotes the capacitance coefficient between the transmission signal electrode 411 and the communication medium 430, C15 denotes the capacitance coefficient between the transmission signal electrode 411 and the space, C25 denotes the capacitance coefficient between the transmission reference electrode 412 and the space, and C35 denotes the capacitance coefficient between the communication medium 430 and the space.

At this time, the charge Q3 can be found from the following formula:

[Formula 17]

$$Q_3 = C13 \times V1 \tag{17}$$

Strictly, formula (17) is the following formula (17'), but since the second and third terms on the right-hand side of formula (17'), i.e., C23×V2+C53×V5, are small, formula (17) is used:

$$Q3 = C13 \times V1 + C23 \times V2 + C53 \times V5 \tag{17'}$$

If far more electric fields are to be injected into the communication medium 430, the charge Q3 may be increased. For this purpose, the capacitance coefficient C13 between the transmission signal electrode 411 and the communication medium 430 may be increased and a sufficient voltage V1 may be applied. The capacitance coefficient C13 is determined by only the shapes of the shapes of the transmission signal electrode 411 and the communication medium 430 and the positional relationship therebetween, and the closer the distance therebetween and the larger the areas of facing surfaces, the higher the capacitance therebetween. As to the potential Vi, a sufficient voltage need be produced as viewed from the infinity point. In the transmitter 410, a potential difference is applied between the transmission signal electrode 411 and the transmission reference electrode 412 by the signal source 413-1, and the behavior of the transmission reference electrode 412 is important so that the potential can be produced as a sufficient potential as viewed from the infinity point as well.

If the transmission reference electrode 412 is small in size and the transmission signal electrode 411 has a sufficiently large size, the capacitance coefficients C12 and C25 become small, whereas the capacitance coefficients C13, C15 and C45 become electrically less variable because each of them has a large capacitance. Accordingly, most of the potential differences generated by the signal source appear as the potential V2 of the transmission reference electrode 412, so that the potential V1 of the transmission signal electrode 411 becomes small.

Figure 8:
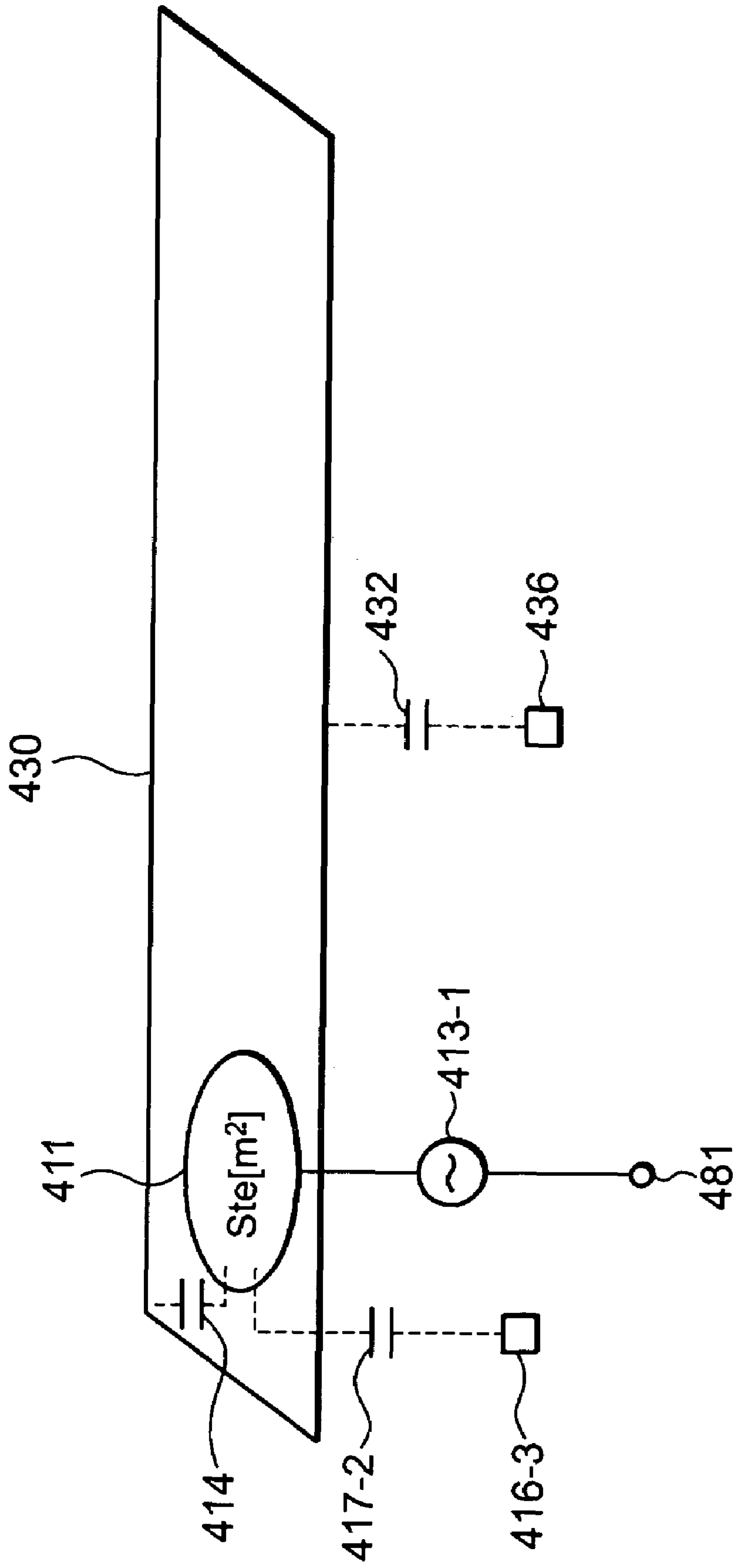
FIG. 8 is a diagram aiding in explaining another example of the model of electrodes in a transmitter.

FIG. 8 shows the above-mentioned status. A transmission reference electrode 481 is small in size and is not coupled to any of the conductors or the infinity point. The transmission signal electrode 411 forms the capacitance Cte 414 between itself and the communication medium 430, and forms the capacitance Cth 417-2 with respect to the space. The communication medium 430 forms a capacitance Cm 432 with respect to the space. Even if potentials are produced at the transmission signal electrode 411 and the transmission reference electrode 412, large energy is needed to vary these potentials, because the electrostatic capacities Cte 414, Cth 417-2 and Cm 432 associated with the transmission signal electrode 411 are overwhelmingly large. However, since the capacitance of the transmission reference electrode 481 on the opposite side of the signal source 413-1 is small, the potential of the transmission signal electrode 411 hardly varies, and most potential variations in the signal source 413-1 appear at the transmission reference electrode 481.

Contrarily, if the transmission signal electrode 411 is small in size and the transmission reference electrode 481 has a sufficiently large size, the capacitance of the transmission reference electrode 481 relative to the space increases and becomes to produce electrically less variation. Although a sufficient voltage Vi is produced at the transmission signal electrode 411, the capacitive coupling between the transmission signal electrode 411 and the communication medium 430 is decreased so that sufficient electric fields may not be injected.

Accordingly, on the basis of the balance of the entire system, it is necessary to provide a transmission reference electrode capable of giving a sufficient potential while enabling the electric fields necessary for communication to be injected from a transmission signal electrode to a communication medium. Although the above description has referred to only the transmission side, the relationship between the electrodes of the receiver 420 and the communication medium 430 can also be considered in the same manner.

The infinity point need not be at a physically long distance, and may be set in a space neighboring the device in practical terms. More ideally, it is desirable that the infinity point is more stable and does not show large potential variations in the entire system. In actual use environments, there is noise which is generated from AC power lines, illuminators and other electrical appliances, but such noise may be neglected if the noise does not overlap a frequency bandwidth to be used by at least a signal source or is of negligible level.

Figure 9:
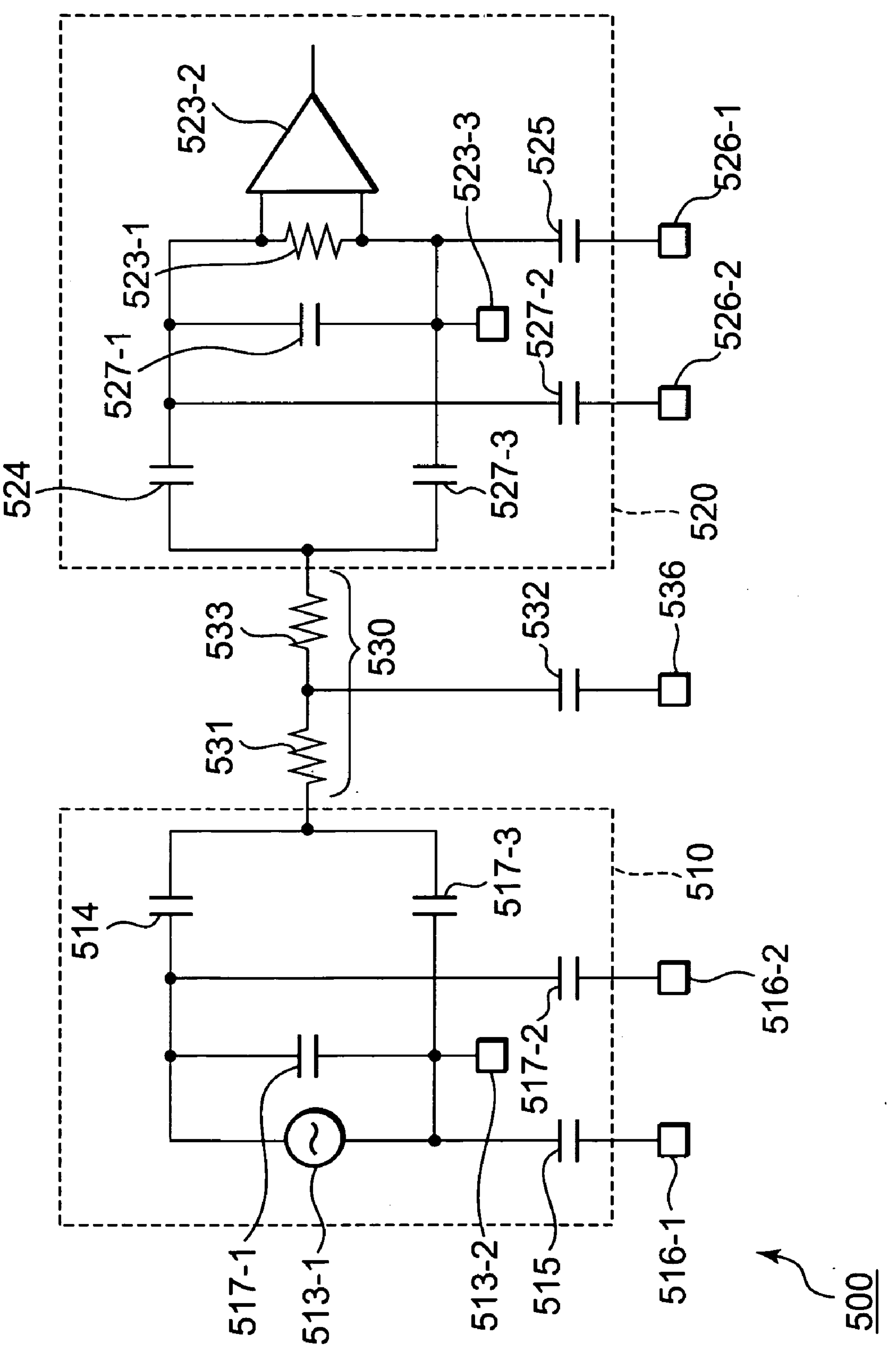
FIG. 9 is a diagram showing an example of an equivalent circuit of the model shown in FIG. 5.

FIG. 9 is a diagram showing an equivalent circuit of the model (the communication system 400) shown in FIG. 5.

As in the relationship between FIGS. 2 and 4, a communication system 500 shown in FIG. 9 corresponds to the communication system 400 shown in FIG. 5, a transmitter 510 of the communication system 500 corresponds to the transmitter 410 of the communication system 400, a receiver 520 of the communication system 500 corresponds to the receiver 420 of the communication system 400, and a connection line 530 of the communication system 500 corresponds to the communication medium 430 of the communication system 400.

Similarly, in the transmitter 510 shown in FIG. 9, a signal source 513-1 corresponds to the signal source 413-1. In the transmitter 510 shown in FIG. 9, there is shown a ground point 513-2 which is omitted in FIG. 5, corresponds to the ground point 213-2 in FIG. 2, and indicates ground in the circuit inside the transmitter section 113 shown in FIG. 1.

Cte 514 in FIG. 9 is a capacitance corresponding to Cte 414 in FIG. 5, Ctg 515 is a capacitance corresponding to Ctg 415 in FIG. 5, and ground points 516-1 and 516-2 respectively correspond to the ground points 416-1 and 416-2. In addition, Ctb 517-1, Cth 517-2 and Cti 517-3 are capacitances corresponding to Ctb 417-1, Cth 417-2 and Cti 417-3, respectively.

Similarly, in the receiver 520, Rr 523-1 and a detector 523-2 respectively correspond to Rr 423-1 and the detector 423-2 shown in FIG. 5. In addition, in the receiver 520 shown in FIG. 9, there is shown a ground point 523-3 which is omitted in FIG. 5, corresponds to the ground point 223-2 in FIG. 2, and indicates ground in the circuit inside the receiver section 123 shown in FIG. 1.

Cre 524 in FIG. 9 is a capacitance corresponding to Cre 424 in FIG. 5, Crg 525 is a capacitance corresponding to Crg 425 in FIG. 5, and ground points 526-1 and 526-2 respectively correspond to the ground points 426-1 and 426-2. In addition, Crb 527-1, Crh 527-2 and Cri 527-3 are capacitances corresponding to Crb 427-1, Crh 427-2 and Cri 427-3, respectively.

Similarly, as to elements connected to the connection line 530, Rm 531 and Rm 533 which are resistance components of the connection line 530 correspond to Rm 431 and Rm 433, respectively, Cm 532 corresponds to Cm 432, and a ground point 536 corresponds to the ground point 436.

The communication system 500 has the following nature.

For example, the larger the value of Cte 514 (the higher the capacitance), the larger signal the transmitter 510 can apply to the connection line 530 corresponding to the communication medium 430. In addition, the larger the value of Ctg 512 (the higher the capacitance), the larger signal the transmitter 510 can apply to the connection line 530. Furthermore, the smaller the value of Ctb 517-1 (the lower the capacitance), the larger signal the transmitter 510 can apply to the connection line 530. In addition, the smaller the value of Cth 512-2 (the lower the capacitance), the larger signal the transmitter 510 can apply to the connection line 530. Furthermore, the smaller the value of Cti 517-3 (the lower the capacitance), the larger signal the transmitter 510 can apply to the connection line 530.

The larger the value of Cre 524 (the higher the capacitance), the larger signal the receiver 520 can extract from the connection line 530 corresponding to the communication medium 430. In addition, the larger the value of Crg 525 (the higher the capacitance), the larger signal the receiver 520 can extract from the connection line 530. Furthermore, the smaller the value of Crb 527-1 (the lower the capacitance), the larger signal the receiver 520 can extract from the connection line 530. In addition, the smaller the value of Cth 527-2 (the lower the capacitance), the larger signal the transmitter 530 can extract from the connection line 530. Furthermore, the smaller the value of Cri 527-3 (the lower the capacitance), the larger signal the receiver 520 can extract from the connection line 530. In addition, the lower the value of Rr 523 (the lower the resistance), the larger signal the receiver 520 can extract from the connection line 530.

The lower the values of Rm 531 and Rm 533 which are the resistance components of the connection line 530 (the lower the resistances), the larger signal the transmitter 510 can apply to the connection line 530. The smaller the value of Cm 532 which is the capacitance of the connection line 530 with respect to the space (the lower the capacitance), the larger signal the transmitter 510 can apply to the connection line 530.

The capacitance of a capacitor is approximately proportional to the surface area of each of its electrodes, and in general, it is more desirable that each of the electrodes have a larger size. However, if the sizes of the respective electrodes are simply increased, there is a risk that the capacitance between the electrodes also increase. In addition, if the ratio of the sizes of the respective is extreme, there is a risk that the efficiency of the capacitor lowers. Accordingly, the sizes and the arrangement locations of the respective electrodes need be determined on the basis of the balance of the entire system.

In addition, the above-mentioned nature of the communication system 500 makes it possible to realize efficient communication in a high frequency bandwidth of the signal source 513-1 by determining the parameters of the present equivalent circuit by an impedance-matching approach. By increasing the frequency, it is possible to ensure reactance even with a small capacitance, so that it is possible to easily miniaturize each of the devices.

In general, the reactance of a capacitor increases with a decrease in frequency. On the other hand, since the communication system 500 operates on the basis of capacitive coupling, the lower limit of the frequency of a signal generated by the signal source 513-1 is determined by the capacitive coupling. In addition, since Rm 531, Rm 532 and Rm 533 form a low-pass filter through their arrangement, the upper limit of the frequency is determined by the characteristic of the low-pass filter.

Figure 10:
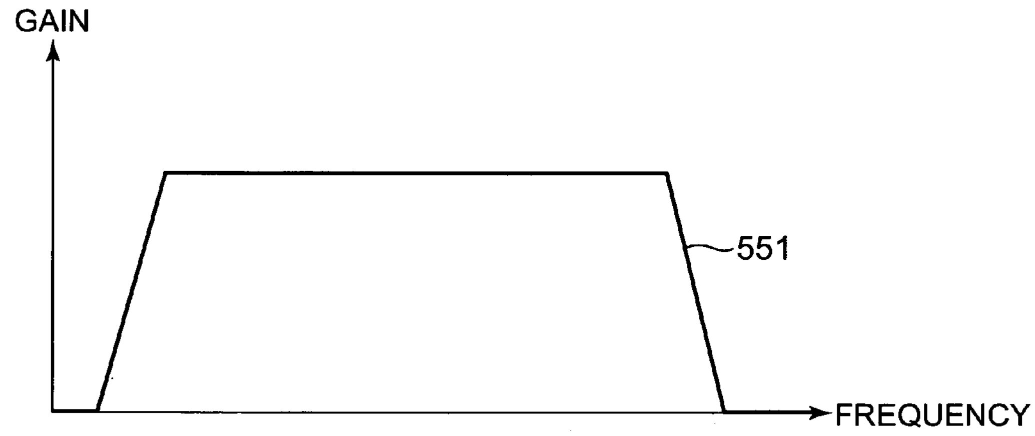
FIG. 10 is a graph showing an example of a frequency characteristic of the communication system shown in FIG. 9.

Specifically, the frequency characteristic of the communication system 500 is as indicated by a curve 551 in the graph shown in FIG. 10. In FIG. 10, the horizontal axis represents frequency, and the vertical axis represents the gain of the entire system.

Specific values of the respective parameters of each of the communication system 400 shown in FIG. 5 and the communication system 500 shown in FIG. 9 will be considered below. In the following description, for convenience of explanation, it is assumed that the communication system 400 (the communication system 500) is placed in the air. Each of the transmission signal electrode 411, the transmission reference electrode 412, the reception signal electrode 421 and the reception reference electrode 422 of the communication system 400 is assumed to be a conductive disk of diameter 5 cm.

In the communication system 400 shown in FIG. 5, if the distance d between the transmission signal electrode 411 and the communication medium 430 is 5 mm, the value of the capacitance Cte 414 formed by the transmission signal electrode 411 and the communication medium 430 can be found by using the above-mentioned formula (9), as shown in the following formula (18):

[Formula 18] (18)

$$Cte = \frac{(8.854\times10^{-12})\times(2\times10^{-3})}{5\times10^{-3}} \approx 3.5\ [\text{pF}]$$

It is assumed herein that Formula (9) can be adapted to Ctb 417-1 which is the capacitance between the electrodes (Ctg 517-1 in FIG. 9). As mentioned above, formula (9) is to be originally applied to the case where the surface area of the electrodes is sufficiently large compared to the distance therebetween. However, in the case of the communication system 400, the value of Ctb 417-1 is assumed to be able to be found by using formula (9), because the value of the capacitance Ctb 417-1 between the transmission signal electrode 411 and the transmission reference electrode 412, which is found by using formula (9), sufficiently approximates its original correct value so that a problem does not arise in the explanation of principles. If the distance between the electrodes is assumed to be 5 cm, Ctb 417-1 (Ctb 517-1 in FIG. 9] is as expressed by the following formula (19):

[Formula 19] (19)

$$Ctb = \frac{(8.854\times10^{-12})\times(2\times10^{-3})}{5\times10^{-2}} \approx 0.35\ [\text{pF}]$$

If it is assumed that the distance between the transmission signal electrode 411 and the communication medium 430 is narrow, the coupling of the transmission signal electrode 411 to the space is weak and the value of Cth 417-2 (Cth 517-2 in FIG. 9) is sufficiently smaller than the value of Cte 414 (Cte 514). Accordingly, the value of Cth 417-2 (Cth 517-2) is set to one-tenth of the value of Cte 414 (Cte 514) as expressed by formula (20):

[Formula 20] (20)

$$Cth = \frac{Cte}{10} = 0.35\ [\text{pF}]$$

Cteg 415 (Ctg 515 in FIG. 9) which denotes a capacitance formed by the transmission reference electrode 412 and the space can be found from the following formula (21), as in the case of FIG. 4 (formula (12)):

[Formula 21]

$$Ctg = 8\times8.854\times10^{-12}\times2.5\times10^{-2} \approx 1.8\ [\text{pF}] \quad (21)$$

The value of Cti 417-3 (the value of Cti 517-3 in FIG. 9) is considered equivalent to the value of Ctb 417-1 (Ctb 517-1 in FIG. 9) as follows:

Cti=Ctb=0.35 [pF]

If the constructions of the respective electrodes (the sizes and the installation locations of the respective electrodes) are set as in the case of the transmitter 410, the parameters of the receiver 420 (the receiver 520 shown in FIG. 9) can be set similarly to the parameters of the transmitter 410 as follows:

Cre=Cte=3.5 [pF]

Crb=Ctb=0.35 [pF]

Crh=Cth=0.35 [pF]

Crg=Ctg=1.8 [pF]

Cri=Cti=0.35 [pF]

In the following description, for convenience of explanation, it is assumed that the communication medium 430 (the connection line 530 shown in FIG. 9) is an object having characteristics close to a living body having approximately the same size as a human body. It is assumed that the electrical resistance from the location of the transmission signal electrode 411 of the communication medium 430 to the location of the reception signal electrode 421 (from the location of a transmission signal electrode 511 to the location of a reception signal electrode 521 in FIG. 9) is 1M [Ω], and that the value of each of Rm 431 and the Rm 433 (Rm 531 and Rm 533 in FIG. 9) is 500K [Ω]. In addition, it is assumed that the value of the capacitance Cm 432 (Cm 532 in FIG. 9] formed between the communication medium 430 and the space is 100 [pF].

Furthermore, it is assumed that the signal source 413-1 (the signal source 513-1 in FIG. 9) outputs a sine wave having a maximum value of 1 [V] and a frequency of 10M [Hz].

Figure 11:
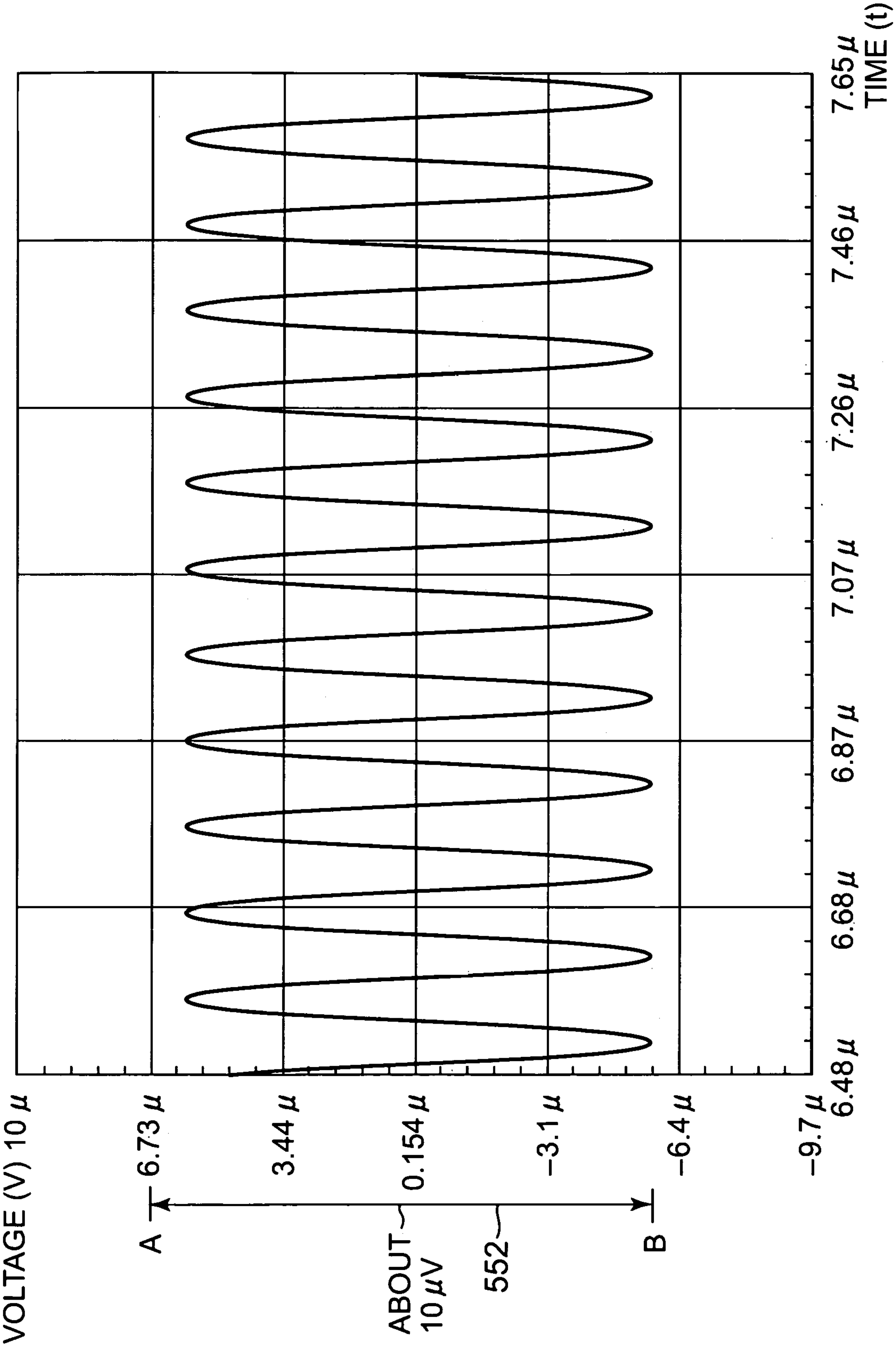
FIG. 11 is a graph showing an example of a signal received by a receiver.

When a simulation is performed by using the above-mentioned parameters, a received signal having the waveform shown in FIG. 11 is obtained as the result of the simulation. In the graph shown in FIG. 11, the vertical axis represents the voltage across Rr 423-1 (Rr 523-1) which is a reception load of the receiver 420 (the receiver 520 shown in FIG. 9), while the horizontal axis represents time. As indicated by an double-headed arrow 525 in FIG. 11, the difference between a maximum value A and a minimum value B (the difference between peak values) of the waveform of the received signal is observed as approximately 10 [μF]. Accordingly, since this difference is amplified by an amplifier having sufficient gain (the detector 423-2), the signal on the transmission side (the signal generated by the signal source 413-1) can be restored on the reception side.

Accordingly, the above-mentioned communication system does not need a physical reference point path and can realize communication based on only a communication signal transmission path, so that it is possible to easily provide communication environments not restricted by use environments.

The arrangement of the electrodes in each of the transmission and receivers will be described below. As mentioned above, the respective electrodes have mutually different functions, and form capacitances with respect to the communication medium, the spaces and the like. Namely, the respective electrodes are capacitively coupled to different objects, and operate by using different capacitive couplings. Accordingly, a method of arranging the electrodes is a very important factor in effectively capacitively coupling the respective electrodes to the desired objects.

For example, in the communication system 400 shown in FIG. 5, if communication is to be efficiently performed between the transmitter 410 and the receiver 420, the individual electrodes need be arranged on the following conditions; that is to say, the devices 410 and 420 need satisfy, for example, the conditions that both the capacitance between the transmission signal electrode 411 and the communication medium 430 and the capacitance between the reception signal electrode 421 and the communication medium 430 are sufficient, that both the capacitance between the transmission reference electrode 412 and the space and the capacitance between the reception reference electrode 422 and the space are sufficient, that the capacitance between the transmission signal electrode 411 and the transmission reference electrode 412 and the capacitance between the reception signal electrode 421 and the reception reference electrode 422 are respectively smaller than the capacitance between the transmission signal electrode 411 and the communication medium 430 and the capacitance between the reception signal electrode 421 and the communication medium 430, and that the capacitance between the transmission signal electrode 411 and the space and the capacitance between the reception signal electrode 421 and the space are respectively smaller than the capacitance between the transmission reference electrode 412 and the space and the capacitance between the reception reference electrode 422 and the space.

Figure 12:
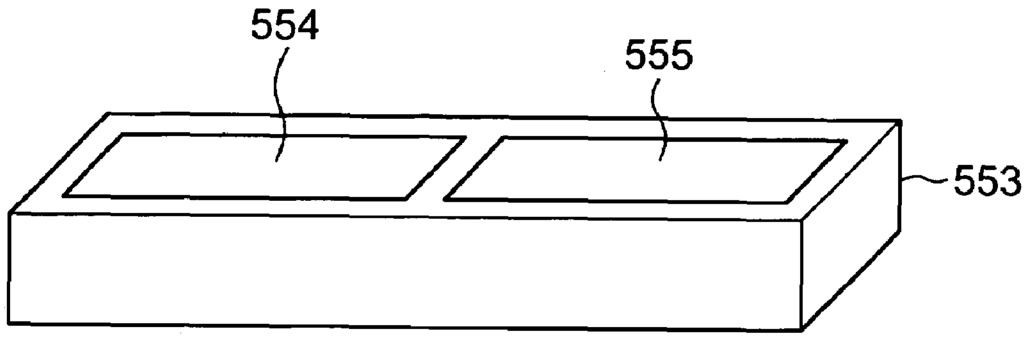
FIG. 12 is a schematic view showing an example of locations at which individual electrodes are disposed.

Arrangement examples of electrodes are shown in FIGS. 12 to 18. In the followings, description will be made on the transmitter. Referring to FIG. 12, two electrodes, i.e., a transmission signal electrode 554 and a transmission reference electrode 555, are arranged on the same plane of a casing 553. According to this construction, it is possible to decrease the capacitance between the two electrodes (the transmission signal electrode 554 and the transmission reference electrode 555), as compared with the case where the two electrodes are arranged to oppose each other. If the transmitter constructed in this manner is used, only one of the two electrodes is arranged close to a communication medium. For example, a folding mobile telephone has the casing 553 made of two units and a hinge section, and is constructed so that the two units are joined by the hinge-section with the relative angle between the two units being variable and so that the casing 553 is foldable on the hinge section in the vicinity of its lengthwise center. If the electrode arrangement shown in FIG. 12 is applied to the folding mobile telephone, one of the electrodes can be arranged on the back side of a section provided with operating buttons, while the other electrode is arranged on the back side of a section provided with a display section. According to this arrangement, the electrode arranged in the section provided with operating buttons is covered with a hand of a user, and the electrode provided on the back side of the display section is arranged to face space; that is to say, it is possible to arrange the two electrodes so as to satisfy the above-mentioned conditions.

Figure 13:
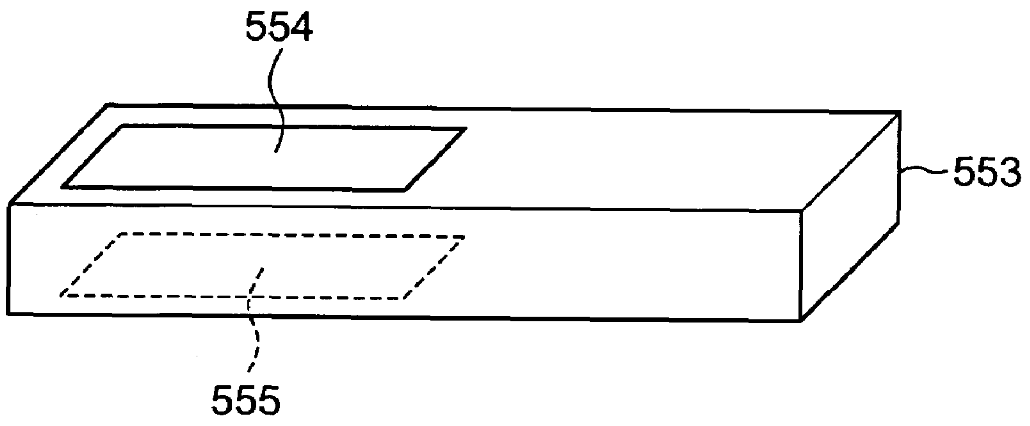
FIG. 13 is a schematic view showing another example of locations at which individual electrodes are disposed.

FIG. 13 is a schematic view showing the casing 553 in which the two electrodes (the transmission signal electrode 554 and the transmission reference electrode 555) are arranged to oppose each other. As compared with the arrangement shown in FIG. 12, the arrangement shown in FIG. 13 is suitable for the case where the casing 553 is comparatively small in size, although the capacitive coupling between the two electrodes is strong. In this case, it is desirable to arrange the respective two electrodes in directions spaced apart from each other by as much distance as possible in the casing 553.

Figure 14:
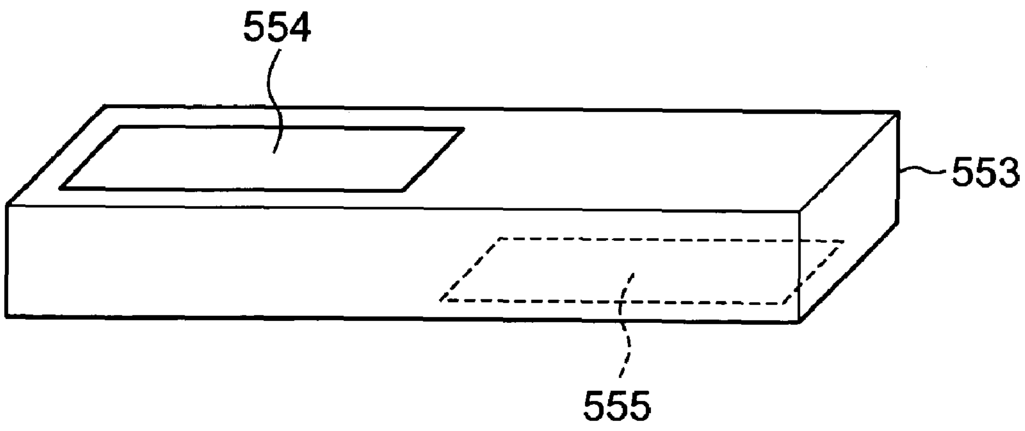
FIG. 14 is a schematic view showing another example of locations at which individual electrodes are disposed.

FIG. 14 is a schematic view showing the casing 553 in which the two electrodes (the transmission signal electrode 554 and the transmission reference electrode 555) are respectively arranged on mutually opposite faces so as not to directly oppose each other. In the case of this arrangement, the capacitive coupling between the two electrodes is smaller than that between the two electrodes shown in FIG. 13.

Figure 15:
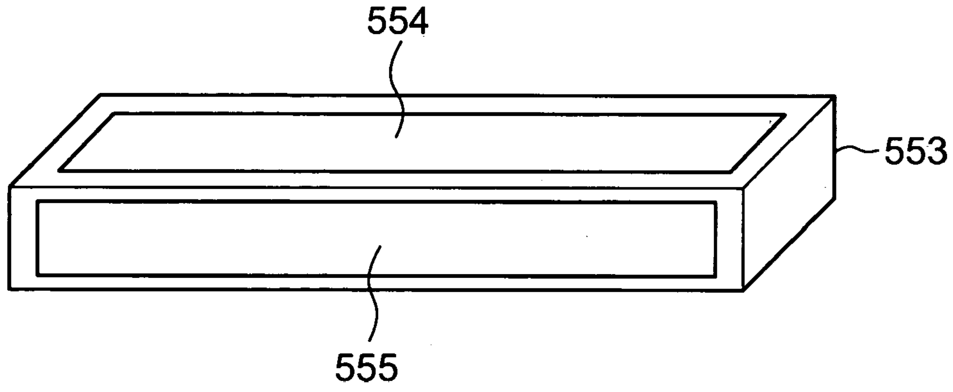
FIG. 15 is a schematic view showing another example of locations at which individual electrodes are disposed.

FIG. 15 is a schematic view showing the casing 553 in which the two electrodes (the transmission signal electrode 554 and the transmission reference electrode 555) are arranged perpendicular to each other. According to this arrangement, in uses where the transmission signal electrode 554 and the side of the casing 553 opposed thereto are placed near a communication medium, a lateral side of the casing 553 (a side on which the transmission reference electrode 555 is arranged) remains capacitively coupled to space, so that communication can be performed.

Figure 16B:
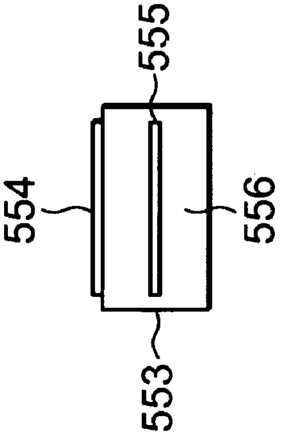
FIG. 16B is a schematic view showing another example of locations at which individual electrodes are disposed.
Figure 16A:
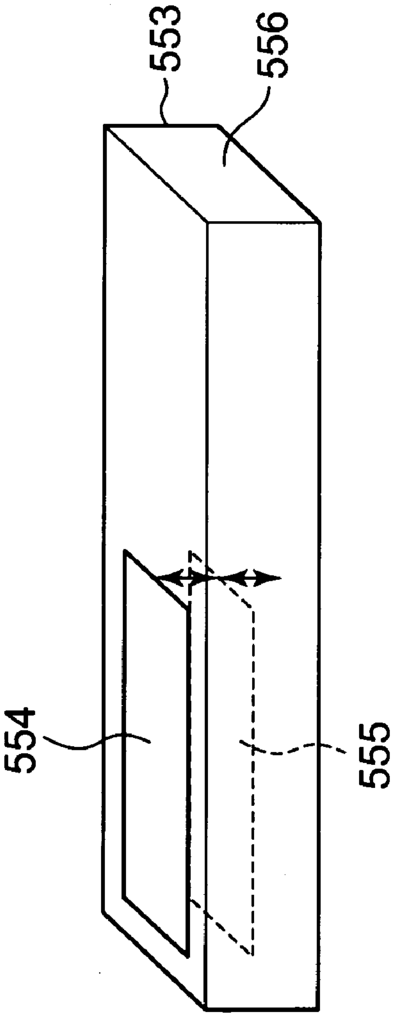
FIG. 16A is a schematic view showing another example of locations at which individual electrodes are disposed.

FIGS. 16A and 16B are schematic views showing that the transmission reference electrode 555 which is either one of the two electrodes in the arrangement shown in FIG. 13 is arranged inside the casing 553. Specifically, as shown in FIG. 16A, only the transmission reference electrode 555 is provided inside the casing 553. FIG. 16B is a schematic view showing an example of an electrode position as viewed from a side 556 of FIG. 16A. As shown in FIG. 16B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because the space inside the casing 553 exists around either one of the electrodes.

Figure 17A:
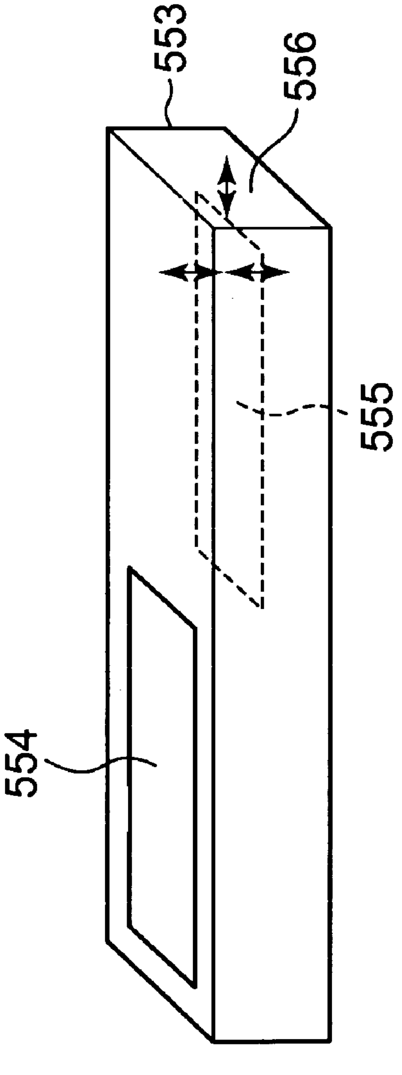
FIG. 17A is a schematic view showing another example of locations at which individual electrodes are disposed.
Figure 17B:
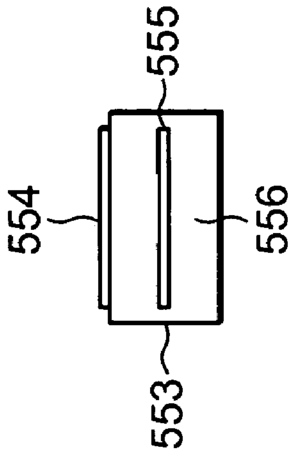
FIG. 17B is a schematic view showing another example of locations at which individual electrodes are disposed.

FIGS. 17A and 17B are schematic views showing that the transmission reference electrode 555 which is either one of the two electrodes in the arrangement shown in each of FIGS. 12 and 14 is arranged inside the casing 553. Specifically, as shown in FIG. 17A, only the transmission reference electrode 555 is provided inside the casing 553. FIG. 17B is a schematic view showing an example of an electrode position as viewed from the side 556 of FIG. 17A. As shown in FIG. 17B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

Figure 18B:
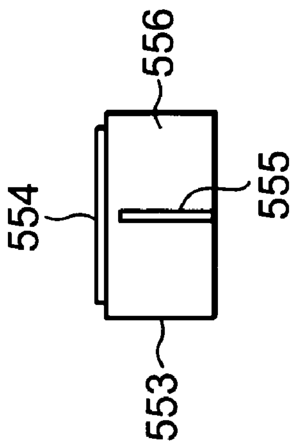
FIG. 18B is a schematic view showing another example of locations at which individual electrodes are disposed.
Figure 18A:
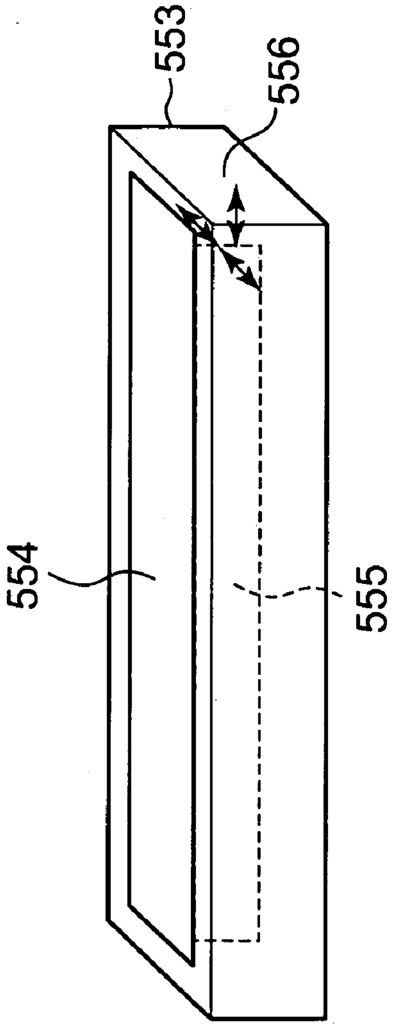
FIG. 18A is a schematic view showing another example of locations at which individual electrodes are disposed.

FIGS. 18A and 18B are schematic views showing that either one of the two electrodes in the arrangement shown in FIG. 15 is arranged inside the casing. Specifically, as shown in FIG. 18A, only the transmission reference electrode 555 is provided inside the casing 553. FIG. 18B is a schematic view showing an example of an electrode position as viewed from the side 556 of FIG. 18A. As shown in FIG. 18B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

In any of the above-mentioned electrode arrangements, one of the two electrodes is arranged closer to a communication medium than the other is, and the one is arranged to have a stronger capacitive coupling to space. In addition, in each of the electrode arrangements, the two electrodes are desirably arranged so that the capacitive coupling therebetween is weaker than the other capacitive couplings.

Figure 19A:
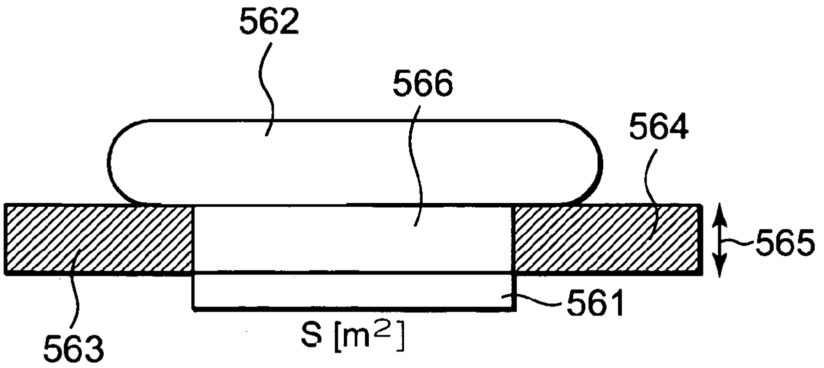
FIG. 19A is a schematic view showing another example of locations at which individual electrodes are disposed.
Figure 19B:
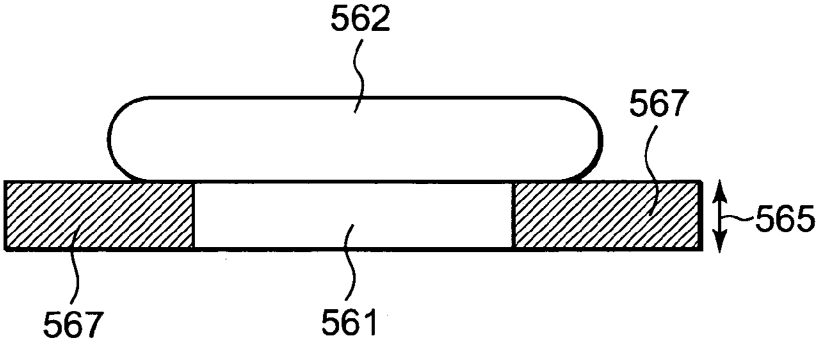
FIG. 19B is a schematic view showing another example of locations at which individual electrodes are disposed.

The transmitter or the receiver may also be incorporated in an arbitrary casing. In each of the devices according to the embodiment of the present invention, there are at least two electrodes which are electrically isolated from each other, so that a casing in which to incorporate the electrodes is also made of an insulator having a certain thickness. FIGS. 19A to 19B are cross-sectional views of a transmission signal electrode and neighboring sections. A transmission reference electrode, a reception signal electrode and a reception reference electrode have a similar construction to the transmission signal electrode, and the above description can be applied to any of those electrodes. Accordingly, the description of those electrodes is omitted herein.

FIG. 19A shows a cross-sectional view around the electrodes. As casings 563 and 564 have a physical thickness d [m] as indicated by a double-headed arrow 565, a space equal to the thickness is at least maintained between the electrodes and the communication medium (for example, between the transmission signal electrode 561 and the communication medium 562) or between the electrodes and the space. As is clear from the above-described, it is generally preferable to increase the capacitance between the electrodes and the communication medium, or between the electrodes and the space.

An example is considered in which the casings 563 and 564 are brought into contact with the communication medium 562. The capacitive coupling C between the transmission signal electrode 561 and the communication medium 562 in this case can be found from formula (9), and can therefore be expressed by the following formula (22).

[Formula 22] (22)

$$C = (\varepsilon_r \times \varepsilon_0) \times \frac{S}{d} \text{ [F]}$$

In formula (22), $\epsilon 0$ denotes a vacuum dielectric constant having a fixed value of $8.854\times10^{-12}$ [F/m], $\epsilon r$ denotes a specific dielectric constant at that location, and S denotes a surface area of the transmission signal electrode 561. If a dielectric having a high specific dielectric constant is arranged in the space 566 formed above the transmission signal electrode 561, the capacitive coupling C can be increased to improve the performance of the device.

In a similar manner, it is possible to increase the capacitance between the transmission signal electrode 561 and the neighboring space. The spacer 563 and the spacer 564 may also be constructed as part of the casing.

FIG. 19B shows an example in which the transmission signal electrode 561 is embedded in a casing 567. In this construction, the communication medium 562 is in contact with the casing 567 as well as the transmission signal electrode 561. In addition, an insulation layer may also be formed on the surface of the transmission signal electrode 561 so that the communication medium 562 and the transmission signal electrode 561 can be held in noncontact with each other.

Figure 19C:
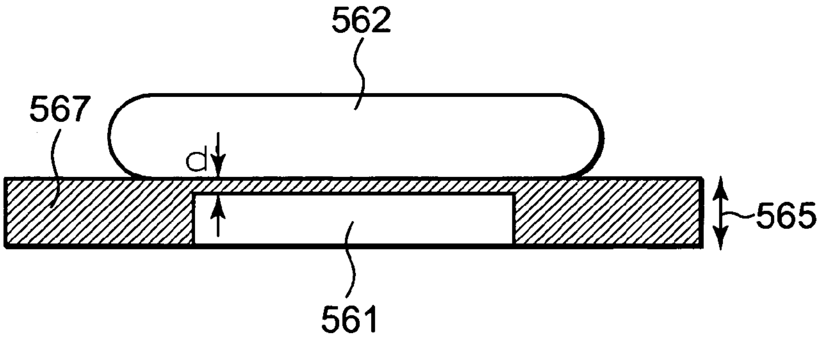
FIG. 19C is a schematic view showing another example of locations at which individual electrodes are disposed.

FIG. 19C is similar to FIG. 19B but shows an example in which a hollow having an opening area equivalent to the surface area of the transmission signal electrode 561 is formed in the casing 567 with a thickness d being left, and the transmission signal electrode 561 is embedded in the hollow. If the casing 567 is formed by solid casting, manufacturing costs and component costs can be reduced and capacitive coupling can be easily increased by the present method.

The sizes of individual electrodes will be described below. At least a transmission reference electrode and a reception reference electrode need to form a capacitance relative to a sufficient space so that a communication medium can obtained a sufficient potential, but a transmission signal electrode and a reception signal electrode may be designed to have optimum sizes on the basis of a capacitance relative to the communication medium and the nature of signals to flow in the communication medium. Accordingly, generally, the transmission reference electrode is made larger in size than the transmission signal electrode, and the reception reference electrode is made larger in size than the reception signal electrode. However, it is of course possible to adopt other relationships as long as sufficient signals for communication can be obtained.

Specifically, if the size of the transmission reference electrode is made coincident with the size of the transmission signal electrode and the size of the reception reference electrode is made coincident with the size of the reception signal electrode, these electrodes appear to have mutually equivalent characteristics, as viewed from a reference point which is an infinite point. Accordingly, there is the advantage that whichever electrode may be used as a reference electrode (or a signal electrode) (even if a reference electrode and a signal electrode are arranged to be able to be switched therebetween), it is possible to obtain equivalent communication performance.

In other words, there is the advantage that if the signal electrode and the reference electrode are designed to have mutually different sizes, communication can be performed only when one of the electrodes (an electrode which is set as a signal electrode) is moved close to the communication medium.

Shields of circuits will be described below. In the above description, a transmitter section and a receiver section other than electrodes have been regarded as transparent in the consideration of the physical construction of a communication system, but it is actually general that the communication system is constructed by using electronic parts and the like. Electronic parts are made of materials having some electrical nature such as conductivity or dielectricity, and such electronic parts exist near the electrodes and influence the operation of the electrodes. In the embodiment of the present invention, since capacitive couplings and the like in space have various influences, an electronic circuit itself mounted on a circuit board is exposed to such influences. Accordingly, if a far more stable operation is needed, it is desirable to shield the entire circuit with a conductor.

A shielding conductor is generally considered to be connected to a transmission reference electrode or a reception reference electrode which also serves as a reference potential for a transmission or receiver, but if there is no problem in operation, the shielded conductor may be connected to a transmission signal electrode or a reception signal electrode. Since the shielding conductor itself has a physical size, it is necessary to take account of the fact that the shielding conductor operates in mutual relationships to other electrodes, communication media and spaces in accordance with the above-mentioned principles.

Figure 20:
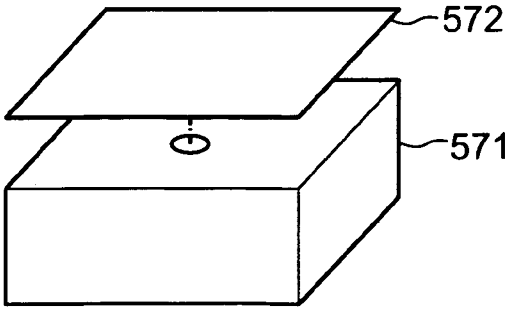
FIG. 20 is a schematic view showing another construction example of an electrode.

FIG. 20 shows an embodiment of a shielding construction. In this embodiment, the device is assumed to operate on a battery, and electronic parts inclusive of the battery are housed in a shield case 571 which also serves as a reference electrode. An electrode 572 is a signal electrode.

Transmission media will be described below. In the above description of the embodiments, reference has been made to conductors as a main example of a communication medium, but a dielectric having no conductivity also enables communication. This is because electric fields injected into the communication medium from a transmission signal electrode are propagated by the polarizing action of the dielectric.

Specifically, a metal such as electric wire is available as a conductor and pure water or the like is available as a dielectric, but a living body, a physiological saline solution or the like having both natures also enable communication. In addition, vacuum and air also have dielectricity and are communicable to serve as a communication medium.

Noise will be described below. In space, potential varies due to various factors such as noise from an AC power source, noise from a fluorescent lamp, various consumer electrical appliances and electrical equipment, and the influence of charged corpuscles in the air. In the above description, potential variations have been neglected, but these noises penetrate each section of the transmitter, the communication medium and the receiver.

Figure 21:
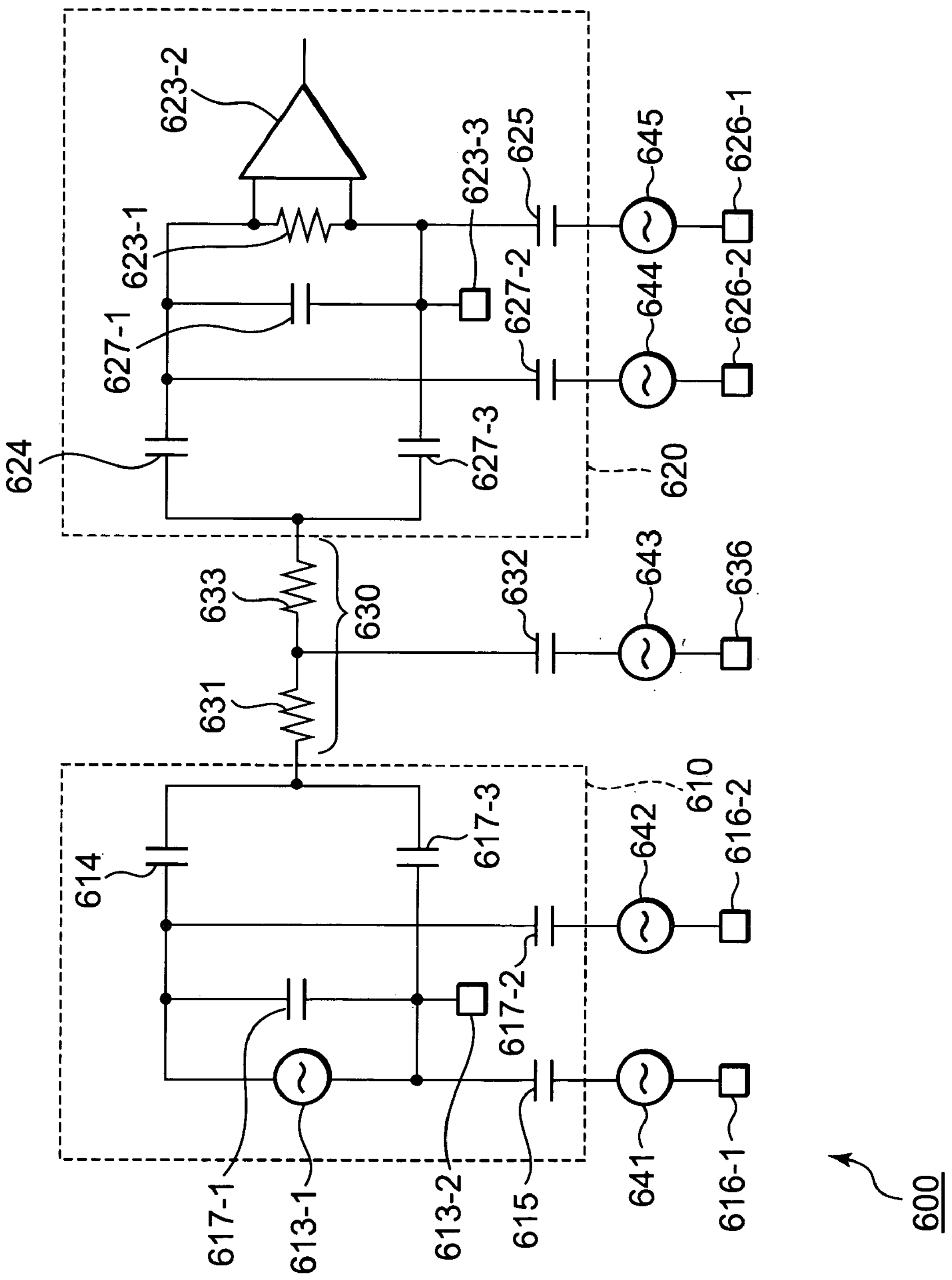
FIG. 21 is a diagram showing another example of an equivalent circuit of the model shown in FIG. 5.

FIG. 21 is a diagram showing an equivalent circuit of the communication system 100 shown in FIG. 1, inclusive of noise components. A communication system 600 shown in FIG. 21 corresponds to the communication system 500 shown in FIG. 9, a transmitter 610 of the communication system 600 corresponds to the transmitter 510 of the communication system 500, a receiver 620 corresponds to the receiver 520, and a connection line 630 corresponds to the connection line 530.

In the transmitter 610, a signal source 613-1, a ground point 613-2, Cte 614, Ctg 615, a ground point 616-1, a ground point 616-2, Ctb 617-1, Cth 617-2 and Cti 617-3 respectively correspond to the signal source 513-1, the ground point 513-2, Cte 514, Ctg 515, the ground point 516-1, the ground point 516-2, Ctb 517-1, Cth 517-2, and Cti 517-3 in the transmitter 510. Unlike the case shown in FIG. 9, in the transmitter 610, two signal sources, i.e., a noise 641 and a noise 642, are respectively provided between Ctg 615 and a ground point 616-1 and between Cth 617-2 and a ground point 616-2.

In the receiver 620, Rr 623-1, a detector 623-2, a ground point 623-3, Cre 624, Crg 625, a ground point 626-1, a ground point 626-2, Crb 627-1, Crh 627-2 and Cri 627-3 respectively correspond to Rr 523-1, the detector 523-2, the ground point 523-3, Cre 524, Crg 525, the ground point 526-1, the ground point 526-2, Crb 527-1, Crh 527-2, and Cri 527-3 in the receiver 520. Unlike the case shown in FIG. 9, in the receiver 620, two signal sources, i.e., a noise 644 and a noise 645, are respectively provided between Crh 627-2 and a ground point 626-2 and between Crg 625 and a ground point 626-1.

Rm 631, Cm 632, Rm 633 and a ground point 636 in the connection line 630 respectively correspond to Rm 531, Cm 532, Rm 533 and the ground point 536 in the connection line 530. Unlike the case shown in FIG. 9, in the connection line 630, a signal source which serves as a noise 643 is provided between Cm 632 and the ground point 636.

Each of the devices operates on the basis of the ground point 613-2 or 623-3 which is the ground potential of itself, so that if noises penetrating the devices have relatively the same components relative to the transmitter, the communication medium and the receiver, such noises have no influence in operation. On the other hand, particularly in a case where the distance between the devices is apart or in an environment where there is an amount of noise, there is a high possibility that a relative difference in noise occurs between the devices; that is to say, the motions of the noises 641 to 645 differ from one another. This difference has no problem if it is not accompanied by a temporal variation, because the relative difference between signal levels to be used need only be transmitted. However, in a case where the variation cycles of the respective noises overlap a frequency band to be used, a frequency and signal levels to be used need be determined to take the characteristics of the noises into account. In other words, if a frequency and signal levels to be used are only determined while taking noise characteristics into account, the communication system 600 can realize communication which has resistance to noise components and is based on only a communication signal transmission path without the need for a physical reference point path. Accordingly, it is possible to provide a communication environment which is not easily restricted by use environments.

The influence of the magnitude of distance between the transmitter and the receiver on communication will be described below. As mentioned previously, according to the principles of the present invention, if a sufficient capacitance is formed in the space between the transmission reference electrode and the reception reference electrode, communication does not need a path due to the ground near the transmission and receivers or other electrical paths, and does not depend on the distance between the transmission signal electrode and the reception signal electrode. Accordingly, for example, in a communication system 700 shown in FIG. 22, if a transmitter 710 and a receiver 720 are spaced a long distance apart from each other, it is possible to perform communication by capacitively coupling a transmission signal electrode 711 and a reception signal electrode 721 by a communication medium 730 having a sufficient conductivity or dielectricity. At this time, a transmission reference electrode 712 is capacitively coupled to a space outside the transmitter 710, and a reception reference electrode 722 is capacitively coupled to a space outside the receiver 720. Accordingly, the transmission reference electrode 712 and the reception reference electrode 722 need not be capacitively coupled to each other. However, as the communication medium 730 becomes longer or larger, the capacitance of the communication medium 730 to space increases, so that it is necessary to take the capacitance into account when each parameter is to be determined.

Figure 22:
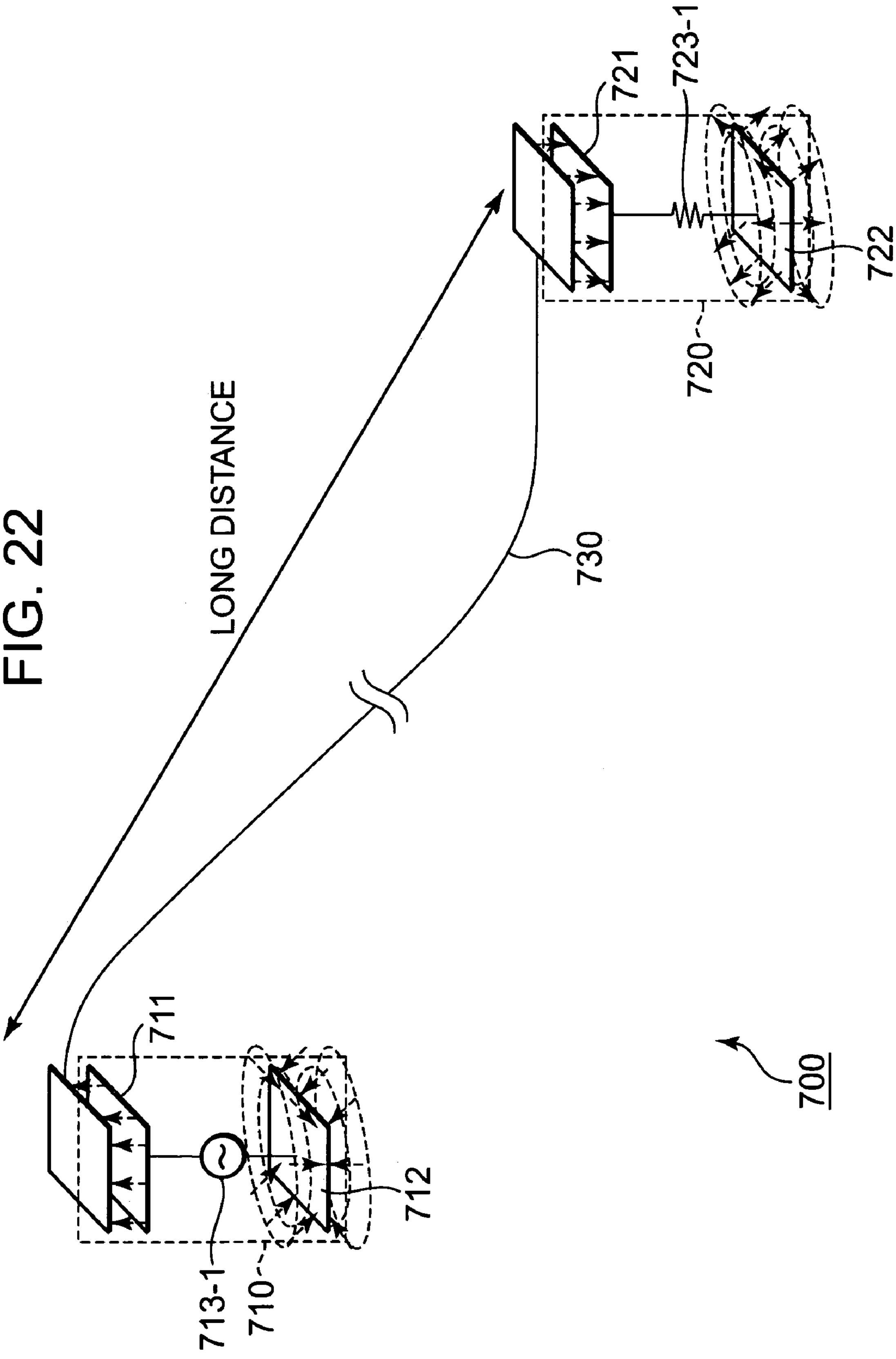
FIG. 22 is a diagram showing an arrangement example of the communication system shown in FIG. 1.

The communication system 700 shown in FIG. 22 is a system corresponding to the communication system 100 shown in FIG. 1, and the transmitter 710 corresponds to the transmitter 110, the receiver 720 corresponds to the receiver 120, and the communication medium 730 corresponds to the communication medium 130.

In the transmitter 710, the transmission signal electrode 711, the transmission reference electrode 712 and a signal source 713-1 respectively correspond to the transmission signal electrode 111, the transmission reference electrode 112 and (part of) the transmitter section 113. Similarly, in the transmission reference electrode 712, the reception signal electrode 721, the reception reference electrode 722 and the Rr 723-1 respectively correspond to the reception signal electrode 121, the reception reference electrode 122 and (part of) the receiver section 123.

The description of each of the above-mentioned sections is, therefore, omitted herein.

As mentioned above, the communication system 700 can realize communication which has resistance to noise components and is based on only a communication signal transmission path without the need for a physical reference point path. Accordingly, it is possible to provide a communication environment not restricted by use environments.

In the above description, the transmission signal electrode and the reception signal electrode have been mentioned as being in non-contact with the communication medium, but this construction is not limitative, and as long as a sufficient capacitance can be obtained between each of the transmission reference electrode and the reception reference electrode and the space neighboring the corresponding one of the transmission and receivers, the transmission signal electrode and the reception signal electrode may also be connected to each other by a communication medium having conductivity.

Figure 23:
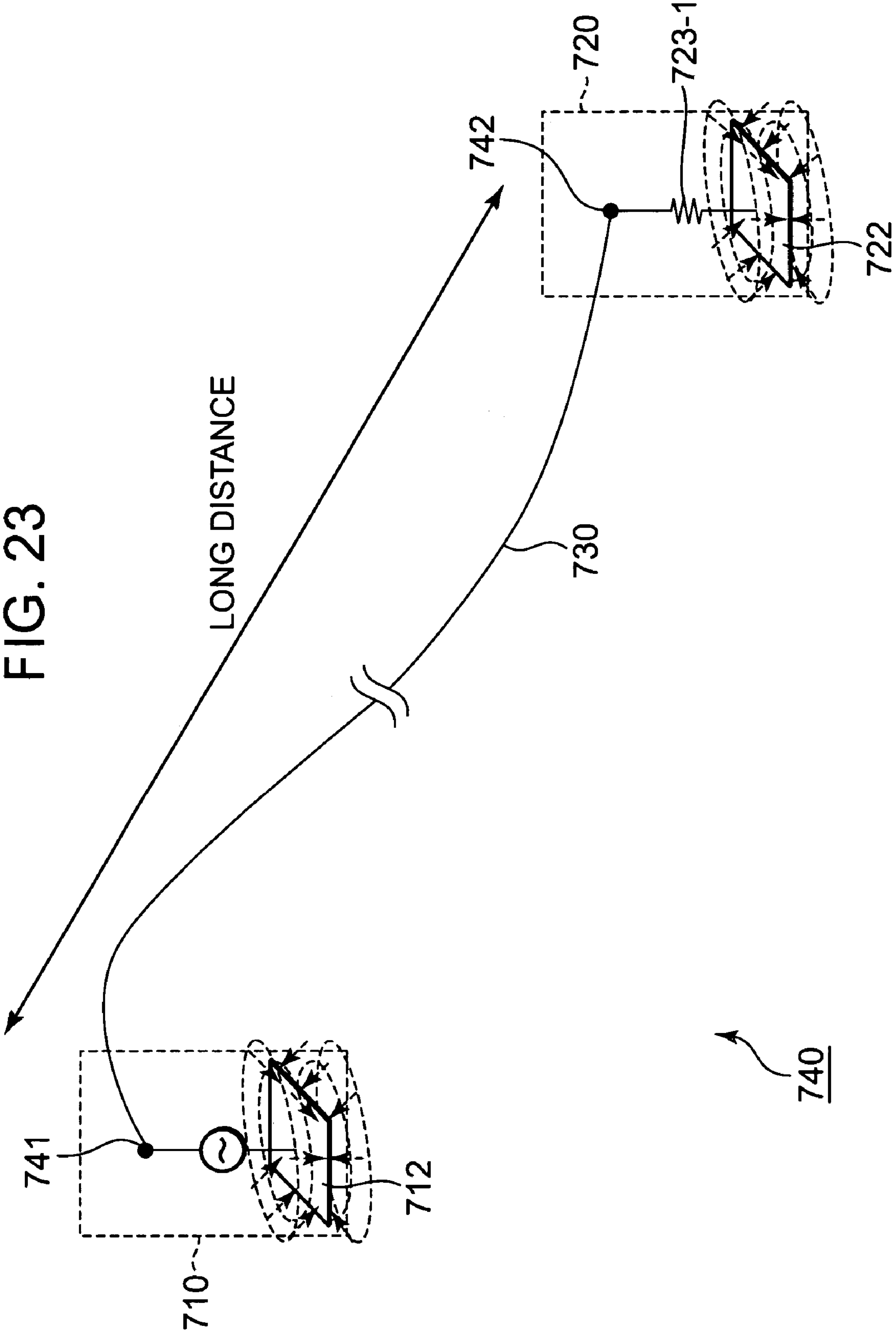
FIG. 23 is a diagram showing another construction example of the communication system which underlies the present invention.

FIG. 23 is a diagram aiding in explaining an example of a communication system in which a transmission reference electrode and a reception reference electrode are connected to each other via a communication medium.

In FIG. 23, a communication system 740 is a system corresponding to the communication system 700 shown in FIG. 22. In the case of the communication system 740, the transmission signal electrode 711 does not exist in the transmitter 710, and the transmitter 710 and the communication medium 730 are connected to each other at a contact 741. Similarly, in the receiver 720 in the communication system 740, the reception signal electrode 721 does not exist, and the receiver 720 and the communication medium 730 are connected to each other at a contact 742.

A general wired communication system includes at least two signal lines and is constructed to perform communication by using the relative difference in level between the signals. On the other hand, in accordance with the present invention, communication can be performed through one signal line.

Namely, the communication system 740 can also realize communication which is based on only a communication signal transmission path without the need for a physical reference point path. Accordingly, it is possible to provide a communication environment which is free from possible limitations of use environments.

Figure 24:
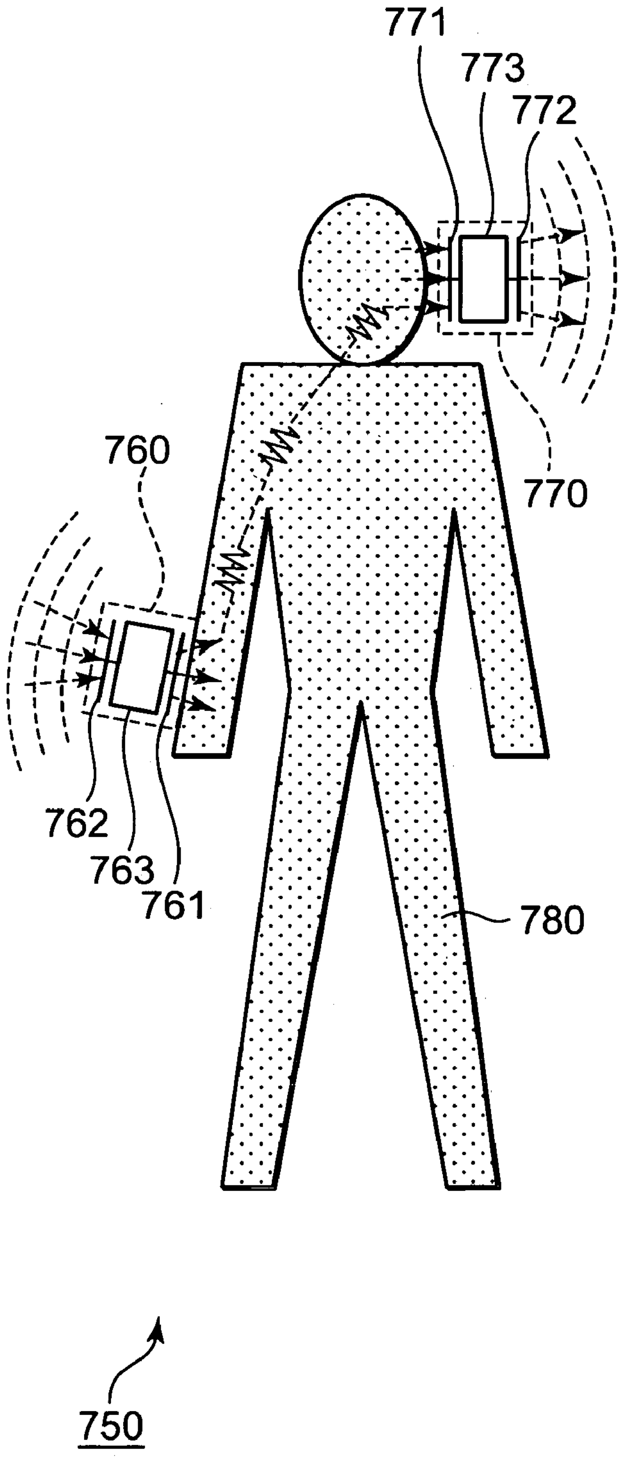
FIG. 24 is a schematic view showing an actual use example of the embodiment of the communication system which underlies the present invention.

Specific applied examples of the above-mentioned communication system will be described below. The communication system can use, for example, a living body as a communication medium. FIG. 24 is a schematic view showing an example of a communication system which performs communication via a living body. In FIG. 24, a communication system 750 is a system in which music data is transmitted from a transmitter 760 fitted to an arm of the body of a user and the music data is received and converted into sound by a receiver 770 fitted to the head of the body, and the sound is outputted so that the user can listen to the sound. The communication system 750 is a system corresponding to any of the above-mentioned communication systems (for example, the communication system 100), and the transmitter 760 and the receiver 770 correspond to the transmitter 110 and the receiver 120, respectively. In the communication system 750, a body 780 is a communication medium corresponding to the communication medium 130 shown in FIG. 1.

Namely, the transmitter 760 has a transmission signal electrode 761, a transmission reference electrode 762, and a transmitter section 763 which respectively correspond to the transmission signal electrode 111, the transmission reference electrode 112 and the transmitter section 113 shown in FIG. 1. The receiver 770 has a reception signal electrode 771, a reception reference electrode 772, and a receiver section 773 which respectively correspond to the reception signal electrode 121, the reception reference electrode 122 and the receiver section 123 shown in FIG. 1.

Accordingly, the transmitter 760 and the receiver 770 are arranged so that the transmission signal electrode 761 and the reception signal electrode 771 are brought into contact with or into close proximity to the body 780 which is a communication medium. Since the transmission reference electrode 762 and the reception reference electrode 772 may be in contact with space, there is no need for coupling to the ground around the devices nor for mutual coupling of the transmission and receivers (or electrodes).

Figure 25:
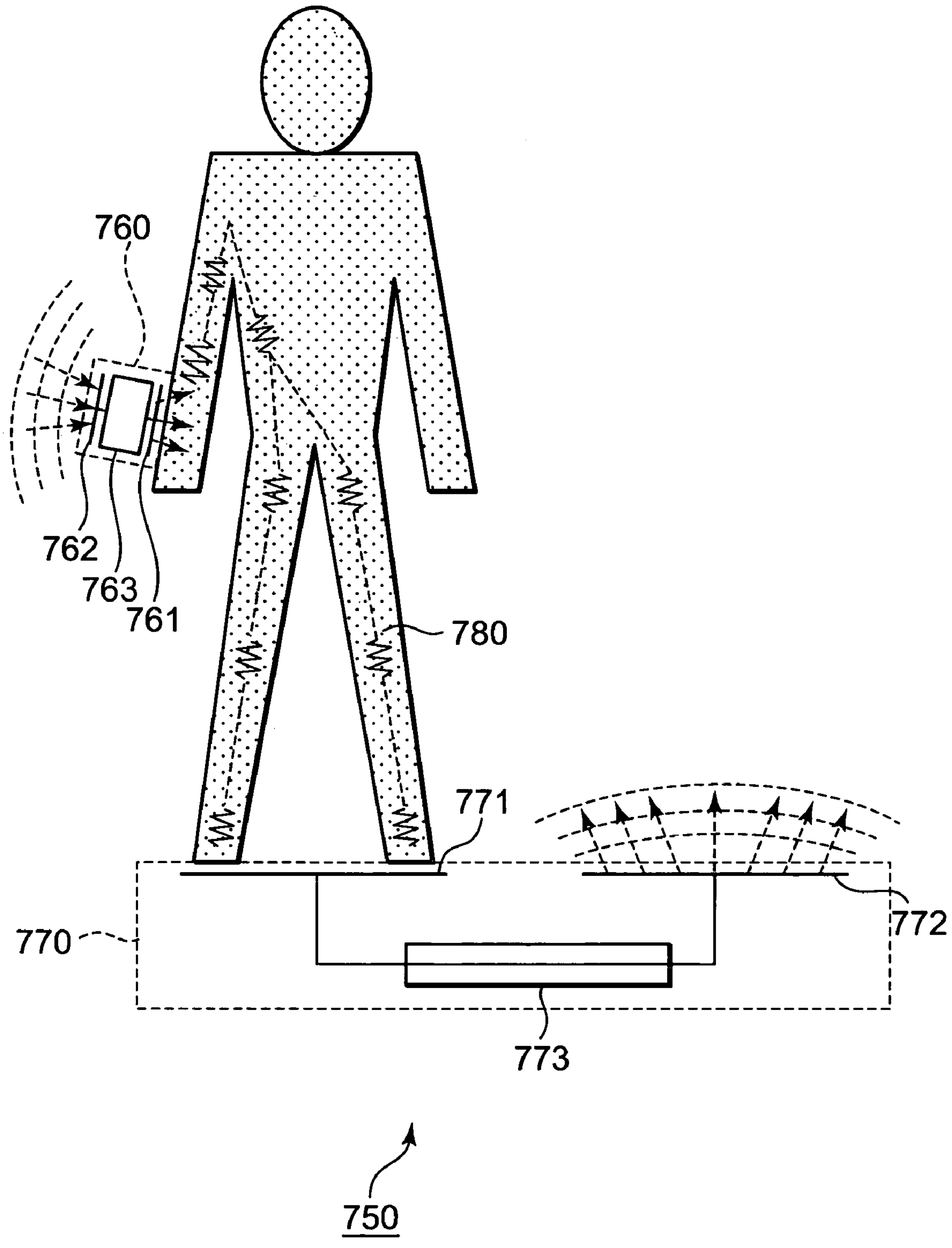
FIG. 25 is a schematic view showing another use example of the embodiment of the communication system which underlies the present invention.

FIG. 25 is a schematic view aiding in explaining another example which realizes the communication system 750. In FIG. 25, the receiver 770 is brought into contact with (or close proximity to) the soles of the body 780 and performs communication with the transmitter 760 fitted to an arm of the body 780. In this case well, the transmission signal electrode 761 and the reception signal electrode 771 are provided so as to be brought into contact with (or into close proximity to) the body 780 which is a communication medium, and the transmission reference electrode 762 and the reception reference electrode 772 are provided to face space. The example shown in FIG. 25 is particularly an applied example which could not have been realized by a prior art using the ground as one of communication media.

Namely, the above-mentioned communication system 750 can realize communication which is based on only a communication signal transmission path without the need for a physical reference point path. Accordingly, it is possible to provide a communication environment which is not restricted by use environments.

In each of the above-mentioned communication systems, the method of modulating signals to be transmitted through the communication medium is not limited to a particular method, and it is possible to select any optimum method on the basis of the characteristics of the entire communication system as long as the method can cope with both the transmitter section and the receiver. Specifically, as a modulation method, it is possible use any one of a baseband analog signal, an amplitude-modulated analog signal, a frequency-modulated analog signal and a baseband digital signal, or any one of an amplitude-modulated digital signal, a frequency-modulated digital sound and a phase-modulated digital signal, or a combination of a plurality of signals selected from among those signals.

In addition, each of the above-mentioned communication systems may be constructed to use one communication medium to establish a plurality of communications so that the communication system can execute communications such as full-duplex communication and communication between a plurality of devices through a single communication medium.

Examples of techniques for realizing such multiplex communications will be described below. The first technique is a technique using spread spectrum communication. In this case, a frequency bandwidth and a particular time series code are decided on between a transmitter and a receiver in advance. The transmitter varies the frequency of an original signal and spreads the original signal within the frequency bandwidth on the basis of the time series code, and transmits spread components. After having received the spread components, the receiver decodes the received signal by integrating the received signal.

Advantages obtainable by frequency spread will be described below. According to the Shannon-Hartley channel capacity theorem, the following formula is established:

[Formula 23] (23)

$$C = B \times \log_2\left(1 + \frac{S}{N}\right) \text{ [bps]}$$

In formula (23), C [bps] denotes a channel capacity which indicates a theoretically maximum data rate which can be transmitted in a communication path. B [Hz] denotes a channel bandwidth. S/N denotes a signal-to-noise-power ratio (SN ratio). In addition, if the above formula (23) is Maclaurin-expanded to decrease the SIN ratio, the above formula (23) can be approximated by the following formula (24):

[Formula 24] (24)

$$C \approx \frac{S}{N} \times B \text{ [bps]}$$

Accordingly, if S/N is not higher than, for example, a noise floor level, S/N<<1 is obtained, but the channel capacity C can be raised to a desired level by widening the channel bandwidth B.

If different time series codes are prepared for different communication paths so that frequency spreading is performed on the communication paths in different manners, their frequencies are spread without mutual interference, so that mutual interference can be suppressed to effect a plurality of communications at the same time.

Figure 26:
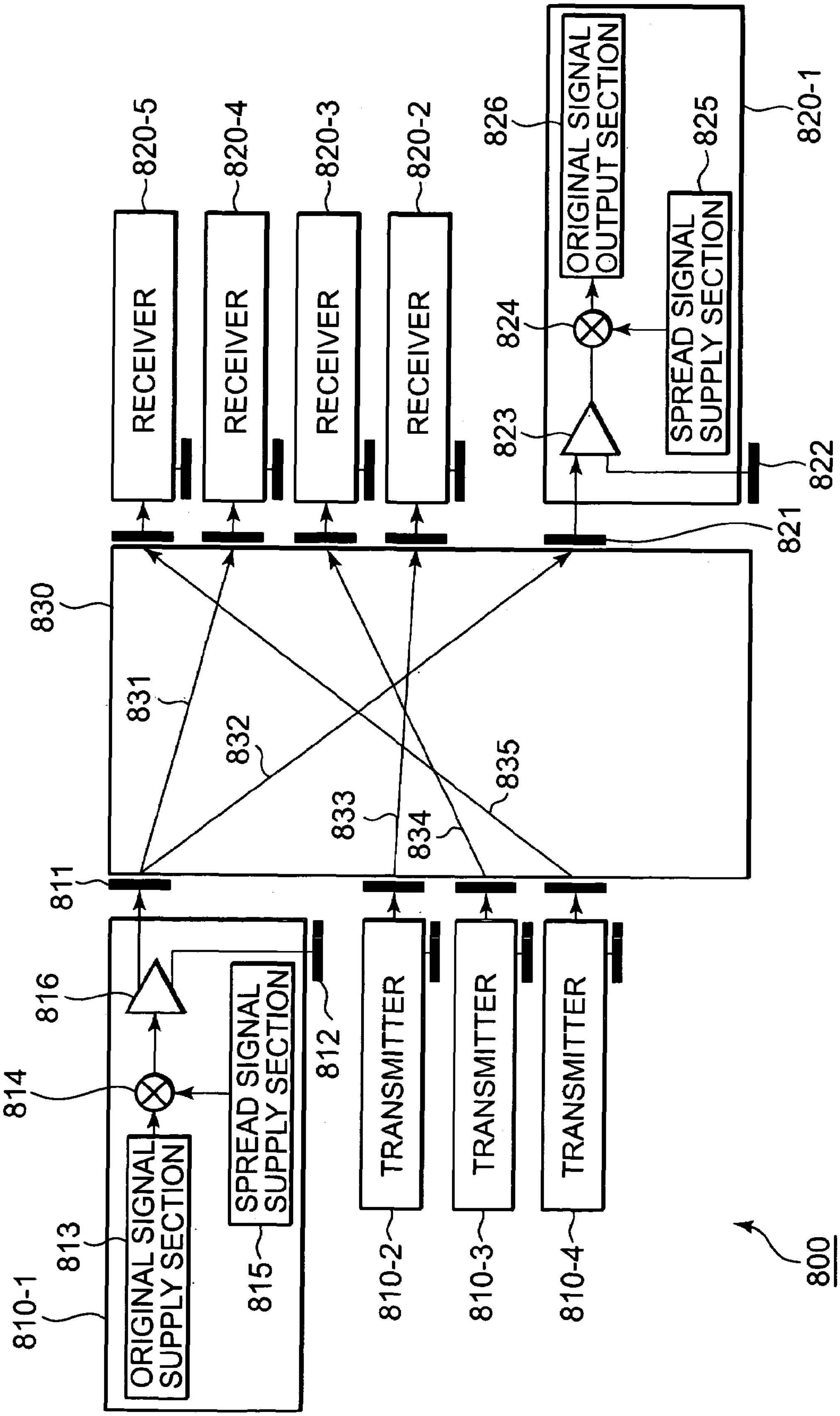
FIG. 26 is a schematic view showing another construction example of the communication system which underlies the present invention.

FIG. 26 is a diagram showing another construction example of the communication system which underlies the present invention. In a communication system 800 shown in FIG. 26, four transmitters 810-1 to 810-4 and five receivers 820-1 to 820-5 perform multiplex communications via a communication medium 830 by using a spread spectrum technique.

The transmitter 810-1 corresponds to the transmitter 110 shown in FIG. 1 and has a transmission signal electrode 811 and a transmission reference electrode 812, and further has, as a construction corresponding to the transmitter section 113, an original signal supply section 813, a multiplier 814, a spread signal supply section 815, and an amplifier 816.

The original signal supply section 813 generates an original signal which is a signal before the frequencies are spread, and supplies the signal to the multiplier 814. The spread signal supply section 815 generates a spread signal which spreads the frequencies, and supplies the spread signal to the multiplier 814. There are two representative spread techniques using spread signals, a direct sequence technique (hereinafter referred to as the DS technique) and a frequency hopping technique (hereinafter referred to as the FH technique). The DS technique is a technique which causes the multiplier 814 to perform multiplication on the time series code having a frequency component higher than at least the original signal. The result of the multiplication is carried on a predetermined carrier, and is outputted from the amplifier 816 after having been amplified by the same.

The FH technique is a technique which varies the frequency of a carrier by the time series code and generates a spread signal. The spread signal is multiplied by an original signal by the multiplier 814, and the multiplication result is outputted from the amplifier 816 after having been amplified by the same. One of the outputs of the amplifier 816 is connected to the transmission signal electrode 811, while the other is connected to the transmission reference electrode 812.

Each of the transmitters 810-2 to 810-4 is similar in construction to the transmitter 810-1, and since the description of the transmitter 810-1 is applicable, the repetition of the same description will be omitted.

The receiver 820-1 corresponds to the receiver 120 shown in FIG. 1, and has a reception signal electrode 821 and a reception reference electrode 822 and further has, as a construction corresponding to the receiver section 123, an amplifier 823, a multiplier 824, a spread signal supply section 825 and an original signal output section 826.

After the receiver 820-1 has first restored an electrical signal on the basis of the method according to the present invention, the receiver 820-1 restores the original signal (a signal supplied from the original signal supply section 813) by the signal processing opposite to that of the transmitter 810-1.

Figure 27:
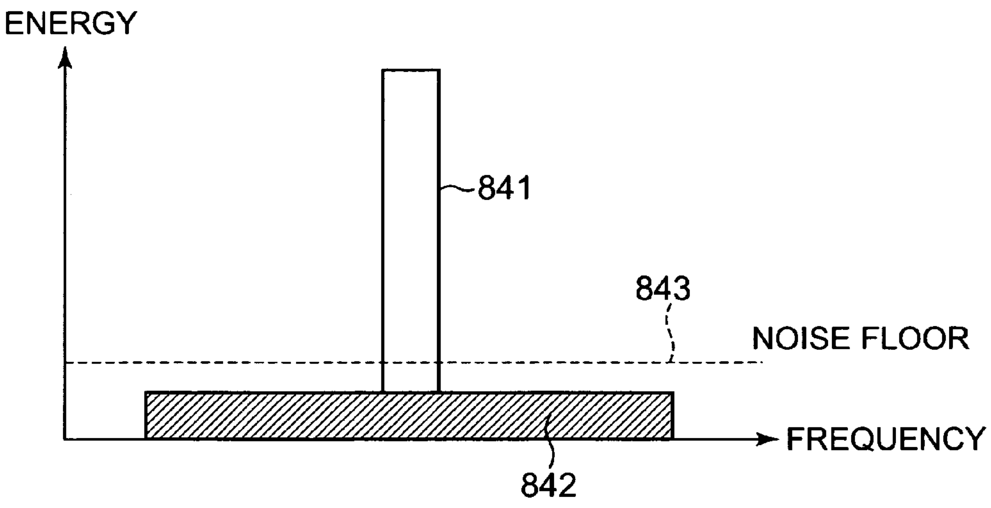
FIG. 27 is a graph showing an example of distribution of a frequency spectrum.

FIG. 27 shows a frequency spectrum due to such technique. The horizontal axis represents frequency, while the vertical axis represents energy. A spectrum 841 is a spectrum due to a technique based on a fixed frequency, and energy is concentrated at a particular frequency. This technique may not restore the signal if energy falls below a noise floor 843. On the other hand, a spectrum 842 is a spectrum based on a spread spectrum technique, and energy is spread over a wide frequency bandwidth. Since the area of the shown rectangle of the spectrum 842 can be regarded as denoting the total energy, the signal of the spectrum 842, although each frequency component thereof is below the noise floor 843, can be restored into the original signal by energy being integrated over the entire frequency bandwidth, so that communication can be performed.

By performing communication using the above-mentioned spread spectrum technique, the communication system 800 can perform simultaneous communications by using the same communication medium 830, as shown in FIG. 26. In FIG. 26, paths 831 to 835 denote communication paths on the communication medium 830. In addition, the communication system 800 can perform multiple-to-one communication as shown by the paths 831 and 832 as well as multiple-to-multiple communication by using the spread spectrum technique.

The second technique is a technique which causes a transmitter and a receiver to mutually decide on a frequency bandwidth and applies a frequency division technique for dividing the frequency bandwidth into a plurality of bands. In this case, the transmitter (or the receiver) performs allocation of a frequency band in accordance with particular rules of frequency allocation, or detects an idle frequency band at the time of start of communication and performs allocation of a frequency band on the basis of the detection result.

Figure 28:
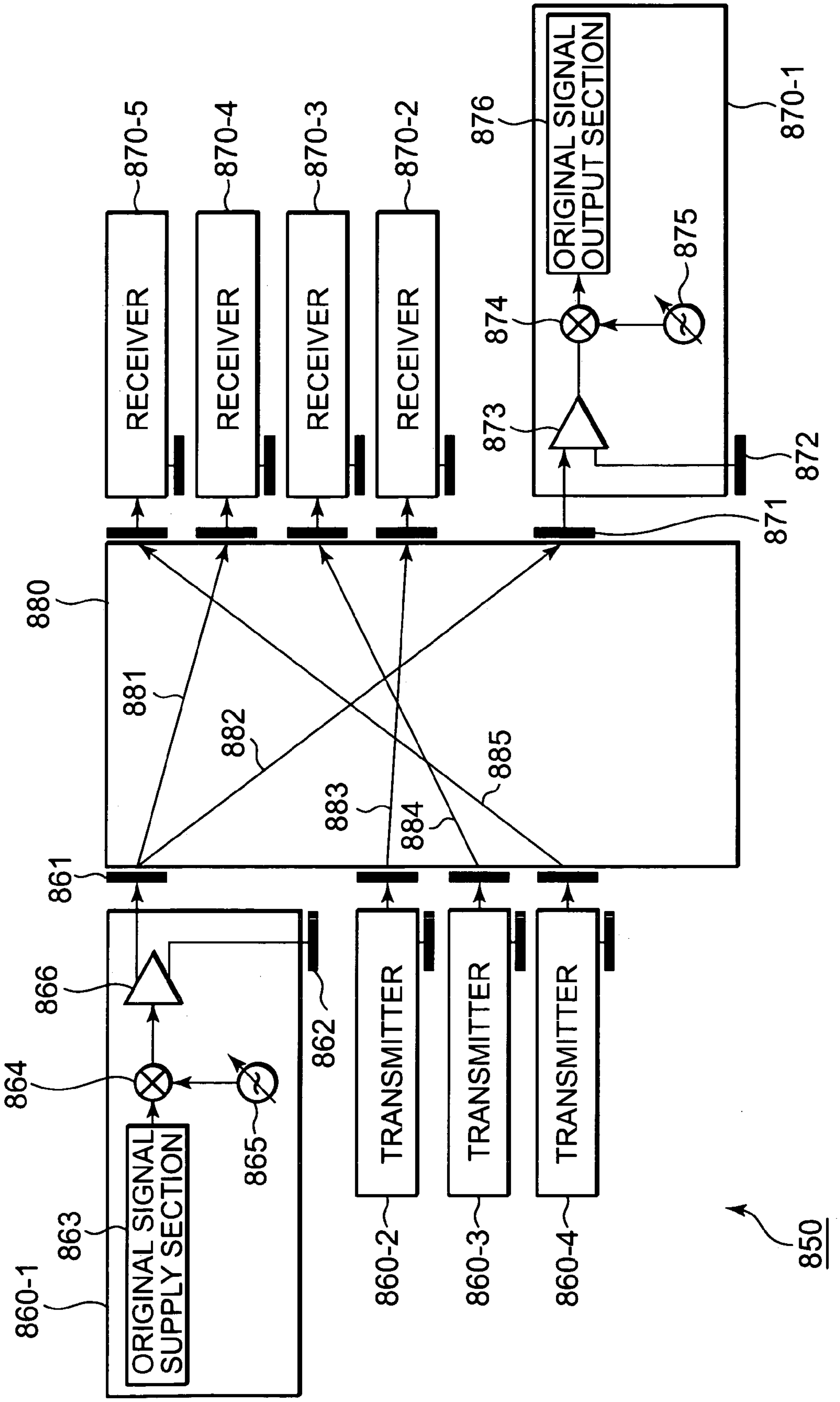
FIG. 28 is a schematic view showing another construction example of the communication system which underlies the present invention.

FIG. 28 is a diagram showing another construction example of the communication system which underlies the present invention. In a communication system 850 shown in FIG. 28, four transmitters 860-1 to 860-4 and five receivers 870-1 to 870-5 perform multiplex communications via a communication medium 880 by using a frequency division technique.

The transmitter 860-1 corresponds to the transmitter 110 shown in FIG. 1 and has a transmission signal electrode 861 and a transmission reference electrode 862, and further has, as a construction corresponding to the transmitter section 113, an original signal supply section 863, a multiplier 864, a frequency variable type oscillation source 865, and an amplifier 866.

An oscillation signal having a particular frequency component generated by the frequency variable type oscillation source 865 is multiplied by an original signal supplied from the original signal supply section 863, in the multiplier 864, and is outputted from the amplifier 866 after having been amplified in the same (it is assumed that filtering is appropriately performed). One of the outputs of the amplifier 866 is connected to the transmission signal electrode 861, while the other is connected to the transmission reference electrode 862.

Each of the transmitters 860-2 to 860-4 is similar in construction to the transmitter 860-1, and since the description of the transmitter 860-1 is applicable, the repetition of the same description will be omitted.

The receiver 870-1 corresponds to the receiver 120 shown in FIG. 1, and has a reception signal electrode 871 and a reception reference electrode 872 and further has, as a construction corresponding to the receiver section 123, an amplifier 873, a multiplier 874, a frequency variable type oscillation source 875 and an original signal output section 876.

After the receiver 870-1 has first restored an electrical signal on the basis of the method according to the present invention, the receiver 870-1 restores the original signal (a signal supplied from the original signal supply section 863) by the signal processing opposite to that of the transmitter 860-1.

Figure 29:
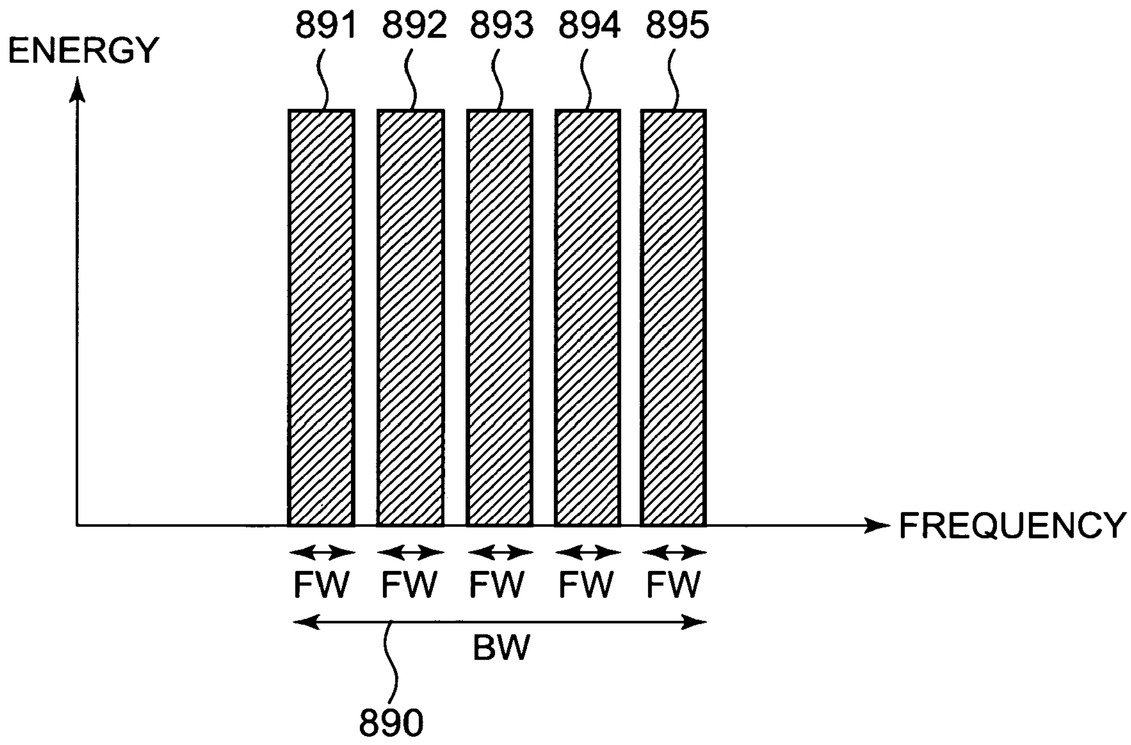
FIG. 29 is a graph showing an example of distribution of a frequency spectrum.

FIG. 29 shows an example of a frequency spectrum due to such technique. The horizontal axis represents frequency, while the vertical axis represents energy. For convenience of explanation, FIG. 29 shows an example in which an entire frequency bandwidth (BW) 890 is divided into five bandwidths (FW) 891 to 895. The divided frequency bandwidths are respectively used for communications on different communication paths. Namely, the transmitters 860-1 to 860-4 (the receivers 870-1 to 870-5) of the communication system 800 can perform a plurality of communications at the same time via the single communication medium 880 as shown in FIG. 28 while suppressing mutual interference by using the different frequency bands on the respective communication paths. In FIG. 28, paths 881 to 885 represent the respective communication paths on the communication medium 880. In addition, the communication system 850 can perform multiple-to-one communication as shown by the paths 881 and 882 as well as multiple-to-multiple communication by using the frequency division technique.

The communication system 850 (the transmitters 860-1 to 860-4 or the receivers 870-1 to 870-5) has been described above as being divided into the five bandwidths 891 to 895, but the number of division may be arbitrary and the sizes of the respective bandwidths may be made different from one another.

The third technique is a technique which applies a time division technique which causes a transmitter and receiver to mutually divide communication time therebetween. In this case, the transmitter (or the receiver) performs division of communication time in accordance with particular rules of time division, or detects an idle time zone at the time of start of communication and performs division of communication time on the basis of the detection result.

Figure 30:
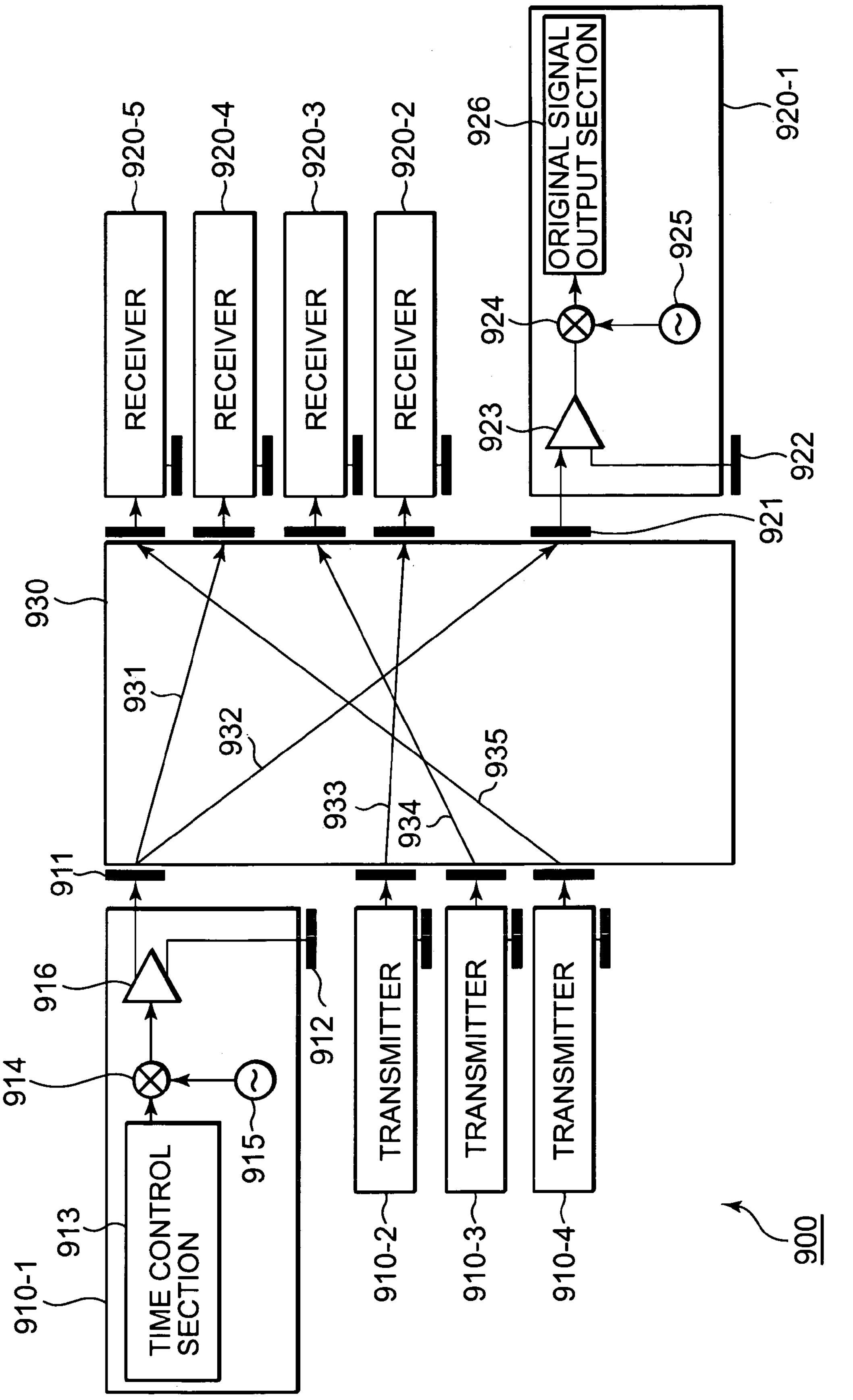
FIG. 30 is a diagram showing another construction example of the communication system which underlies the present invention.

FIG. 30 is a diagram showing another construction example of the communication system which underlies the present invention. In a communication system 900 shown in FIG. 30, four transmitters 910-1 to 910-4 and five receivers 920-1 to 920-5 perform multiplex communications via a communication medium 930 by using a time division technique.

The transmitter 910-1 corresponds to the transmitter 110 shown in FIG. 1 and has a transmission signal electrode 911 and a transmission reference electrode 912, and further has, as a construction corresponding to the transmitter section 113, a time control section 913, a multiplier 914, an oscillation source 915, and an amplifier 916.

An original signal is outputted by the time control section 913 at a predetermined time. The multiplier 914 multiplies the original signal by an oscillation signal supplied from the oscillation source 915, and the multiplication result is outputted from the amplifier 916 after having been amplified by the same (it is assumed that filtering is appropriately performed). One of the outputs of the amplifier 916 is connected to the transmission signal electrode 911, while the other is connected to the transmission reference electrode 912.

Each of the transmitters 910-2 to 910-4 is similar in construction to the transmitter 910-1, and since the description of the transmitter 910-1 is applicable, the repetition of the same description will be omitted.

The receiver 920-1 corresponds to the receiver 120 shown in FIG. 1, and has a reception signal electrode 921 and a reception reference electrode 922 and further has, as a construction corresponding to the receiver section 123, an amplifier 923, a multiplier 924, an oscillation source 925 and an original signal output section 926.

After the receiver 920-1 has first restored an electrical signal on the basis of the method according to the present invention, the receiver 920-1 restores the original signal (a signal supplied from the time control section 913) by the signal processing opposite to that of the transmitter 920-1.

Figure 31:
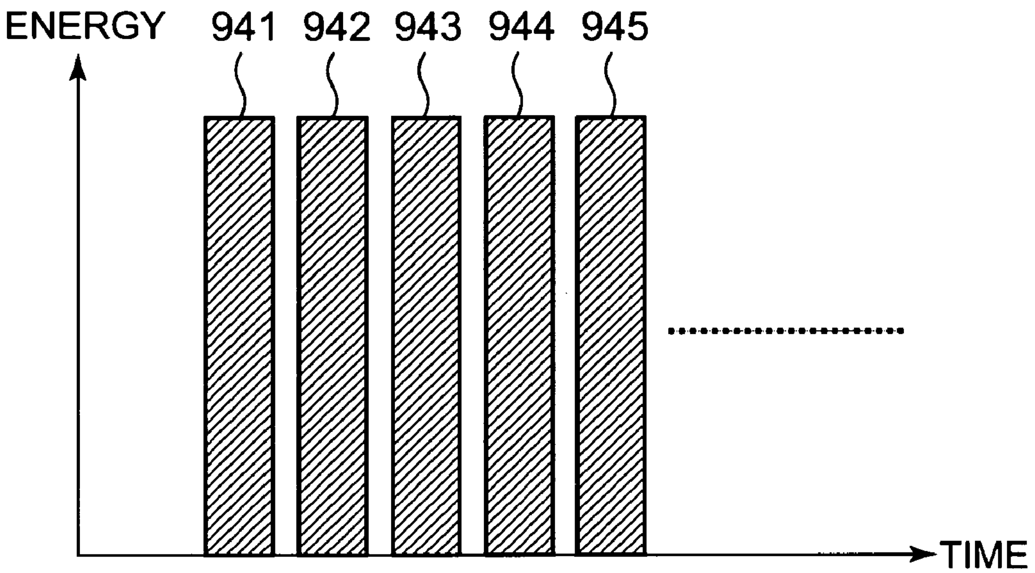
FIG. 31 is a graph showing an example of temporal distribution of a signal.

FIG. 31 shows an example of a frequency spectrum due to such technique, plotted along the time axis. The horizontal axis represents time, while the vertical axis represents energy. For convenience of explanation, FIG. 31 shows five time zones 941 to 945, but actually, time continues after the time zone 945 in a similar manner. The divided time zones are respectively used for communications on different communication paths. Namely, the transmitters 910-1 to 910-4 (the receivers 920-1 to 920-5) of the communication system 900 can perform a plurality of communications at the same time via the single communication medium 900 as shown in FIG. 30 while suppressing mutual interference by performing communications on the respective communication paths during different time zones. In FIG. 30, paths 931 to 935 represent the respective communication paths on the communication medium 930. In addition, the communication system 900 can perform multiple-to-one communication as shown by the paths 931 and 932 as well as multiple-to-multiple communication by using the time division technique.

In addition, the communication system 900 (the transmitter 910 or the receiver 920) may also be constructed so as to make the time widths of the respective time zones different from one another.

Furthermore, in addition to the above-mentioned methods, at least two of the first to third communication techniques may also be combined.

It is particularly important in particular applications that a transmitter and a receiver can perform a plurality of other devices at the same time. For example, on the assumption that this construction is applied to transportation tickets, it is possible to use the construction in useful applications in which when a user who possesses both a device A having information on a commutation ticket and a device B having an electronic money function passes through an automatic ticket gate, if, for example, a section through which the user has passed contains a section not covered by the commutation ticket, a deficiency is subtracted from the electronic money of the device B by the automatic ticket gate communicating with the device A and the device B at the same time by using any of the above-mentioned techniques.

Figure 32:
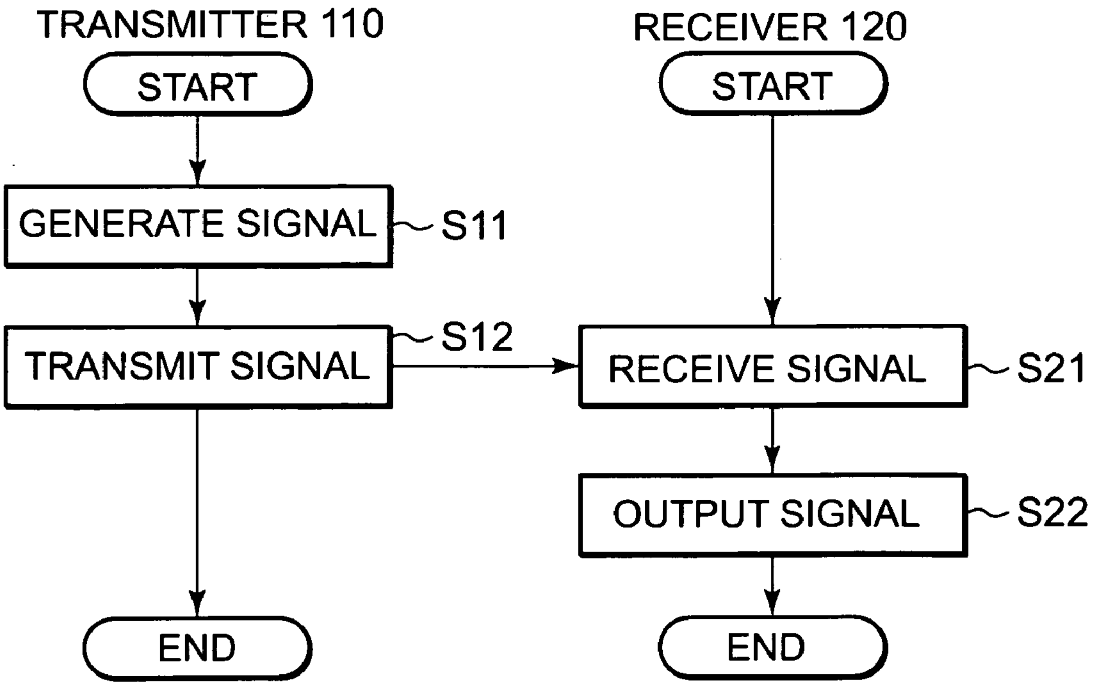
FIG. 32 is a flowchart showing an example of a flow of communication processing.

The flow of communication processing executed during the communication between the transmitter and the receiver will be described below on the basis of the flowchart shown in FIG. 32 with illustrative reference to the case of communication between the transmitter 110 and the receiver 120 of the communication system 100 shown in FIG. 1.

In step S11, the transmitter section 113 of the transmitter 110 generates a signal to be transmitted, in step S11, and in step S12, the transmitter 110 transmits the generated signal to the communication medium 130 via the transmission signal electrode 111. When the signal is transmitted, the transmitter section 113 of the transmitter 110 completes communication processing. The signal transmitted from the transmitter 110 is supplied to the receiver 120 via the communication medium 130. In step S21, the receiver section 123 of the receiver 120 receives the signal via the reception signal electrode 121, and in step S22 outputs the received signal. The receiver section 123 which has outputted the received signal completes communication processing.

As mentioned above, the transmitter 110 and the receiver 120 do not need a closed circuit using reference electrodes and can easily perform stable communication processing without being influenced by environments, merely by performing transmission and reception via the signal electrodes. In addition, since the structure of communication processing is simplified, the communication system 100 can use various communication techniques such as modulation, encoding, encryption and multiplexing at the same time.

In the description of each of the communication systems, the transmitter and the receiver have been described as being constructed as separated devices, but the present invention is not limited to this construction and a communication system may be constructed by using a transmitter/receiver having the functions of both the transmitter and the receiver.

Figure 33:
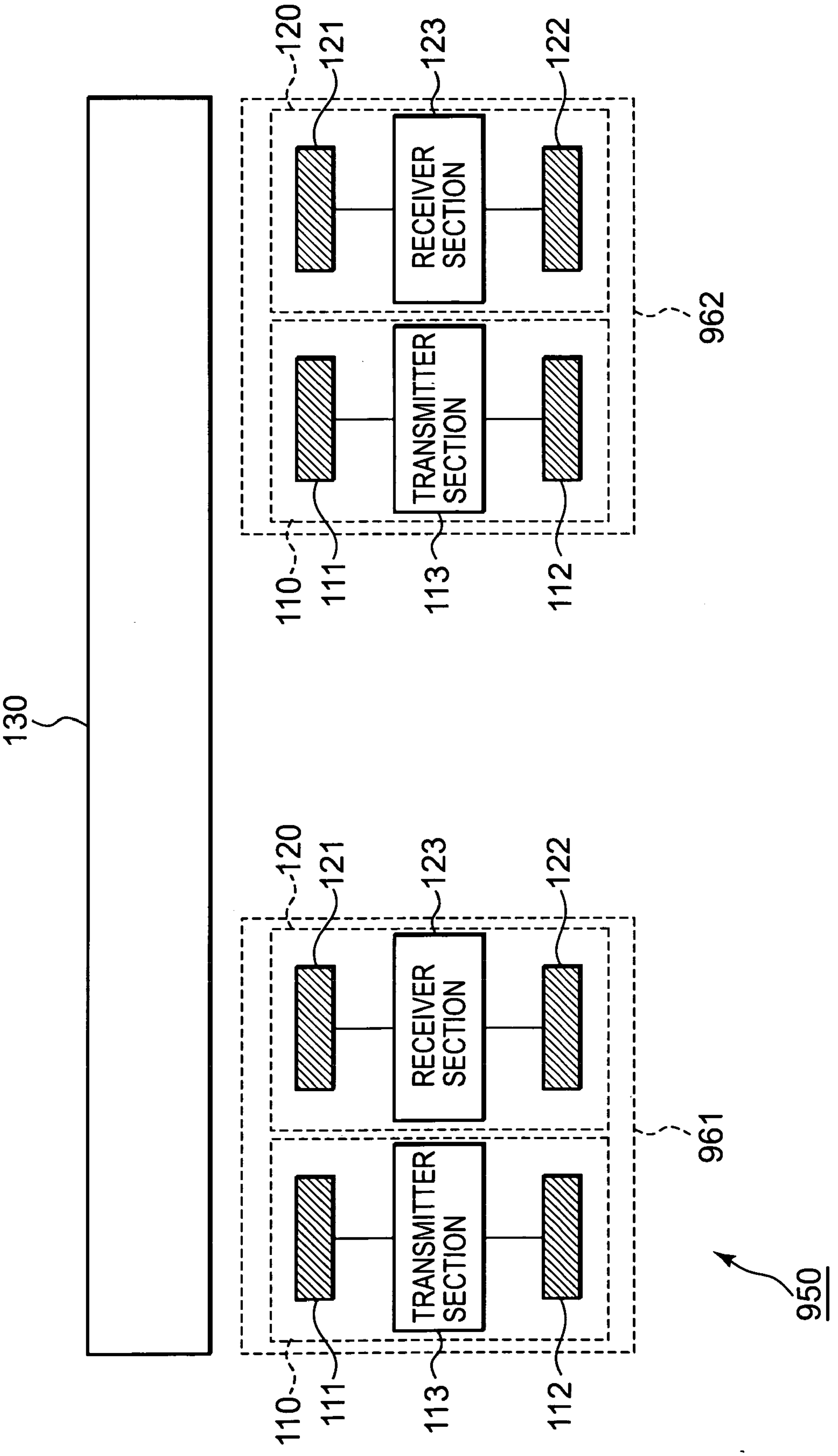
FIG. 33 is a diagram showing another construction example of the communication system which underlies the present invention.

FIG. 33 is a diagram showing another construction example of the communication system which underlies the present invention.

In FIG. 33, a communication system 950 has a transmitter/receiver 961, a transmitter/receiver 962, and the communication medium 130. The communication system 950 is a system which the transmitter/receiver 961 and the transmitter/receiver 962 perform bidirectional transmission and reception of signals via the communication medium 130.

The transmitter/receiver 961 has a transmitter section 110 having a construction similar to the transmitter 110 shown in FIG. 1, and a receiver section 120 having a construction similar to the receiver 120 shown in FIG. 1. Namely, the transmitter/receiver 961 has the transmission signal electrode 111, the transmission reference electrode 112, the transmitter section 113, the reception signal electrode 121, the reception reference electrode 122 and the receiver section 123.

Namely, the transmitter/receiver 961 transmits a signal via the communication medium 130 by using the transmitter section 110, and receives a signal supplied via the communication medium 130, by using the receiver section 120. The transmitter/receiver 961 is constructed so that the communication by the transmitter section 110 and the communication by the receiver section 120 are prevented from interfering with each other at this time.

Since the transmitter/receiver 962 has a construction similar to the transmitter/receiver 961 and operates in a similar manner, the description of the transmitter/receiver 962 will be omitted. The transmitter/receiver 961 and the transmitter/receiver 962 perform bidirectional communications via the communication medium 130 by the same method.

In this manner, the communication system 950 (the transmitter/receiver 961 and the transmitter/receiver 962) can easily realize bidirectional communications not restricted by use environments.

In the above-mentioned construction example, although different electrodes are used for transmission and reception, one set of signal and reference electrodes is provided in each device so that the device can be switched between transmission and reception.

Figure 35:
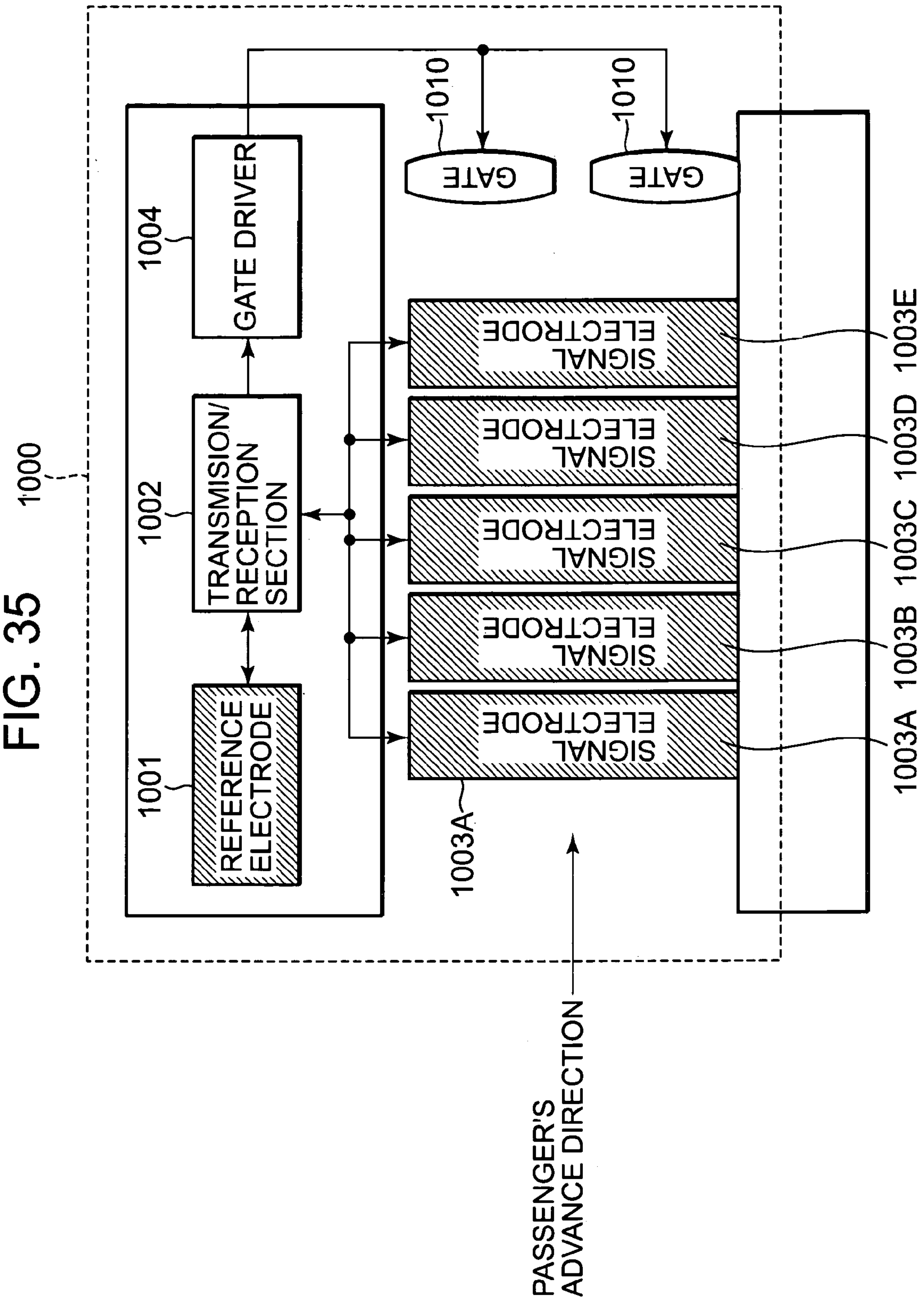
FIG. 35 is a perspective view showing a construction example of the ticket gate system according to the embodiment of the present invention.

In the next, a construction example of a ticket gate system based on the above-mentioned communication system according to an embodiment of the present invention will be described by referring to FIGS. 34 and 35. FIG. 34 is a diagram showing the ticket gate system as seen from the side (an entrance side or egress side). FIG. 35 is a diagram showing the ticket gate system as seen from the above.

This ticket gate system 1000 is an apparatus which is disposed, for example, at a wicket of a railway station, and which communicates with a user device (UD) 1100 (which corresponds to a transmitter/receiver 962 shown in FIG. 33) which is carried, for example, as worn on the arm of a person passing through the wicket, reads/writes information recorded in the user device 1100 relating to a passenger ticket, a commuter pass and the like, and opens or closes the gate 1010 based on validity of the information.

The ticket gate system 1000 is composed of a reference electrode 1001, a transmission/reception section 1002, a signal electrode 1003 and a gate driver 1004. The reference electrode 1001 is, for example, such one that integrated a transmission reference electrode 112 and a reception reference electrode 122 shown in FIG. 33. The transmission/reception section 1002 is, for example, such one that integrated a transmission section 113 and a reception section 123 in FIG. 33. The signal electrode 1003 is, for example, such one that integrated a transmission signal electrode 111 and a reception signal electrode 121 in FIG. 33. The signal electrode 1003 is installed in the floor on which a person walks when passing through the ticket gate. By way of example, the signal electrode 1003 may be installed in a state exposed on the floor, or covered with an insulation material or the like. In contrast, the reference electrode 1001 may be disposed at any place. Therefore, the transmission/reception section 1002 is able to communicate with the user device 1100 in bilateral directions via a human body which corresponds to the communication medium shown in FIG. 33.

The transmission/reception section 1002 controls the gate driver 1004 on the basis of a result of communication with the user device 1100. The gate driver 1004 operates to open or close the gate 1010 in response to a control signal from the transmission/reception section 1002.

The signal electrode 1003 is divided into a plurality of parts (in an example of FIG. 35, it is divided into five parts, i.e., signal electrodes 1003A to 1003E), and only one of the signal electrodes 1003A to 1003E is selected by a signal electrode switch 1031 which is built in the transmission/reception section 1002, so as to be able to communicate a signal with the transmission/reception section 1002. Hereinafter, in the case where there is no need to discriminate between these signal electrodes 1003A to 1003E, it will be described simply as signal electrode 1003X.

Figure 36:
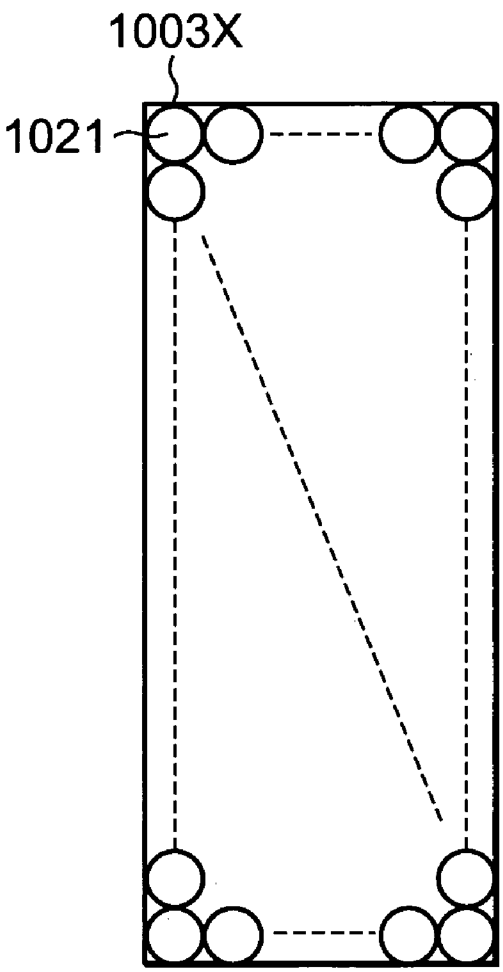
FIG. 36 is a diagram showing sensors which are built in a signal electrode.

By way of example, in the signal electrode 1003X, there are installed a plurality of sensors 1021, respectively, as shown in FIG. 36. This sensor 1021, which is composed of a pressure sensor, optical sensor or the like having a size which is small enough compared to the size of a human foot, is operable to detect the presence of a person existing on the signal electrode 1003X, and output a detection signal to the transmission/reception section 1002. However, it is assumed here that only one person exists on the signal electrode 1003X. Further, it may occur that the one person is detected by a plurality of signal electrodes 1003X (for example, by the signal electrodes 1003A and 1003B).

Still further, instead of the sensor 1003 built in the signal electrode 1003, such a sensor using a laser beam or the like capable of detecting a person may be installed on the side or the like of the gate. This sensor may be of any type other than those using the laser beam if it can detect passage or existence of a person.

All of the outputs from the entire sensors 1021 built in the signal electrodes 1003A to 1003E are also utilized when determining the number of persons present within the ticket gate (for example, the number of feet existing within the gate is counted and divided by two).

Figure 37:
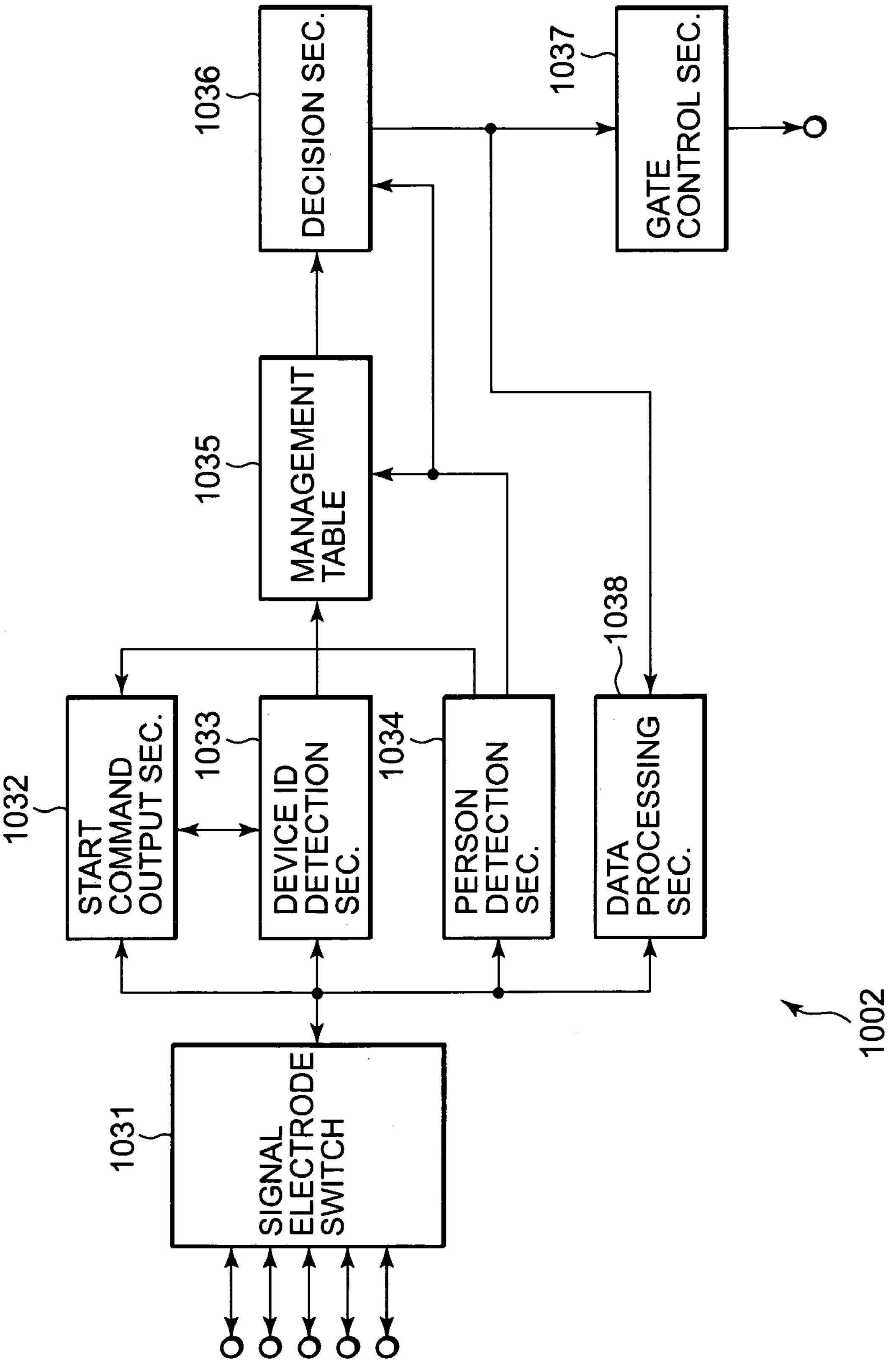
FIG. 37 is a block diagram showing a construction example of a transmitter/receiver section shown in FIG. 34.

FIG. 37 is a block diagram showing an example of detailed configurations of the transmission/reception section 1002.

In the transmission/reception section 1002, the signal switch 1031 which is connected with the signal electrodes 1003A to 1003E, respectively, residing in a front stage, selects as a communication destination one of the signal electrodes 1003A to 1003E, so as to connects it with a start command output section 1032, a device ID detection section 1033, a person detection section 1034 and a data processor 1038, connected in a rear stage.

The start command output section 1032 outputs a start command to the signal electrode switch 1031 for notifying the start of communication to the user device 1100, then notifies the device ID detection section 1033 that the start command has been issued.

The device ID detection section 1033 detects a device ID and a reception level thereof transmitted from the user device 1100 on the basis of a result of reception by the signal electrode 1003X connected via the signal electrode switch 1031, and outputs information indicating a detected device ID, a detected reception level and a specific signal electrode 1003X having received the device ID to a management table 1035.

Here, the reception level is assumed to represent either one of, for example, an average value, a maximum value, a minimum value of a radio wave strength of a signal, or a value of the most stable reception state thereof, in accordance with the methods of signal modulation in communication.

The person detection section 1034 determines whether or not a person exists on the signal electrode 1003X on the basis of sensor outputs supplied from signal electrode 1003X connected via signal electrode switch 1031, and outputs a result of judgment to the start command output section 1032. Further, the person detection section 1034 identifies a respective person existing within the ticket gate on the basis of the entire sensor outputs from the signal electrodes 1003A through 1003E inputted via the signal electrode switch 1031, and outputs a result of identification to the management table 1035 and the decision section 1036. Still further, the person detection section 1034 counts the number of persons existing within the ticket gate on the basis of the entire sensor outputs from the signal electrodes 1003A to 1003E inputted via signal electrode switch 1031, and outputs it to the management table 1035 as well as to the decision section 1036.

The management table 1035 registers the device ID and the reception level thereof received by the signal electrode 1003X in association with the signal electrode 1003X, on the basis of an output from the device ID detection section 1033. The decision section 1036 decides whether to open or close the gate 1010 on the basis of the information registered in the management section 1035, the number of persons residing in the gate counted by the person detection section 1034 and the like, and outputs a result of decision to a gate controller 1037. The gate controller 1037 controls a gate driver 1004 according to the result of decision inputted from the decision section 1036. A data processor 1038 executes a predetermined data read and write between the signal electrode switch 1031, the signal electrode 1003X and the user device 1100 connected via a human body.

Figure 38:
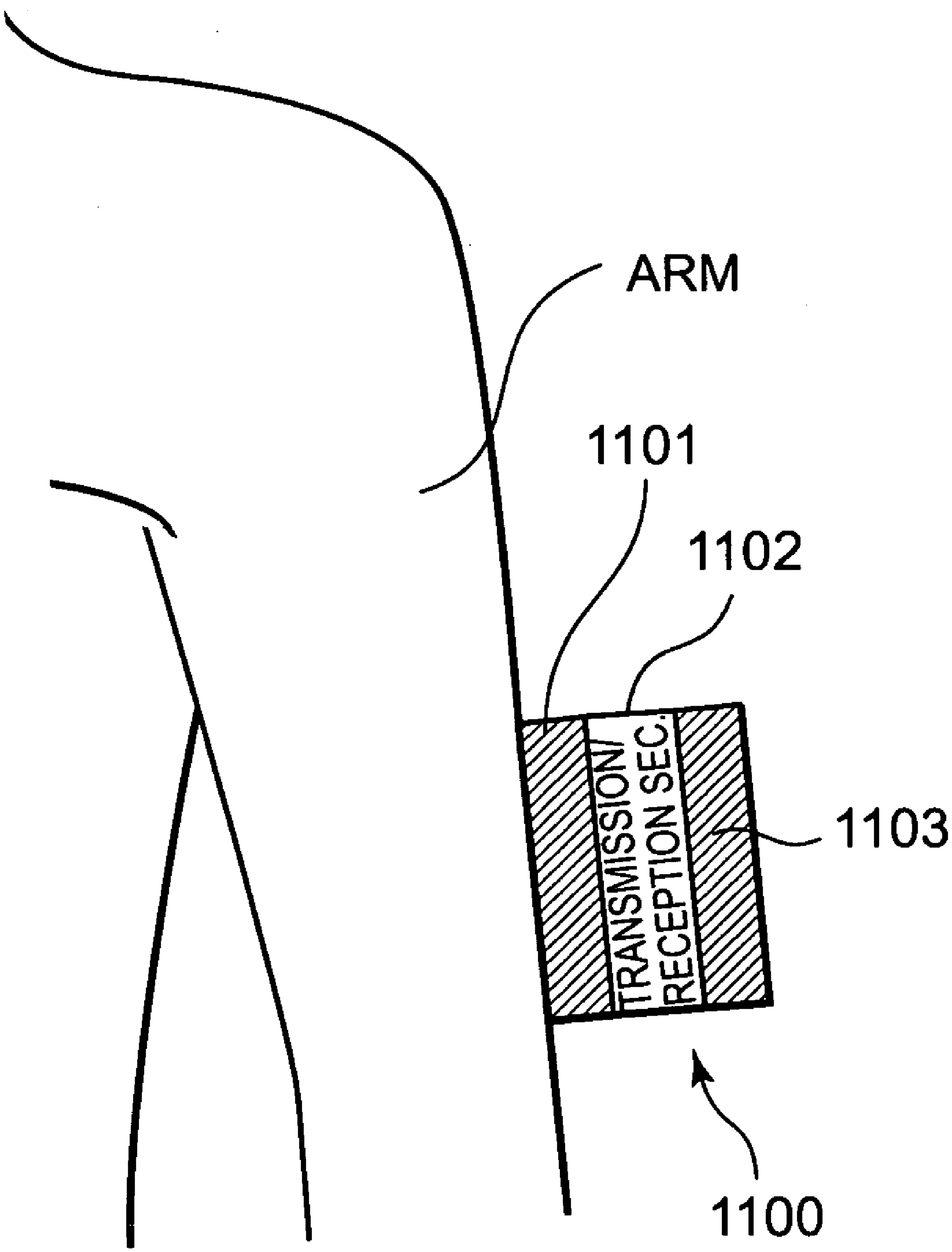
FIG. 38 is a block diagram showing a construction example of a user device shown in FIG. 34.

FIG. 38 shows an example of configurations of a user device 1100 carried with by wearing on a person passing through the ticket gate. This user device 1100 corresponds to the transmitter/receiver 962 shown in FIG. 33.

The user device 1100 is composed of a signal electrode 1101, a transmission/reception section 1102, and a reference electrode 1103. The signal electrode 1101 is, for example, such one that integrated the transmission signal electrode 111 and the reception signal electrode 121 shown in FIG. 33. The transmission/reception section 1102 is, for example, such one that integrated the transmission section 113 and the reception section 123 shown in FIG. 33, and the reference electrode 1103 is, for example, such one that integrated the transmission reference electrode 112 and the reception reference electrode 122 shown in FIG. 33. Therefore, the transmission/reception section 1102 is able to communicate information relating to a passenger ticket, a commuter pass or the like which are internally stored between the ticket gate system 1000 in bilateral directions via a human body corresponding to the communication medium shown in FIG. 33.

Figure 39:
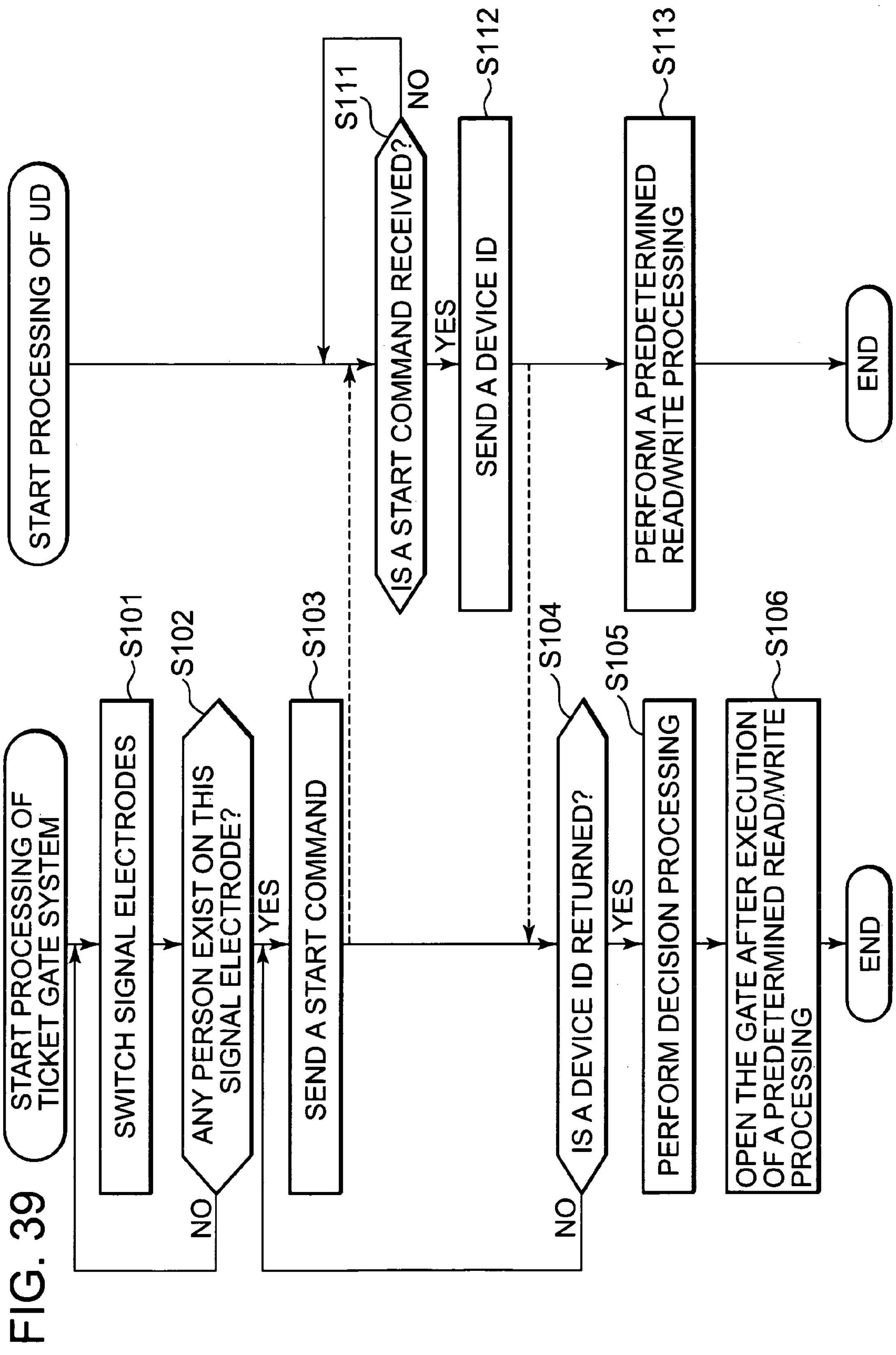
FIG. 39 is a flowchart showing a first communication processing to be performed by the ticket gate system and the user device shown in FIG. 34.
Figure 40:
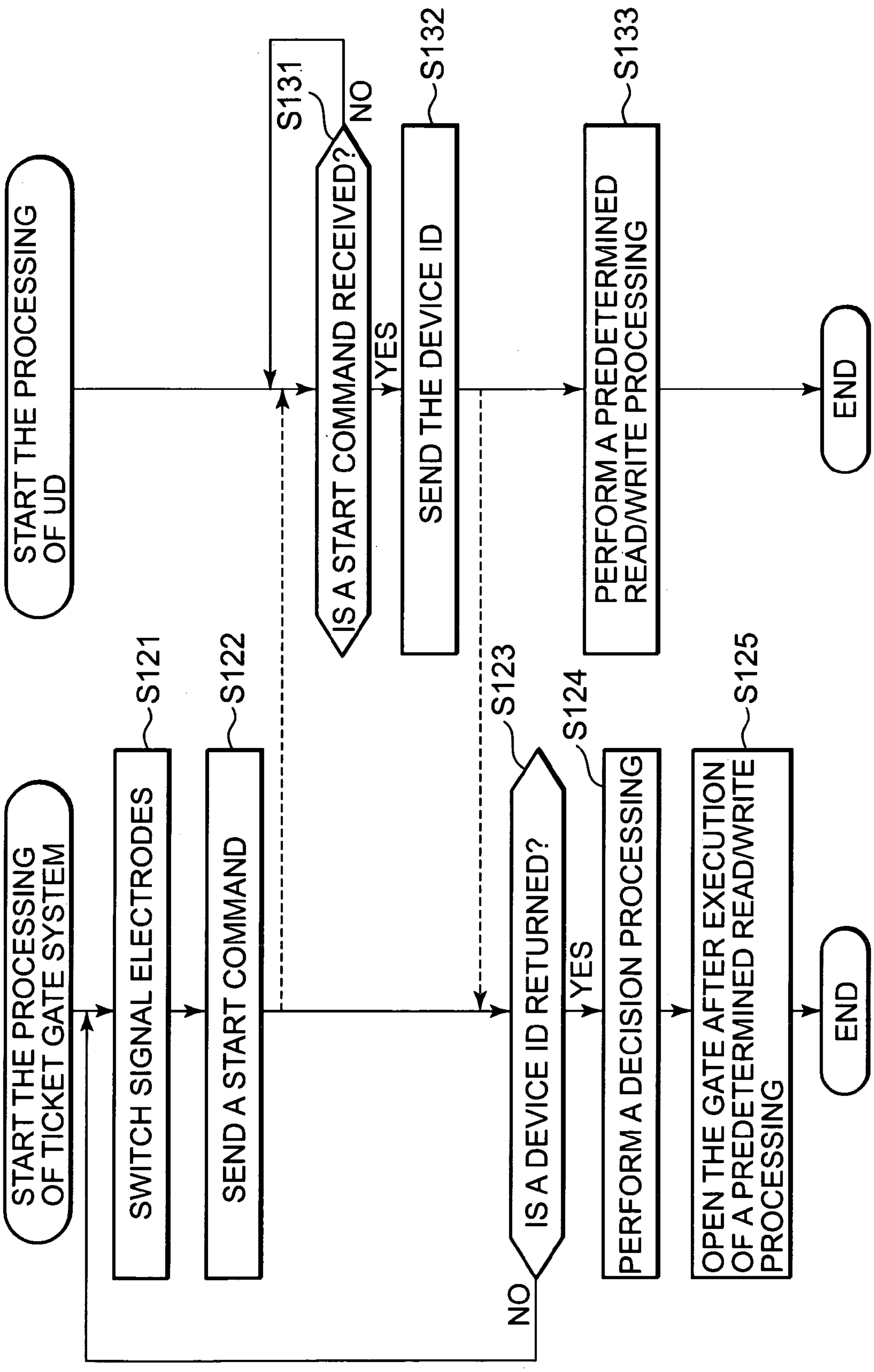
FIG. 40 is a flowchart showing a second communication processing to be performed by the ticket gate system and the user device shown in FIG. 34.

In the next, two kinds of basic communication processing to be performed by the ticket gate system 1000 and the user device 1100 will be described by referring to FIGS. 39 and 40. FIG. 39 is a flowchart showing a first communication processing.

First of all, in step S101, the decision section 1036 issues a notification of no passage permission to the gate controller 1037. In response to this notification of no passage permission, the gate controller 1037 controls the gate driver 1004 to close the gate 1010. Accordingly, the gate driver 1004 closes the gate 1010. Meanwhile, the signal electrode switch 1031 switches the signal electrode 1003X for connection with the rear stage such as the start command output section 1032 or the like, in the order of signal electrodes 1003A to 1003E. Therefore, in the first step S101, it is switched to the signal electrode 1003A. Accordingly, a sensor output from a sensor 1021 built in the signal electrode 1003A is allowed to be inputted to the person detection section 1034.

In step S102, the person detection section 1034 determines whether or not a person exists on the signal electrode 1003X presently connected (in this case, signal electrode 1003A) on the basis of a sensor input from the signal electrode 1003X connected thereto. In the case a person is judged to exist, the step moves to step S103. However, in step S102, in the case where it is judged that no person exists on the signal electrode 1003X presently connected, the process returns to step S101 so as to repeat the processing of the step S101 and thereafter, whereby the connection to the rear stage is switched, for example, from the current connection of signal electrode 1003A to signal electrode 1003B.

In step S103, the start command output section 1032 generates a start command, and outputs it to the signal electrode 1003X (in this case, signal electrode 1003A) connected via the signal electrode switch 1031. The signal electrode 1003X currently connected transmits the start command which was inputted.

In this instance, since there exists a person on the signal electrode 1003X (in this case, the signal electrode 1003A), the start command which was transmitted is received, via his/her human body, by a user device 1100 which is worn on the person. The user device 1100 which received the start command returns its own device ID which is identification information thereof via the human body (steps S111 and S112).

In step S104, the device ID detection section 1033 determines whether or not a device ID is returned by detection of the device ID from the output from the signal electrode 1003X (in this case, signal electrode 1003A) connected via the signal electrode switch 1031. In the case, it is determined that any device ID is not returned, the process returns to step S103 to transmit a start command again. In step S104, if it is judged that a device ID is returned, the process advances to step S105.

In step S105, the device ID detection section 1033 outputs information indicating the device ID which was detected and the signal electrode which received the device ID (in this case, signal electrode 1003A) to the management table 1035. The management table 1035 registers the device ID which was received in association with the signal electrode 1003X which received the device ID. The decision section 1036, in response to an event that the device ID is registered in the management table 1035, issues a notification of passage permission to the data processor 1038 and the gate controller 1037.

In response to this notification of passage permission, in step S106, the data processor 1038 executes a predetermined data read/write processing between the user device 1100, which is connected via the signal electrode 1003X (in this case, signal electrode 1003A) which is connected via the signal electrode switch 1031, as well as via the human body (step S113). The gate controller 1037 controls the gate driver 1004 to open the gate 1010. Accordingly, the gate driver 1004 opens the gate 1010. After the person having passed through the gate 1010 which was opened, this first communication processing is ended, and immediately after then, a next first communication processing is started from the top. Hereinabove, there has been described the first basic communication processing to be performed by the ticket gate system 1000 and the user device 1100 according to the present invention.

In the next, by referring to a flowchart of FIG. 40, a second communication processing to be performed by use of the ticket gate system 1006 and the user device 1100 will be described. In the second communication processing, the sensor output from the sensor 1021 which was built in the signal electrode 1003X is not used.

First of all, in step S121, the decision section 1036 issues a notification of no passage permission to the gate controller 1037. In response to this notification of no passage permission, the gate controller 1037 controls the gate driver 1004 to close the gate 1010. Accordingly, the gate driver 1004 closes the gate 1010. Meanwhile, the signal electrode switch 1031 switches the signal electrode 1003X for connection with the rear stage including the start command output section 1032 and the like, in the order of signal electrodes from 1003A to 1003E. Therefore, in the first step of S121, it is switched to signal electrode 1003A.

In step S122, the start command output section 1032 generates a start command, and outputs it to a signal electrode 1003X (in this case, signal electrode 1003A) now connected thereto via the signal electrode switch 1031. The signal electrode 1003X now connected transmits the start command having been inputted.

Then, if there exists a person on the signal electrode 1003X (in this case, signal electrode 1003A) currently in connection, the start command having been transmitted is received by a user device 1100 which is worn on the person, via his/her body. The user device 1100 which received the start command returns a device ID which is its own identification information via the human body (steps S131 and S132).

In step S123, the device ID detection section 1033 determines whether or not a device ID is returned by detecting the device ID in the output from the signal electrode 1003X (in this case, from signal electrode 1003A) presently connected via the signal electrode switch 1031. In the case it is determined that no device ID is returned after elapse of a predetermined period of time without detecting any device ID, the process returns to step S121 to repeat the processing thereof and thereafter.

In step S123, in the case it is judged that a device ID is returned, the process advances to step S124. In step S124, the device ID detection section 1033 outputs information indicating the device ID detected above and the signal electrode 1003X (in this case, signal electrode 1003A) that received the device ID to the management table 1035. The management table 1035 registers the device ID thus received, in association with the signal electrode X that received the device ID. In response to that the device ID has been registered in the management table 1035, the decision section 1036 issues a notification of passage permission to the data processor 1038 and the gate controller 1037.

In response to this notification of passage permission, in step S125, the data processor 1038 executes a predetermined data read/write processing with respect to the signal electrode 1003X (in this case, signal electrode 1003A) connected via the signal electrode switch 1031 and the user device 1100 connected via the human body (step S133). The gate controller 1037 controls the gate driver 1004 to open the gate 1010. Accordingly, the gate driver 1004 opens the gate 1010. Then, after passage of the person through the gate 1010 which was opened, this second processing is ended. Immediately after then, another run of the second processing is started from the top. The description set forth hereinabove is the second basic communication processing to be performed by means of the ticket gate system 1000 and the user device 1100 according to the invention.

By way of example, the first or the second communication processing described hereinabove is based on the following assumption that passengers enter the ticket gate one by one and that there exists only one person within the ticket gate at a time. However, because there may occur that actually two or more persons exist within the ticket gate at a time, such a situation must be considered as well.

Figure 41A:
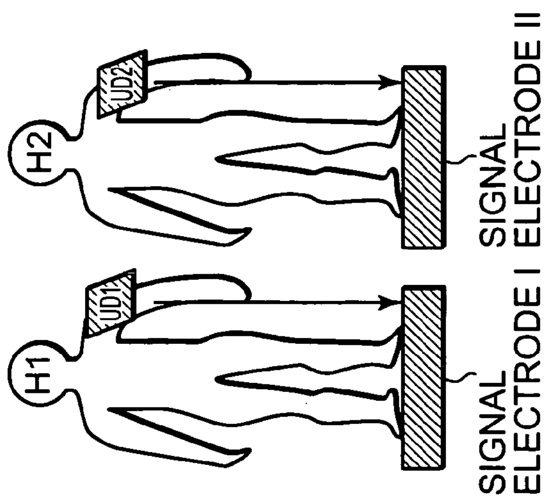
FIG. 41 is a diagram showing an example of situations where there are a plurality of persons standing within a ticket gate system.

For example, with reference to FIG. 41A, let's consider such a situation where there exist two persons (H1 and H2) wearing a user device 1100, the device ID of which is UD1 or UD2, respectively on adjacent signal electrodes I and II (for example, signal electrodes 1003A and 1003B), without contacting with each other. In this situation, the signal electrode I is able to recognize a person H1 and a user device 1100 the user ID of which is UD1 (hereinafter, referred to simply as UD1, the same applies with UD2). In the same manner, the signal electrode II is able to recognize a person H2 and a UD2. Thereby, in the situation of FIG. 41A, it is able to recognize that the person H1 wears UD1, and the person H2 wears UD2. Accordingly, it may be allowed for the persons H1 and H2 to pass through the gate 1010.

Figure 41B:
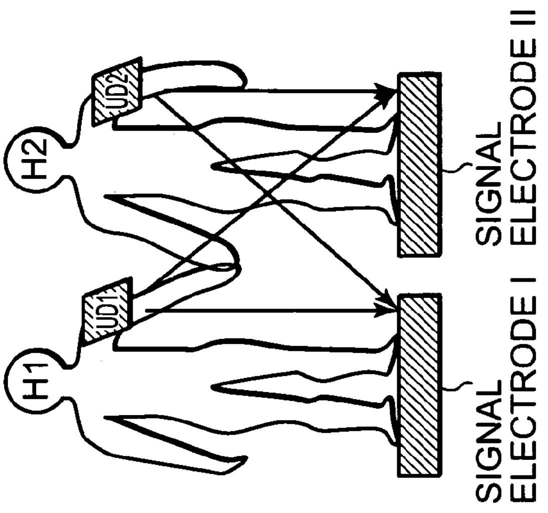

However, with reference to FIG. 41B, let's consider such a situation where there exist two persons (H1 and H2) wearing UD1 or UD2, respectively on adjacent signal electrodes I and II (for example, signal electrodes 1003A and 1003B), both persons contacting with each other. In this situation, the signal electrode I is able to recognize the person H1, UD1 and UD2. By way of example, in order for the signal electrode I to be able to recognize a plurality of user devices 1100 (UD1 and UD2) without interference, there may be used spectrum diffusion communication, frequency division communication, time split communication or the like. In the same manner as described above, the signal electrode II is able to recognize the person H2, UD2 and UD1.

In the situation shown in FIG. 41B, although there arises no problem when the persons H1 and H2 pass through the gate 1010, it is not recognizable which one of the persons H1 and H2 wears the UD1.

Figure 41C:
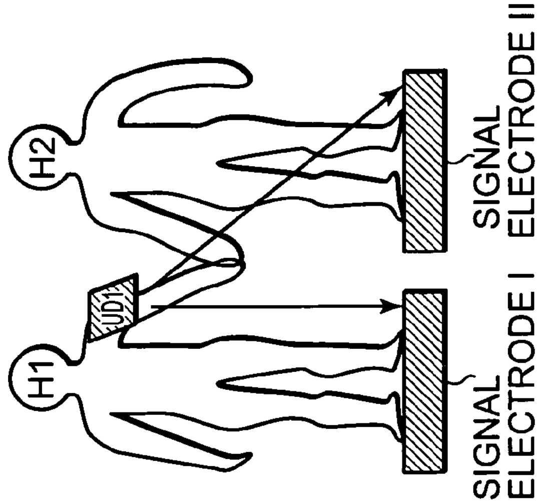

Further, let's consider such a situation as shown in FIG. 41C, where there exist a person H1 who wears UD1 and a person H2 who does not wear a user device 1100, respectively on adjacent signal electrodes I and II (for example, signal electrodes 1003A and 1003B), both contacting with each other. In this situation, the signal electrode I is able to recognize person Hi and UD1. The signal electrode II is able to recognize person H2 and UD1. In the situation shown in FIG. 41C, although there is a need to prevent the passage of the gate 1010 by person H2, it is difficult to determine which of the persons H1 and H2 actually wears the UD1. As a result, there occurs a problem that the passage of the gate 1100 by both persons H1 and H2 will have to be prevented.

Figure 41D:
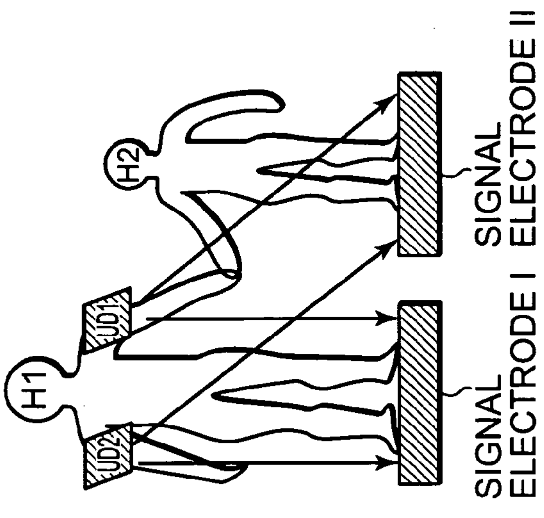

Still further, let's consider such a situation as shown in FIG. 41D, where there exist a person Hi who wears UD1 and UD2 and a person H2 who does not wear a user device 1100, respectively on adjacent signal electrodes I and II (for example, on signal electrodes 1003A and 1003B), both contacting hand by hand. In this situation, the signal electrode I is able to recognize person H1, UD1 and UD2. The signal electrode II is able to recognize person H2, UD1 and UD2.

In the situation shown in FIG. 41D, although there is no problem for the persons H1 and H2 to pass through the gate 1010, it is difficult to recognize which of the persons H1 and H2 actually wears the UD1.

Likewise, it is difficult to recognize which of the persons H1 and H2 wears the UD2.

Figure 42:
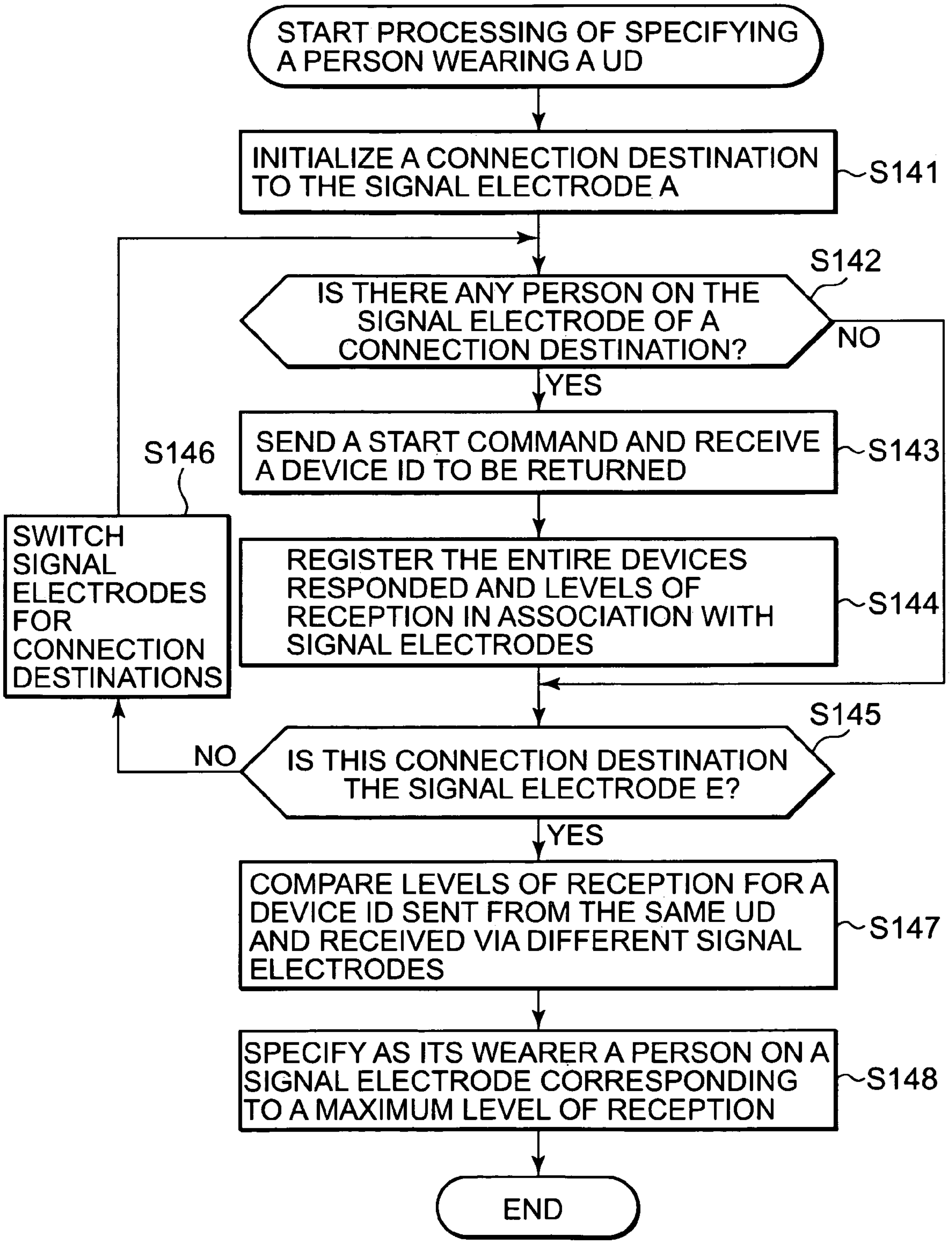
FIG. 42 is a flowchart showing a user device wearer specifying process.

Therefore, in the next, there will be described a user device wearer specifying processing for specifying a person who wears a recognized user device 1100 by means of the ticket gate system 1000, by referring to a flowchart shown in FIG. 42. By the way, the processing to be performed on the side of the user device 1100 is assumed to return a device ID in response to a start command when it is received.

First of all, in step S141, the signal electrode switch 1031 initializes the signal electrode 1003X to the signal electrode 1003A for further connection with the following stage including the start command output section 1032 and so on. Thereby, a sensor output from a sensor 1021 built in the signal electrode 1003A is assumed to be inputted to the person detection section 1034.

In step S142, the person detection section 1034 determines whether or not a person exists on the signal electrode 1003X (in this case, signal electrode 1003A) currently connected, by use of a sensor input therefrom. In the case a person is determined to exist thereon, the process goes to step S143. In the case where no person is determined to exist on the signal electrode 1003X currently connected, the process skips to step S145.

In step S143, the start command output section 1032 generates a start command for a predetermined period of time and a predetermined number of times, and outputs it to a signal electrode 1003X (in this case, signal electrode 1003A) which is connected thereto via the signal electrode switch 1031. The signal electrode 1003X connected thereto transmits the start command being inputted. In this case, since there exists a person on the signal electrode 1003X (in this case, signal electrode 1003A) currently in connection, the start command is received by all of the user devices 1100 capable of communicating via the body of the person. Then, from all of the user devices 1100 that received the start command, a respective device ID is returned.

Then, the communication is maintained for a predetermined period of time so that the signal electrode 1003X is able to receive all the device IDs having been returned, then the device ID detection section 1033 detects the entire device IDs having been returned on the basis of the output from the signal electrode 1003X (in this case, signal electrode 1003A) connected via the signal electrode switch 1031, and further detects a respective reception level thereof The device ID detection section 1033 outputs information indicating entire device IDs having been detected, reception levels thereof, and the signal electrode 1003X (in this case, signal electrode 1003A) that has received the device ID, to the management table 1035.

By way of example, there may occur such a case where a user device 1100 carried by a person on the signal electrode 1003X in connection is out of order, or the person thereon does not wear the user device 1100, so that the device ID can not be detected. In this instance, it is notified to the management table 1035 that although a person was detected, a device ID was not detected.

In step S144, the management table 1035 registers the entire device IDs returned and reception levels thereof, in association with the signal electrode 1003X that received the device IDs. For example, in the case two device IDs are detected, the two device IDs and respective reception levels thereof are registered in association with the signal electrode 1003A. Here, it is also registered that although a person was detected, if a device ID was not detected.

In step S145, the signal electrode switch 1031 determines whether or not the signal electrode 1003E is presently in connection with the rear stage including the start command output section 1032 and the like. In the case, it is judged that the signal electrode 1003E is not in connection, the process moves to step S146, where the signal electrode switch 1031 switches the connection for the rear stage including the start command output section 1032 and the like to an adjacent signal electrode 1003X. In this case, since the signal electrode 1003A is currently in connection, it is switched to signal electrode 1003B. For example, when the signal electrode 1003B is in connection, it is switched to signal electrode 1003C. Alternatively, when the signal electrode 1003C is in connection, it is switched to signal electrode 1003D.

Afterward, the process returns to step S142 to repeat the processing thereafter. Then, in step S145, if it is determined that the signal electrode 1003E is presently connected to the rear stage including the start command output section 1032 and the like, since it means that switching from the signal electrode 1003A to the signal electrode 1003E is complete, the process advances to step S147.

In step S147, the decision section 1036 compares reception levels of a device ID which was transmitted from the same user device 1100 and were received by a plurality of different signal electrodes 1003X, by referring to the management table 1035. In step S148, on the basis of a result of comparison processing in step S147, the decision section 1036 specifies as a wearer of the user device 1100 the person who is on the signal electrode 1003X which corresponds to a maximum level of reception.

More specifically, for example, in the situation shown in FIG. 41B, a reception level L1I of UD1 which was received by the signal electrode I and a reception level L1II of UD1 which was received by the signal electrode II are compared. Normally, since attenuation of signal levels increases the more as its propagation path becomes the longer, the reception level L1I should be greater than the reception level L1II. Thereby, the wearer of the UD1 is specified to be the person H1 who is on the signal electrode I. Further, a reception level of UD2 which was received by the signal electrode I and a reception level of UD2 which was received by the signal electrode II are compared. Since a reception level L2II should be greater than a reception level L2I, a person who wears UD2 is specified to be the person H2 who is on the signal electrode II.

Still further, for example, in the situation as shown in FIG. 41C, a reception level L1I of UD1 which was received by the signal electrode I and a reception level L1II of the UD1 which was received by the signal electrode II are compared. Since the reception level L1I should be greater than the reception level L1II, the wearer of UD1 is specified to be the person H1 who is on the signal electrode I.

Still furthermore, for example, in the situation as shown in FIG. 41D, a reception level L1I of UD1 which was received by the signal electrode I and a reception level L1II of UD1 which was received by the signal electrode II are compared. Since the reception level I1I should be greater than the reception level L1II, the person who wears the UD1 is specified to be the person H1 who is on the signal electrode I. Also, a reception level L2I of UD2 which was received by the signal electrode I and a reception level L2II of UD2 which was received by the signal electrode II are compared. Since the reception level L2I should be greater than the reception level L2II, the person who wears UD2 is specified also to be the person H1 who is on the signal electrode I.

By way of example, in the example shown in FIG. 41D, where a single person is specified to wear a plurality of user devices 1100 (in this case, the person H1), reception levels of the plurality of user devices 1100 (in this case, reception levels L1I and L2I)are compared, and if they are approximately the same, it may be judged, for example, such that a parent (person H1) wears not only his/her own user device 1100 but also a child's (person H2) user device 1100.

According to the user device wearer specifying processing described hereinabove, since it is able to specify who it is that wears the user device 1100 which was recognized, it becomes possible to control the gate to be opened or closed in order to prevent the person who does not wear a user device 1100 from passing through the gate.

Furthermore, it can be applied, for example, to such a case where a specific service is to be provided to a user having a user device 1100 (for example, guidance to a platform for a destination by use of visual information or annunciation).

Still further, the user device wearer specifying processing described above is able to prevent the occurrence of such an event where any person without wearing a user device 1100 and with a malicious intention deceitfully utilizes the user device 1100 belonging to other persons by touching the other person wearing the user device 1100.

In addition, the present invention is not limited to the ticket gate system of the station, and can be applied to any gate which allows only those people who have an authenticated transit pass to pass through it, and also to any other apparatus in which a human body is utilized as a communication medium.

In the present specification, the above-mentioned steps which describe a program recorded on a recording medium include not only processes to be executed in a time-series manner in the described order but also processes which are not processed in a time-series manner but are executed in parallel or individually.

In the present specification, the term "system" denotes the entire apparatus made of a plurality of devices (apparatuses). In addition, a construction mentioned as one device hereinabove may be divided and constructed as a plurality of devices. Conversely, constructions respectively mentioned above as a plurality of devices hereinabove may also be integrated and constructed as one device. In addition, as a matter of course, constructions other than the above-mentioned ones may be added to the constructions of the respective devices. Furthermore, part of the construction of an arbitrary one of the devices may be incorporated into the construction of another as long as the construction and the operation of the entire system are substantially the same.

The present invention contains subject mater related to Japanese Patent Application No. JP2005-173580 filed in the Japanese Patent Office on Jun. 14, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system for communicating with a communication terminal located on a communication medium comprising a person, comprising:

a plurality of communication means, disposed in contact with or in proximity to the communication medium, for communicating with the communication terminal via the communication medium, wherein each one of the plurality of communication means includes a plurality of sensors;

a detection means for detecting reception levels of a signal transmitted from the communication terminal and received via the plurality of communication means;

an association means for associating the communication terminal with one of the plurality of communication means by comparing reception levels of the signal transmitted from the communication terminal and received by each of the plurality of communication means; and an identifying means for uniquely identifying the communication medium based on the received signal, wherein the association means further specifies the association with the identified communication medium based on the association means and the identifying means.

2. The communication system according to claim 1, wherein the association means associates the communication terminal with the communication means that detects the strongest signal.

3. A communication method for providing communication with a communication terminal located on a communication medium comprising a person, the method comprising:

detecting reception levels of a signal transmitted from the communication terminal and received by a plurality of communication means via the communication medium, wherein each one of the plurality of communication means includes a plurality of sensors and the plurality of communication means are disposed in contact with or in proximity to the communication medium;

associating the communication terminal with one of the plurality of communication means by comparing reception levels of the signal transmitted from the communication terminal and received by each of the plurality of communication means;

uniquely identifying the communication medium based on the received signal; and specifying the association with the identified communication medium based on the associating and the identifying.

4. A computer-readable recording medium storing a computer-executable program which, when executed by a processor, performs a method for providing communication with a communication terminal located on a communication medium comprising a person, the method comprising:

detecting reception levels of a signal transmitted from the communication terminal and received by a plurality of communication means via the communication medium, wherein each one of the plurality of communication means includes a plurality of sensors and the plurality of communication means are disposed in contact with or in proximity to the communication medium;

associating the communication terminal with one of the plurality of communication means by comparing reception levels of the signal transmitted from the communication terminal and received by each of the plurality of communication means;

uniquely identifying the communication medium based on the received signal; and specifying the association with the identified communication medium based on the associating and the identifying.

* * * * *